US012807343B1

(12) United States Patent
McGann et al.

(10) Patent No.: US 12,807,343 B1
(45) Date of Patent: Nov. 24, 2026

(54) MULTIPLE UNMANNED AERIAL VEHICLE JETTISON APPARATUS

(71) Applicant: The United States of America, as represented by the Secretary of the Navy, Arlington, VA (US)

(72) Inventors: Shawn Kerry McGann, Ridgecrest, CA (US); Nicholas McGaha, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 173 days.

(21) Appl. No.: 18/826,696

(22) Filed: Sep. 6, 2024

(51) Int. Cl.

| | |
|---|---|
| ***B64U 80/82*** | (2023.01) |
| ***B64C 7/00*** | (2006.01) |
| ***B64D 1/02*** | (2006.01) |
| ***B64U 10/14*** | (2023.01) |
| ***B64U 70/20*** | (2023.01) |
| ***B64U 80/40*** | (2023.01) |
| *B64U 101/17* | (2023.01) |

(52) U.S. Cl.
CPC ................ *B64U 80/82* (2023.01); *B64C 7/00* (2013.01); *B64D 1/02* (2013.01); *B64U 10/14* (2023.01); *B64U 70/20* (2023.01); *B64U 80/40* (2023.01); *B64U 2101/17* (2023.01); *B64U 2201/10* (2023.01)

(58) Field of Classification Search
CPC ........ B64U 80/82; B64U 80/40; B64U 70/20; B64U 10/14; B64U 2101/17; B64U 2201/10; B64C 7/00; B64D 1/02; B64D 5/00
See application file for complete search history.

(56) References Cited

U.S. PATENT DOCUMENTS

| | | | | |
|---|---|---|---|---|
| 2,921,501 | A | 1/1960 | Charles | |
| 3,273,459 | A | 9/1966 | Lardin | |
| 4,697,764 | A | 10/1987 | Hardy | |
| 11,027,842 | B1 * | 6/2021 | Albrecht | B64U 70/70 |
| 11,117,667 | B1 | 9/2021 | McGann et al. | |
| 11,794,930 | B1 | 10/2023 | McGann et al. | |
| 2002/0074454 | A1 | 6/2002 | Henderson | |
| 2017/0297712 | A1 | 10/2017 | Kim | |
| 2018/0170510 | A1 | 6/2018 | Brock | |
| 2020/0386515 | A1 * | 12/2020 | Cantine | F41F 3/052 |
| 2022/0380045 | A1 * | 12/2022 | Tian | B64C 39/04 |

* cited by examiner

*Primary Examiner* — Rodney A Bonnette
(74) *Attorney, Agent, or Firm* — Naval Air Warfare Center Weapons Division; Jimmy M. Sauz

(57) ABSTRACT

A multiple unmanned aerial vehicle (UAV) jettison apparatus. The multiple UAV jettison apparatus may comprise: a payload bay mounted beneath an aircraft and having an inner space, a fairing substantially enclosing the inner space, and a top plate assembly coupled to the payload bay and disposed within the inner space. The top plate assembly may comprise: linear bearing forward and aft stations, each comprising two pairs of linear bearing assemblies, four ejector plate assemblies, each operably coupled to a respective pair of linear bearing assemblies and adapted to move between stowed and launch positions along a corresponding UAV axis, a driveline assembly, and forward and aft latch assemblies operably coupled to the driveline assembly. The forward and aft latch assemblies may each comprise a pair of latches, and each latch may be configured to releasably couple a UAV.

20 Claims, 20 Drawing Sheets

MULTIPLE UNMANNED AERIAL VEHICLE JETTISON APPARATUS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

The present disclosure relates generally to apparatuses for releasing, ejecting, and/or jettisoning multiple unmanned aerial vehicles (UAVs) from a single aircraft.

BACKGROUND

UAVs are often used in various applications in environments that are unacceptably too costly or dangerous to humans. Such applications may include policing, surveillance, and testing. UAVs, for instance, may be used to detect enemy threats autonomously from aerial vantage points.

Due to battery power constraints, current multirotor UAV platforms have limited endurance/standoff distance, and these limitations affect flight duration and operating ranges. Thus, the mission scope of a multirotor UAV is generally limited, as the operating regions of the UAV are usually restricted to areas proximate to the operator. Because much of the UAV's power is spent achieving safe standoff from the operator, it is often desirable to have the UAV manually transported to its desired location before operation.

One solution is to have a larger aircraft transport and release the UAV at a desired location. In this case, the UAV may be stored within the fuselage of the aircraft, and upon release of the aircraft's bomb bay doors, the UAV may jettison to the desired region and vicinity. The limited payload volume of the fuselage, however, may restrict various types of UAVs for transport. Also, during jettison of the UAV, the bomb bay doors may also negatively affect flight performance due to drag occurring beneath the aircraft.

Notably, certain mission requirements such as data collection and target reconnaissance might also require the use of multiple UAVs. While it is possible to deploy multiple larger aircraft where each aircraft transports and releases a single UAV, this might be too costly, inefficient, or impractical.

Therefore, based on the foregoing, a need exists that overcomes these deficiencies. The present disclosure solves these deficiencies and generally represents a new and useful innovation in release and ejection apparatuses for multiple UAVs on a single aircraft. A preferable novel solution may be to have a single, large aircraft transport and eject multiple UAVs while ensuring the aircraft's center of gravity is kept within limits despite dropping significant payload weight.

SUMMARY OF ILLUSTRATIVE EMBODIMENTS

To minimize the limitations in the related art and other limitations that will become apparent upon reading and understanding the present specification, the following discloses embodiments of a new and useful multiple unmanned aerial vehicle (UAV) jettison apparatus.

One embodiment of a multiple UAV jettison apparatus may comprise: a payload bay mounted beneath an aircraft and having an inner space, the payload bay being disposed along a central vertical longitudinal plane; a fairing substantially enclosing the inner space of the payload bay and having first, second, third, and fourth UAV openings; a top plate assembly coupled to the payload bay and disposed within the inner space, the top plate assembly comprising: linear bearing forward and aft stations, each comprising two pairs of linear bearing assemblies, wherein each of the two pairs of linear bearing assemblies are disposed in parallel on first and second diagonal planes, respectively, and corresponding with the first, second, third, and fourth UAV openings; wherein the linear bearing forward and aft stations may be disposed in parallel from each other and have bilateral symmetry along the central vertical longitudinal plane, such that first and second angles between the central longitudinal plane and the respective first and second diagonal planes are substantially equal; four ejector plate assemblies, each operably coupled to the respective pair of linear bearing assemblies and adapted to move between stowed and launch positions along corresponding first, second, third, and fourth UAV axes; wherein the first and third UAV axes may substantially align with the first diagonal plane and wherein the second and fourth UAV axes may substantially align with the second diagonal plane; a driveline assembly longitudinally disposed along the central vertical longitudinal plane; and forward and aft latch assemblies operably coupled to the driveline assembly and disposed within the linear bearing forward and aft stations, respectively, wherein the forward and latch assemblies may each comprise a pair of latches; and wherein each of the pair of latches may correspond to the pair of linear bearing assemblies and may releasably couple a UAV when the corresponding ejector plate assembly is in the stowed position, such that upon release of the latch, the corresponding pair of linear bearing assemblies may bias the respective ejector plate assembly from the stowed position to the launch position along the corresponding UAV axis to release the respective UAV from the aircraft.

Each of the pair of linear bearing assemblies may comprise: a pair of linear bearing rods disposed in parallel; a pair of linear bearings slidably coupled to the corresponding pair of linear bearing rods; and a pair of coil springs surrounding the corresponding pair of linear bearing rods.

The linear bearing forward and aft stations may each comprise: a pair of support brackets disposed in parallel, and each of the pair of support brackets may further comprise: first ends coupled to proximal ends of the first respective pair of linear bearing assemblies and second ends coupled to proximal ends of the second respective pair of linear bearing assemblies; wherein the first and second ends of the pair of support brackets may be angled at the first and second angles, respectively, with respect to the central vertical longitudinal plane.

Each of the four ejector plate assemblies may comprise: an ejector plate adapted to substantially cover the corresponding first, second, third, and fourth UAV openings and adapted for inverted mounting and launching of an associated UAV; and a pair of support plates orthogonally coupled to the ejector plate and disposed in parallel to fasten the corresponding pair of linear bearings.

The driveline assembly may comprise: a pair of driveshafts longitudinally disposed in parallel relation; a pair of servomotors operably coupled to proximal ends of the pair of driveshafts and configured to actuate the pair of driveshafts in opposing first and second rotating directions; a torsional bias assembly operably coupled to the pair of driveshafts and configured to aid in exerting a constant torque when the pair of driveshafts rotate in their respective first and second rotating directions; a first pair of cams disposed in somewhat parallel relation to each other and fixedly and non-rotatably mounted to proximal portions of the pair of driveshafts; and a second pair of cams disposed in somewhat parallel relation to each other and fixedly and non-rotatably mounted to distal portions of the pair of driveshafts; wherein each of the cams may comprise a corresponding cam flange portion to create respective inner and outer circumferential cam surfaces, the inner and outer circumferential cam surfaces respectively defining a cam inner thickness and cam outer thickness.

The torsional bias assembly may comprise: a pair of spring storage drums rotatably mounted to the pair of driveshafts and configured to freely rotate therein; a pair of torsion drums fixedly and non-rotatably mounted to the pair of driveshafts; and a pair of constant force torsional springs having first ends fixedly engaged the pair of torsion drums and second ends rotatably engaged with the pair of spring storage drums, such that the pair of constant force torsional springs may urge the pair of torsion drums in the opposing first and second rotating directions.

Each of the forward and aft latch assemblies may further comprise: forward and aft latch housings, respectively, each having bilateral symmetry along the central vertical longitudinal plane, and comprising: a pair of arm portions, each having a two-prong end, configured to engage a UAV bar lug, and each being angled at the corresponding first and second angles with respect to the central longitudinal plane; and a latch middle section corresponding to forward and aft latch middle sections, each latch middle section, comprising a pair of driveshaft openings adapted to permit the pair of driveshafts to freely rotate therein; wherein the first pair of cams may be adjacent to the pair of driveshaft openings at opposing sides of the forward latch housing, and wherein the second pair of cams may be adjacent to the pair of driveshaft openings at opposing sides of the aft latch housing; wherein the pair of latches may correspond with the pair of arm portions, such that each of the pair of latches may correspond with each of the pair of arm portions of the forward and aft latch assemblies, each of the latches comprising: lock and release mechanisms; wherein each of the lock mechanisms comprises: a lock latch pivotally mounted to a first side of either the forward and aft latch housings and configured to pivot between locked and unlocked positions relative to the respective arm portion, the lock latch comprising: a lock latch hook end configured to inhibit release of the UAV bar lug from either of the forward and aft latch housings when the lock latch is in the locked position; a lock latch pivot end pivotally coupled to a second pivot disposed along the corresponding first, second, third, or fourth UAV axis; a lock latch travel stop configured to limit movement of the lock latch beyond the locked and unlocked positions; a lock latch return spring coupled to the lock latch and the respective arm portion to urge the lock latch into the locked position; a rocker arm pivotally mounted to the first side of either the forward and aft latch housings and configured to pivot between rocker arm locked and unlocked positions relative to the respective latch middle section and comprising: a linkage end, a rocker arm pivot end pivotally coupled to a third pivot disposed along the central vertical longitudinal plane, and a cam engagement end cammingly engaging the outer circumferential cam surface of a second cam of the first pair of cams, such that as a second driveshaft of the pair of driveshafts rotates in a second rotating direction, the rocker arm pivots from the rocker arm locked position to the rocker arm unlocked position; a linkage pivotally coupled to the linkage end of the rocker arm and the lock latch, such that as the rocker arm pivots from the rocker arm locked position to the rocker arm unlocked position, the lock latch pivots from the locked position to the unlocked position; wherein each of the release mechanisms comprises: a release latch pivotally mounted to a second side of either the forward and aft latch housing and configured to pivot between retaining and release positions relative to the corresponding arm portion, the release latch comprising: a release latch hook end configured to inhibit release of the UAV bar lug from the forward latch housing when the release latch is in the retaining position; a release latch pivot end pivotally coupled to a first pivot disposed along the corresponding first, second, third, or fourth UAV axis; a release latch travel stop configured to limit movement of the release latch beyond the retaining and release positions; a cam engagement portion cammingly engaging the inner circumferential cam surface of a first cam of the pair of cams, such that as a first driveshaft of the pair of driveshafts rotates in a first rotating direction, the first cam may rotate against the cam engagement portion and pivots the release latch from the retaining position to the release position; and a release latch return spring coupled to the release latch and the corresponding arm portion to urge the release latch into the retaining position.

The multiple UAV jettison apparatus may further comprise: one or more manual ejection assemblies, each comprising: a manual ejection button slidably disposed within a manual ejection opening located on the fairing above the corresponding UAV opening; a manual ejection rod guide positioned near a distal end of the manual ejection button; lock latch and release latch manual ejection rods in parallel relation and having first ends coupled to the distal end of the manual ejection button, wherein a second end of the lock latch manual ejection rod may be positioned near a corresponding lock latch manual ejection pin coupled to a respective rocker arm extension, and wherein a second end of the release latch manual ejection rod may be positioned near a corresponding release latch manual ejection pin coupled to a respective release latch extension; and lock and release latch springs surrounding the lock latch and release latch manual ejection rods, respectively, both disposed between the manual ejection rod guide and the distal end of the manual ejection button to provide biasing to the manual ejection button.

Each ejector plate assembly may further comprise: a stowed stroke stop assembly coupled between each of the pair of support plates and comprising a release latch face and a lock latch face, wherein, when each of the ejector plate assembly moves between their stowed and launch positions; (1) the associated release latch face may move along a corresponding release latch close axis and (2) the associated lock latch face may move along a corresponding lock latch close axis; wherein each of the latches may further comprise: (i) a release latch close assist pin coupled to the corresponding release latch and positioned along the respective release latch close axis and (ii) a lock latch close assist pin coupled to the corresponding lock latch and positioned along the respective lock latch close axis; wherein, when each of the ejector plate assemblies moves from their respective launch position to their respective stowed position, (a) the respective release latch face may engage the corresponding release latch close assist pin and may pivot the associated release latch from its release position to the retaining position and (b) the respective lock latch face may engage the corresponding lock latch close assist pin and may pivot the associated lock latch from its unlocked position to the locked position, such that the release latch hook end of the associated release latch and the lock latch hook end of the associated lock latch may clamp around the corresponding UAV bar lug.

The advantage of the multiple UAV jettison apparatus disclosed herein generally lies in its ability to transport multiple multirotor UAVs while minimizing drag. Specifically, embodiments of the multiple UAV jettison apparatus may be configured to couple and stow multiple UAVs beneath a larger aircraft such as a larger UAV. While stowed, upper portions of the UAVs may protrude, allowing various types of UAVs for transport, including multirotor UAVs. Upon jettison of each UAV, the ejector plates used to mount the UAVs may drop and align with the fairing to reduce drag beneath the aerodynamic surface of the aircraft.

It is an object to provide a multiple UAV jettison apparatus that may accommodate multiple UAV payloads, including multirotor UAVs. Thus, embodiments of the multiple UAV jettison apparatus may allow a larger UAV to transport and jettison one or more multirotor UAVs.

It is an object to provide a multiple UAV jettison apparatus having an aerodynamic surface that reduces drag even after jettisoning one or more UAVs from the aircraft.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without the components or steps, which are illustrated. When the same numeral appears in different drawings, it is intended to refer to the same or like components or steps.

DETAILED DESCRIPTION OF ILLUSTRATIVE EMBODIMENTS

Figure 1:
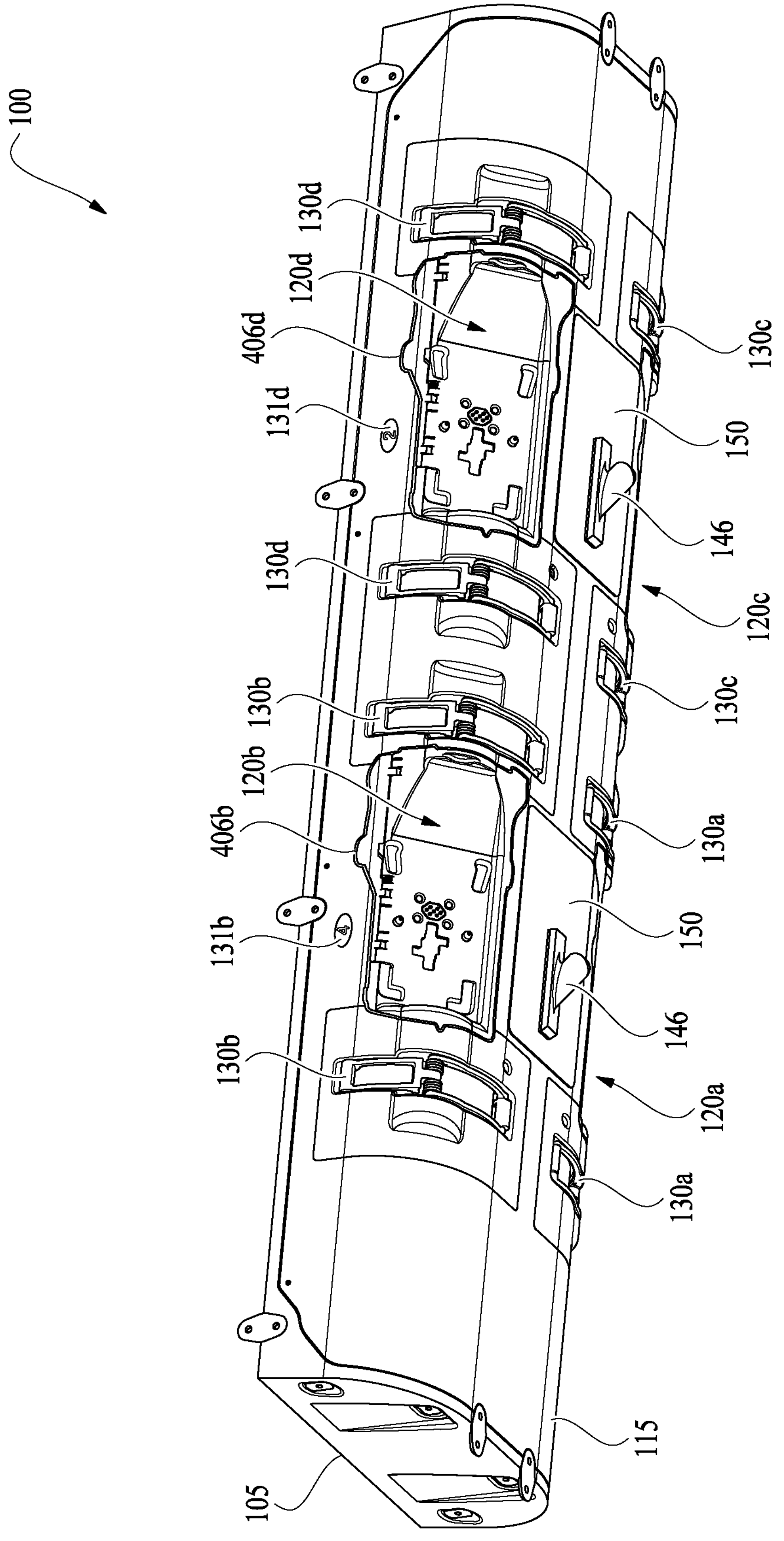
FIG. 1 is an illustration of a perspective view of one embodiment of a multiple UAV jettison apparatus.

In the following detailed description, numerous specific details are set forth to provide a thorough understanding of various aspects of one or more embodiments of the multiple unmanned aerial vehicle (UAV) jettison apparatus. However, these embodiments may be practiced without some or all these specific details. In other instances, well-known methods, procedures, or components have not been described in detail so as not to unnecessarily obscure the aspects of these embodiments.

Before the embodiments are disclosed and described, it is to be understood that these embodiments are not limited to the structures, process steps, or materials disclosed herein, but is extended to equivalents thereof as would be recognized by those ordinarily skilled in the relevant arts. It should also be understood that terminology used herein is used for the purpose of describing embodiments only and is not intended to be limiting.

Reference throughout this specification to "one embodiment," "an embodiment," or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . , to provide a thorough understanding of the embodiments. One skilled in the relevant art will recognize, however, that the scope of protection can be practiced without one or more of the specific details, or with other methods, components, materials, etc. . . . . In other instances, well-known structures, materials, or operations are generally not shown or described in detail to avoid obscuring aspects of the disclosure.

Definitions

In the following description, certain terminology is used to describe certain features of the embodiments of a multiple UAV jettison apparatus. For example, as used herein, unless otherwise specified, the terms "unmanned aircraft," "unmanned aerial vehicle," "unmanned aerial system," "multirotor," "multirotor UAV," "UAS," "UAV," and "drone" generally refer to any unmanned aircraft capable of being piloted without an onboard human pilot and may include multirotor UAVs. The UAVs may be controlled remotely or autonomously via an onboard computer or the like.

As used herein, the term "aircraft" refers to any machine capable of flight and utilizing the multiple UAV jettison apparatus for transport and jettison of one or more UAVs. Importantly, an aircraft may also be a UAV, such that the aircraft along with the multiple UAVs for transport/jettison are all UAVs. For example, one embodiment of the aircraft may be a large UAV capable of transporting and ejecting multiple smaller UAVs, including multirotor UAVs.

As used herein, the term "substantially" refers to the complete, or nearly complete, extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, the nearness of completion will be to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item if there is no measurable effect thereof.

As used herein, the term "approximately" may refer to a range of values of ±10% of a specific value.

As used herein the term "somewhat" refers to a range of values of ±50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation. As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described. For example, a single numerical value of 5 inches may be interpreted to include not only the explicitly recited value 5, but also include individual values and sub-ranges within the indicated range. Thus, included in this single numerical value are individual values such as 4.8, 4.9, 5.1, and 5.2.

As used herein, the singular forms "a" and "the" may include plural referents, unless the context clearly dictates otherwise. Thus, for example, reference to a "coil spring" can include reference to one or more of such coil springs.

This disclosure relates generally to loading, transport, and deployment apparatuses for multiple UAVs, and more particularly, to apparatuses that jettison multiple UAVs from a single aircraft. For example, one embodiment of the multiple UAV jettison apparatus may allow multiple smaller, multirotor UAVs to be loaded on, transported by, and jettisoned from a larger UAV.

In general, the mission scope of a UAV is limited due to battery power constraints. These limitations affect flight duration and operating ranges. Thus, it is often desirable to transport a UAV to a desired location before operation. One solution is to have a larger aircraft transport and release the UAV at a desired location. The UAV may be carried by the aircraft and, upon its release, may jettison to the desired region and vicinity to perform its purported mission.

Unfortunately, the limited payload space of the larger aircraft may restrict various types of UAVs for transport such as multirotor UAVs. Additionally, upon jettison of the UAV, conventional deployment mechanisms such as bomb bay doors may also negatively affect flight performance of the larger aircraft due to drag by the bomb bay doors.

Importantly, certain mission requirements might require use of multiple UAVs. While it is possible to deploy several large fixed-wing aircrafts where each aircraft transports and releases a single UAV, this approach is generally costly, inefficient, impractical, or complex. Dispatching multiple large aircraft might complicate the mission objective, as multiple operators are needed to run those aircrafts. Also, deploying multiple large aircrafts for a single mission might increase the operator's footprint and thus the likelihood of detection, thereby making it make it more difficult to conduct stealth operations.

Indeed, for these cases, it would be desirable to have a single large aircraft capable of transporting and ejecting several multi-rotor UAVs. However, having multiple UAVs mounted on a single aircraft generally poses some additional challenges. Having multiple UAVs on a single aircraft generally affects the center of gravity of the aircraft, thereby making it generally more difficult to fly or maneuver. Thus, it would be important to have a system that allows several multirotors to be retained and deployed while ensuring the larger aircraft's center of gravity is kept within limits despite dropping significant payload weight.

Accordingly, the embodiments disclosed herein solve these problems by stowing multiple UAVs beneath the aircraft. These UAVs may be stowed and evenly distributed within the fuselage of the larger aircraft, and while stowed, the upper portion of each UAV may protrude, allowing various sizes of UAVs for transport. Thus, upon jettison of the UAVs, the ejector plates may also drop and align with the fairing to reduce the drag.

One purpose of the embodiments may be to retain and eject four multirotor UAVs from the payload bay of a single, larger aircraft to expand the UAVs operational capability and range. Due to the relatively short flight duration of each UAV combined with the desire for UAVs to be potentially equipped for different missions, a maximum number of UAVs that can be integrated in an aircraft is desired. The environment to which the aircraft subjects the UAVs during its operation dictates several critical design parameters to ensure that the UAVs are ejected without risking damage to either the larger aircraft or UAVs. This includes maintaining the aircraft's center of mass throughout the ejections, ensuring the UAVs are securely held in place throughout the aircraft's launch sequence and recovery as well as aerodynamic forces during flight, and ensuring the ejected UAVs do not contact any part of the aircraft during ejection, especially the aircraft's propeller.

In the accompanying drawings, like reference numbers generally indicate like elements. Reference character 100 and variations thereof are used to depict embodiments of the multiple UAV jettison apparatus. Several views are presented to depict some, though not all, of the possible orientations of the embodiments of the multiple UAV jettison apparatus.

FIG. 1 is an illustration of a perspective view of one embodiment of a multiple UAV jettison apparatus 100. As shown in FIG. 1, one embodiment of the multiple UAV jettison apparatus 100 may comprise: a payload bay 105, fairing 115, ejector plate assemblies 120*a*, 120*b*, 120*c*, 120*d*, propeller holders 130*a*, 130*b*, 130*c*, 130*d*, manual ejection buttons 131*b*, 131*d* (131*a*, 131*c* shown in FIG. 6), antennas 146, and ground planes 150.

The payload bay 105 may serve as a large compartment area for an aircraft, in which payloads and their support equipment may be carried and transported. An exemplary embodiment of the payload bay 105 may couple to or integrate with the fuselage of the aircraft and may be uninterrupted by engines or any other aircraft-related items. For example, one embodiment of the payload bay 105 may be sufficiently large to accommodate multiple UAVs, including multirotor UAVs. As such, the term "payload bay" may be generic to any number of applications where the bay is used to carry or transport various types of UAVs and their support equipment.

The fairing 115 may serve as the outer structure of the aircraft used to cover the inner space of the payload bay 105. The fairing 115 is preferably smooth to reduce aerodynamic drag while minimizing any changes to the aircraft's center of pressure to ensure flight safety. A smooth outer structure for the fairing 115 is also desirable, as it prevents or minimizes any damage caused by snags during aircraft recovery, as for example, from a recovery rope. Thus, the fairing 115 is preferably aerodynamic to minimize disruption to the airflow over a surface.

Importantly, FIG. 1 shows that the multiple UAV jettison apparatus 100 may also comprise multiple ejector plate assemblies 120*a*, 120*b*, 120*c*, 120*d*, each being associated with a respective UAV opening 121*a*, 121*b*, 121*c*, 121*d* (shown in FIG. 4) for mounting and transporting a UAV. Each UAV opening 121*a*, 121*b*, 121*c*, 121*d* may be sized and dimensioned to fit an ejector plate 405*a*, 405*b*, 405*c*, 405*d* (shown in FIG. 4) of an ejector plate assembly 120*a*, 120*b*, 120*c*, 120*d*, and each ejector plate 405*a*, 405*b*, 405*c*, 405*d* may be used to align a respective UAV. An exemplary embodiment of the fairing 115 may comprise four ejector plates 120*a*, 120*b*, 120*c*, 120*d* to accommodate four UAVs, all of which are preferably diametrically opposed with respect to each other along the payload bay 105, as shown. The four ejector plates 120*a*, 120*b*, 120*c*, 120*d* may also be in a parallel configuration and somewhat equidistant to each other to provide even weight distribution around the center gravity of the aircraft and along the payload bay 105. In multiple embodiments, the fairing 115 may be constructed of various materials such as a metal or a reinforced polymer.

The ejector plate assemblies 120*a*, 120*b*, 120*c*, 120*d* are preferably spring-loaded and may be designed to substantially cover and fit a respective UAV opening 121*a*, 121*b*, 121*c*, 121*d* of the fairing 115, such that each ejector plate assembly 120*a*, 120*b*, 120*c*, 120*d* may have an outer shape sized and dimensioned like the outer contour of the aircraft. Each ejector plate assembly 120*a*, 120*b*, 120*c*, 120*d* may also be used for mounting a UAV in an inverted manner for transport and may be configured to move vertically between a stowed position (i.e., up and inwards towards the inner space of the payload bay 105) and a launch position (i.e., down and outwards covering a respective UAV opening 121*a*, 121*b*, 121*c*, 121*d* of the fairing 115). In addition to having an outer surface that conforms with the external contour of the fairing 115, each ejector plate assembly 120*a*, 120*b*, 120*c*, 120*d* may also comprise an ejector plate flap 406*a*, 406*b*, 406*c*, 406*d* (shown in FIGS. 18A to 18C) operably coupled to the ejector plate 405 to provide additional clearance when mounting a UAV. Additional details of the ejector plate flap 406*a*, 406*b*, 406*c*, 406*d* and ejector plate assemblies 120*a*, 120*b*, 120*c*, 120*d* are discussed further below.

As used herein, the term "stowed position" generally refers to a configuration where the ejector plate assembly 120*a*, 120*b*, 120*c*, 120*d* is positioned within the payload bay 105 inwards from the UAV opening 121*a*, 121*b*, 121*c*, 121*d* of the fairing 115, such that the ejector plate assembly 120*a*, 120*b*, 120*c*, 120*d* is tightly held against one or more coil springs 145 (shown in FIGS. 18A to 18C) and locked into position. The ejector plate assembly 120*a*, 120*b*, 120*c*, 120*d* in the stowed position may also create a recess or space for receiving and fitting a bottom portion of the UAV within the payload bay 105 for transport.

As used herein, the term "launch position" generally refers to a configuration where the ejector plate assembly 120_a_, 120_b_, 120_c_, 120_d_ transitions downwards and outwards to its respective UAV opening 121_a_, 121_b_, 121_c_, 121_d_. In this manner, each ejector plate 405_a_, 405_b_, 405_c_, 405_d_ of the ejector plate assembly 120_a_, 120_b_, 120_c_, 120_d_ is preferably not located within the payload bay 105 and instead, preferably covers their respective UAV opening 121_a_, 121_b_, 121_c_, 121_d_, such that the multiple UAV jettison apparatus 100 lacks a recess for stowing the UAV. Upon transitioning to its respective launch position, the ejector plate assembly 120_a_, 120_b_, 120_c_, 120_d_ may also create a downward force for ejecting or jettisoning the UAV from the aircraft. Preferably, the ejector plate assembly 120_a_, 120_b_, 120_c_, 120_d_ in the launch position may align along the fairing 115 to reduce or minimize aerodynamic drag.

FIG. 1 also shows that embodiments of the multiple UAV jettison apparatus 100 may further comprise manual ejection buttons 131_a_, 131_b_, 131_c_, 131_d_, which, may be subcomponents of the manual ejection assemblies 133_a_, 133_b_, 133_c_, 133_d_, configured to allow a user to manually release a UAV from a respective ejector plate assembly 120_a_, 120_b_, 120_c_, 120_d_ without the need for electrical power. Each manual ejection button 131_a_, 131_b_, 131_c_, 131_d_ may be located near an associated ejector plate assembly 120_a_, 120_b_, 120_c_, 120_d_ and is preferably configured to eject an associated UAV from a corresponding ejector plate assembly 120_a_, 120_b_, 120_c_, 120_d_ by simply depressing the manual ejection buttons 131_a_, 131_b_, 131_c_, 131_d_. Additional details of the manual ejection assemblies 133_a_, 133_b_, 133_c_, 133_d_ are discussed further below.

Furthermore, FIG. 1 shows that embodiments of the multiple UAV jettison apparatus 100 may further comprise antennas 146 and ground planes 150. The antennas 146 are preferably airborne antennas located below the aerodynamic fairing 115 and may be blade-shaped, as shown, to reduce drag. The antennas 146 may also include first and second antennas 146 used to provide communication or telemetry information to a base station, aircraft, or UAV(s). FIG. 1 shows an exemplary embodiment of the antennas 146, which are preferably blade antennas mounted beneath the fairing 115 of the aircraft over a ground plane 150 or larger sheets of metal. A coaxial cable (not shown) may also extend through the ground plane 150 at a selected location. Preferably, the coaxial cable is coupled to a radiating element of the antennas 146.

Preferably, the antennas 146 are dimensioned and configured in a manner that maximizes signal propagation and bandwidth at the desired operating frequency band. For example, in various embodiments, the antennas 146 may operate at different frequencies, such as those in one of the bands HF, VHF, UHF, L, S, C, or other bands. The ground planes 150 are preferably used to minimize changes of the antenna's electrical behavior and to maximize antenna patterns for increasing range communications due to conductive surfaces disposed proximate to the antenna, as for example, when placed on a conductive surface such as a wing, a fuselage, a tail fin, or another part of an aircraft.

FIG. 1 also shows that embodiments of the multiple UAV jettison apparatus 100 may further comprise propeller holders 130_a_, 130_b_, 130_c_, 130_d_ used to secure the propellers of each multirotor UAV when stowed within the multiple UAV jettison apparatus 100. As shown in FIG. 1, each propeller holder 130_a_, 130_b_, 130_c_, 130_d_ may share a common point of rotation to ensure that the propeller holder 130_a_, 130_b_, 130_c_, 130_d_ does not contact each other during rotation. To further minimize the footprint of the propeller holders 130_a_, 130_b_, 130_c_, 130_d_, the general shape of each propeller holder 130_a_, 130_b_, 130_c_, 130_d_ is preferably contoured to conform with the general shape of the fairing 115 to maintain aerodynamic efficiency. The length of each propeller holder 130_a_, 130_b_, 130_c_, 130_d_ is also preferably short to minimize weight, and accommodate the payload bay's geometry restrictions. Additionally, the propeller holders 130_a_, 130_b_, 130_c_, 130_d_ are preferably configured to secure the propellers of each multirotor UAV, such that during transit of the aircraft 200, the propellers are not rotating due to the aerodynamic forces causing degradation to the motors. In another embodiment, the propellers of each multirotor UAV could be restrained by electrical power of the motors, but due to power consumption, it may not be desired due to the quantity of power required and the heat generated.

Figure 2:
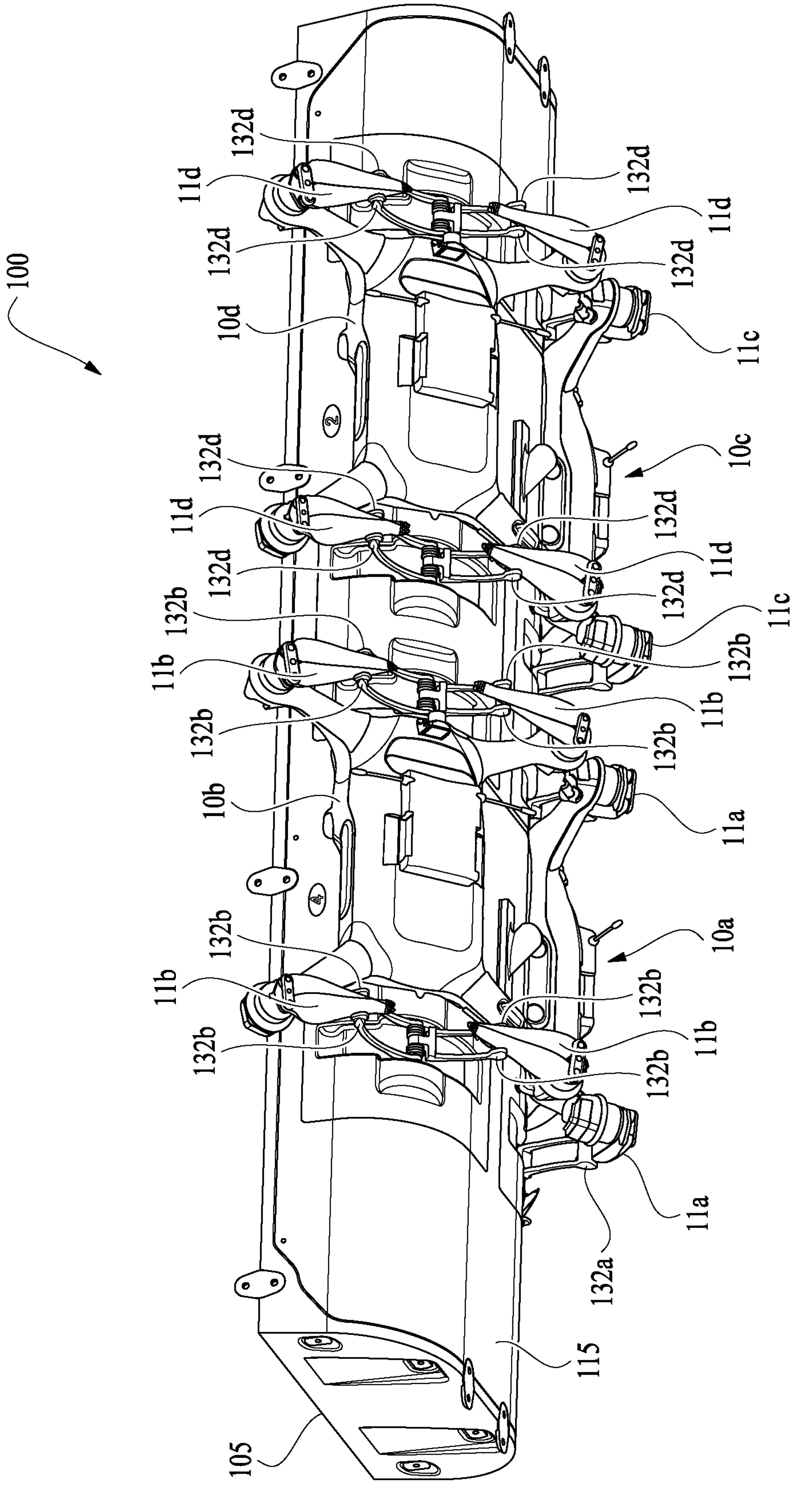
FIG. 2 is an illustration of a perspective view of one embodiment of a multiple UAV jettison apparatus and shows multiple UAVs mounted to the multiple UAV jettison apparatus in stowed positions.

FIG. 2 is an illustration of a perspective view of one embodiment of a multiple UAV jettison apparatus 100 and shows multiple UAVs 10_a_, 10_b_, 10_c_, 10_d_ mounted to the multiple UAV jettison apparatus 100 in stowed positions. As shown in FIG. 2, one embodiment of the multiple UAV jettison apparatus 100 may comprise a payload bay 105, which may be configured to removably attach to a fuselage of an aircraft, or in other embodiments, may be integrated into the fuselage of the aircraft. Importantly, FIG. 2 also shows how multiple UAVs 10_a_, 10_b_, 10_c_, 10_d_ may releasably couple to the multiple UAV jettison apparatus 100. Each UAV 10_a_, 10_b_, 10_c_, 10_d_ may be initially inverted and have its bottom portion contact their respective ejector plate assembly 120_a_, 120_b_, 120_c_, 120_d_. From there, an upward force may be applied to each UAV 10_a_, 10_b_, 10_c_, 10_d_ until the corresponding ejector plate assembly 120_a_, 120_b_, 120_c_, 120_d_ transitions from its launch position to its respective stowed position.

FIG. 2 also shows the orientation of each UAV 10_a_, 10_b_, 10_c_, 10_d_ when stowed within the multiple UAV jettison apparatus 100. When in the stowed position, the bottom portion of each UAV 10_a_, 10_b_, 10_c_, 10_d_ is preferably stored within the payload bay 105, whereas the upper portion of each UAV 10_a_, 10_b_, 10_c_, 10_d_ may be exposed. This configuration may expose the propellers and rotors of the UAVs 10_a_, 10_b_, 10_c_, 10_d_ to allow various UAV payloads to be transported. The exposed upper portions of the UAVs 10_a_, 10_b_, 10_c_, 10_d_ may also allow potential sensors and transmitters to be activated during flight (e.g., GPS signals) to allow GPS tracking prior to deployment of the UAVs 10_a_, 10_b_, 10_c_, 10_d_. Importantly, the position and orientation of each UAV 10_a_, 10_b_, 10_c_, 10_d_ are preferably evenly distributed along on each side of the aircraft, such that an equal number of UAVs are stowed on each side of the multiple UAV jettison apparatus 100. Thus, in an exemplary embodiment, two UAVs 10_a_, 10_b_, 10_c_, 10_d_ may be stowed on each side of the payload bad 105, thereby allowing the multiple UAV jettison apparatus 100 to carry and transport four UAVs 10_a_, 10_b_, 10_c_, 10_d_, as shown. In this manner, the center of gravity of the larger aircraft may be substantially maintained during the ejections of the UAVs 10_a_, 10_b_, 10_c_, 10_d_. This will preferably ensure that: (1) the UAVs 10_a_, 10_b_, 10_c_, 10_d_ are securely held in place throughout the aircraft's launches well as aerodynamic forces during flight, and that (2) the ejected UAVs 10_a_, 10_b_, 10_c_, 10_d_ do not contact any part of the aircraft during ejection, especially the aircraft's propeller.

Finally, FIG. 2 shows how the propeller holders 130_a_, 130_b_, 130_c_, 130_d_ may secure the propeller blades of each UAV 10_a_, 10_b_, 10_c_, 10_d_ when stowed. As shown in FIG. 2, when the UAVs 10_a_, 10_b_, 10_c_, 10_d_ are in their respective stowed position, the propeller blades 11_a_, 11_b_, 11_c_, 11_d_ of each UAV 10*a*, 10*b*, 10*c*, 10*d* may fold together and rotate away from their respective propeller holders 130*a*, 130*b*, 130*c*, 130*d* to provide clearance. The propeller holders 130*a*, 130*b*, 130*c*, 130*d* may then rotate outwards and have their corresponding top and bottom portions pass through each other toward the fairing 115 until passing their respective propeller blades 11*a*, 11*b*, 11*c*, 11*d* of the UAV 10*a*, 10*b*, 10*c*, 10*d*. From there, the propeller blades 11*a*, 11*b*, 11*c*, 11*d* may rotate back towards the propeller holders 130*a*, 130*b*, 130*c*, 130*d* until the propeller blades 11*a*, 11*b*, 11*c*, 11*d* are directly above their corresponding propeller holder 130*a*, 130*b*, 130*c*, 130*d*. The propeller holders 130*a*, 130*b*, 130*c*, 130*d* may then be slowly released until the propeller holders 130*a*, 130*b*, 130*c*, 130*d* contact and cradle the propeller blades 11*a*, 11*b*, 11*c*, 11*d* between the end plates 132*a*, 132*b*, 132*c*, 132*d* of the propeller holders 130*a*, 130*b*, 130*c*, 130*d*. Additionally, propeller holders 130*a*, 130*b*, 130*c*, 130*d* may have a torsional spring to provide positive force on the propeller holders 130*a*, 130*b*, 130*c*, 130*d* and to positively capture them within the propeller recesses when deployed.

Figure 3A:
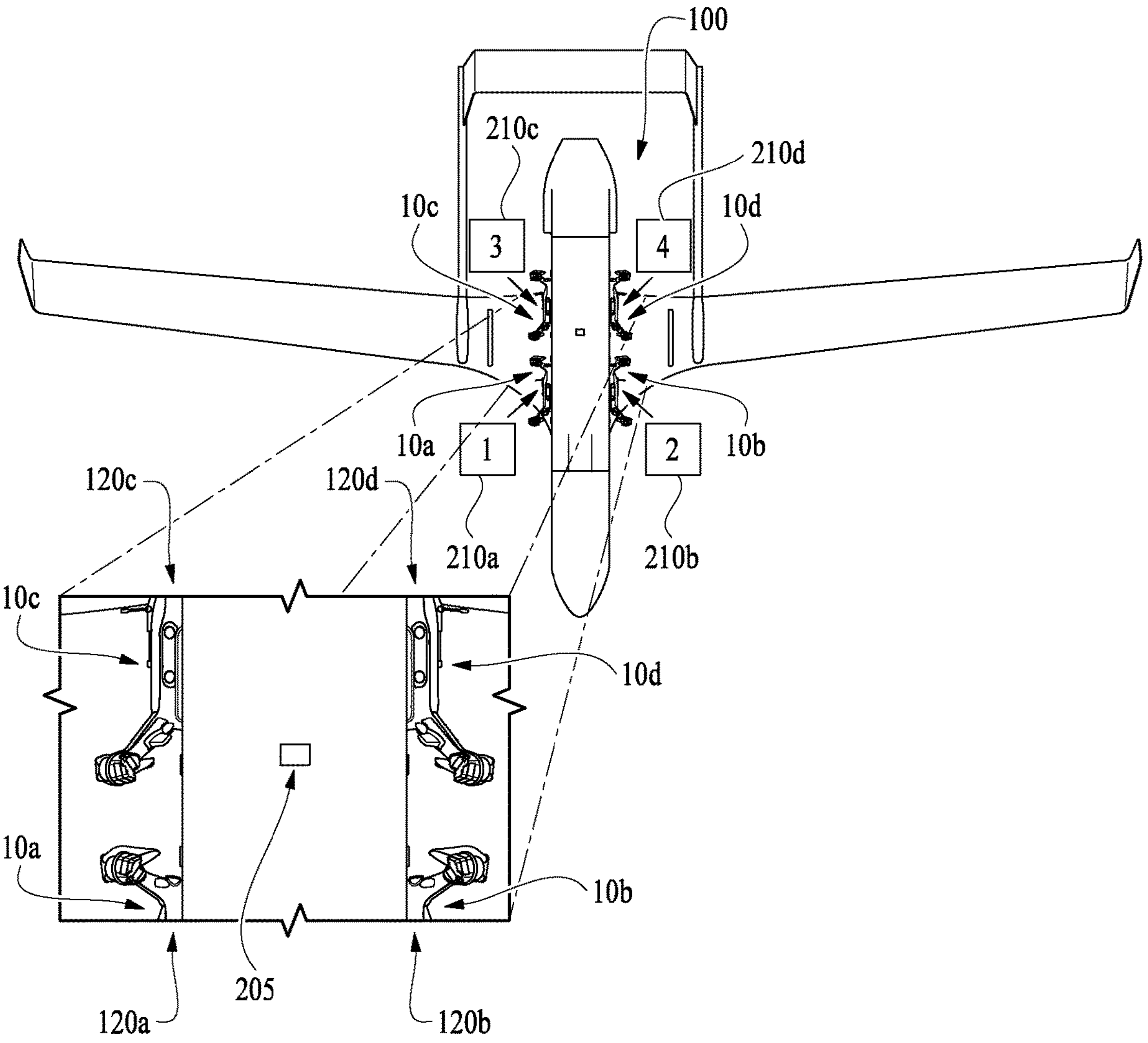
FIGS. 3A and 3B are illustrations of bottom plan and side elevation views, respectively, of embodiments of an aircraft, multiple UAV jettison apparatus, and UAVs and show the location of the center of mass of the aircraft with respect to the multiple UAV jettison apparatus.
Figure 3B:
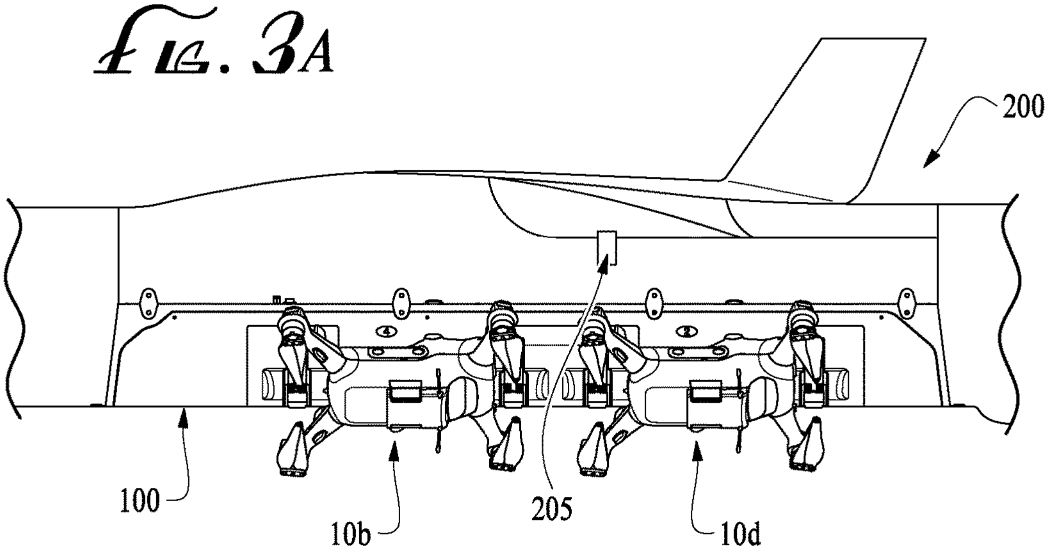

FIGS. 3A and 3B are illustrations of bottom plan and side elevation views of embodiments of an aircraft 200, multiple UAV jettison apparatus 100, and UAVs 10*a*, 10*b*, 10*c*, 10*d* and show the location of the required center of gravity 205 box of the aircraft 200 with respect to the multiple UAV jettison apparatus 100. Specifically, FIG. 3A shows a bottom plan view of the aircraft 200 with the multiple UAV jettison apparatus 100 and four UAVs 10*a*, 10*b*, 10*c*, 10*d* in the stowed position, whereas FIG. 3B depicts a side elevation view thereof.

Figures 18A, 18B, 18C:
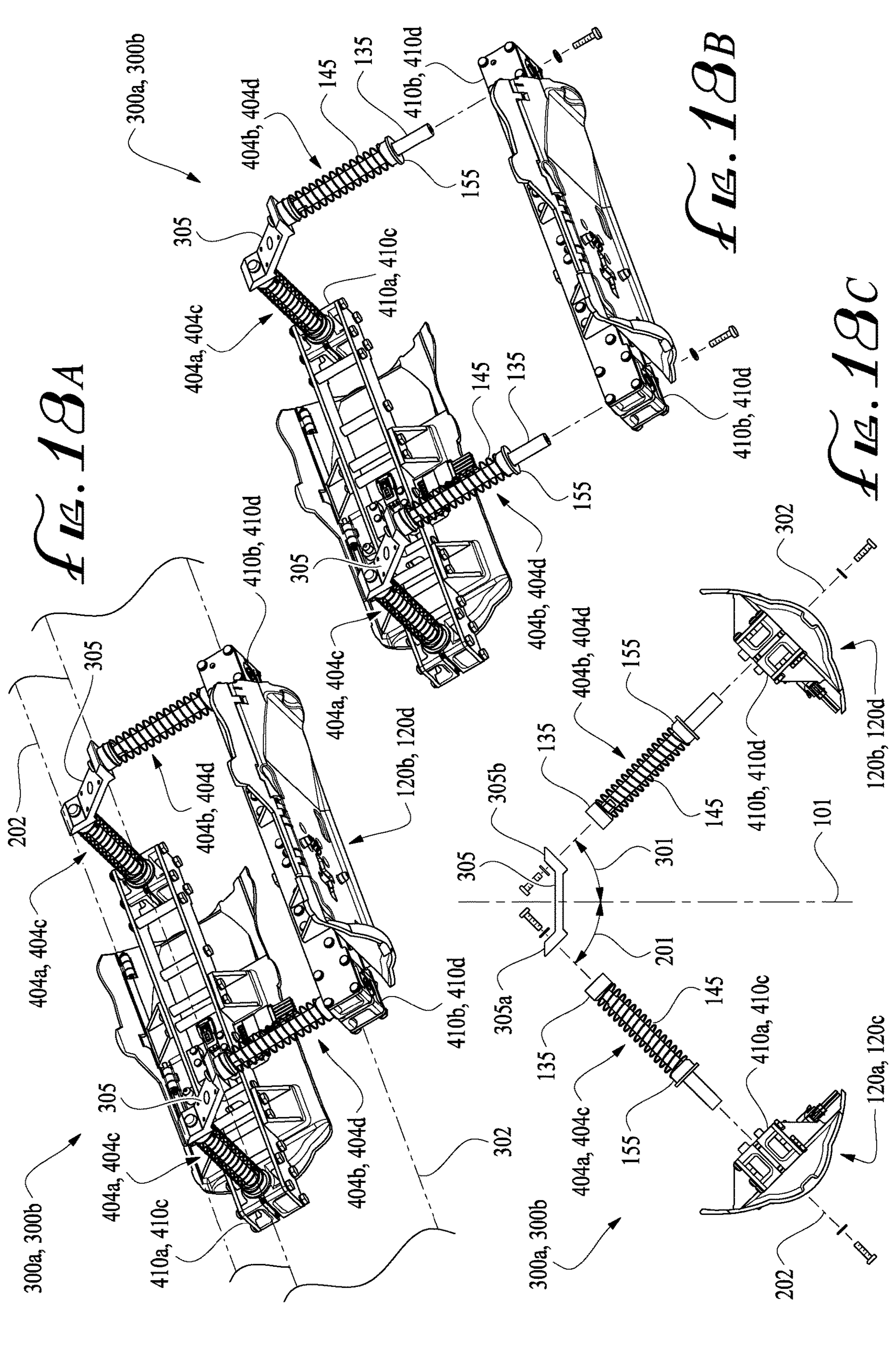
FIGS. 18A to 18C are illustrations of perspective views and a front, exploded view of either a linear bearing forward station or linear bearing aft station and show how a pair of ejector plate assemblies may operably couple to either the linear bearing forward station or linear bearing aft station.

FIG. 3A also depicts the assignment of four UAV stations (i.e., UAV station 1 210*a*, UAV station 2 210*b*, UAV station 3 210*c*, and UAV station 4 210*d*) with respect to the multiple UAV jettison apparatus 100 and aircraft 200, and each UAV station 210*a*, 210*b*, 210*c*, 210*d* may comprise a corresponding ejector plate assembly 120*a*, 120*b*, 120*c*, 120*d*, UAV opening 121*a*, 121*b*, 121*c*, 121*d*, manual ejection assembly 133*a*, 133*b*, 133*c*, 133*d*, and pair of linear bearing assemblies 404*a*, 404*b*, 404*c*, 404*d* (shown in FIGS. 18A to 18C). Specifically, UAV station 1 120*a* preferably corresponds with the first ejector plate assembly 120*a*, first UAV opening 121*a*, first pair of linear bearing assemblies 404*a*, and a first manual ejection assembly 133*a*; UAV station 2 210*b* preferably corresponds with the second ejector plate assembly 120*b*, second UAV opening 121*b*, second pair of linear bearing assemblies 404*b*, and a second manual ejection assembly 133*b*; UAV station 3 210*c* preferably corresponds with the third ejector plate assembly 120*c*, third UAV opening 121*c*, third pair of linear bearing assemblies 404*c*, and a third manual ejection assembly 133*c*; and UAV station 4 210*d* preferably corresponds with the fourth ejector plate assembly 120*d*, fourth UAV opening 121*d*, fourth pair of linear bearing assemblies 404*d*, and the fourth manual ejection assembly 133*d*. Thus, each UAV station 210*a*, 210*b*, 210*c*, 210*d* is designated as a location where a respective UAV 10*a*, 10*b*, 10*c*, 10*d* may be stowed, transported, and deployed from the aircraft 200.

Importantly, FIGS. 3A and 3B show the significance of maintaining the center of gravity 205 or center of mass of the aircraft 200 during launch, transport, and deployment of the UAVs 10*a*, 10*b*, 10*c*, 10*d*. In general, the center of gravity 205 and the center of mass of the aircraft 200 are similar in that both are points within the aircraft at which mass distribution is equal in all directions. However, the center of gravity 205 of the aircraft 200 generally depends upon a gravitational field, whereas the center of mass of the aircraft 200 generally does not depend upon a gravitational field. Notably, the cumulative weight of the UAVs 10*a*, 10*b*, 10*c*, 10*d* with respect to the aircraft weight generally affects the center of gravity 205 of the aircraft 200 substantially in all axes/directions and is generally highly dependent on the geometry in which the UAVs 10*a*, 10*b*, 10*c*, 10*d* are stored, packaged, and transported within the payload bay 105. The aircraft's center of gravity 205 may be further impacted by the size of the UAVs 10*a*, 10*b*, 10*c*, 10*d* (i.e., the UAVs 10*a*, 10*b*, 10*c*, 10*d* may be too large to fit wholly within the payload bay 105 and might partially protrude the outer surface or mold line of the payload bay 105), and the location or position of the UAVs 10*a*, 10*b*, 10*c*, 10*d* with respect to the aircraft 200 may also impact the aircraft's center of gravity 205 (e.g., the location of the UAVs 10*a*, 10*b*, 10*c*, 10*d* are likely off center from the aircraft 200 and not directly below the payload bay 105 or aircraft's center of gravity 205). As a result, in order to package a maximum number of UAVs 10*a*, 10*b*, 10*c*, 10*d* within the payload bay 105 for transport and deployment, the center of gravity 205 of the aircraft 200 should be within the recommended parameters of the manufacturer. Otherwise, the aircraft 200 may lose control during flight, resulting in possible damage to the aircraft 200, property, or personnel injury. As such, the deployment sequence of the UAVs 10*a*, 10*b*, 10*c*, 10*d* from the aircraft 200 is preferably controlled and coordinated, such that the aircraft's center of gravity 205 or center of mass is kept within limits despite dropping significant payload weight.

Accordingly, UAV placement is generally highly dependent on aircraft configuration, as some embodiments of the aircraft 200 may be inherently tail heavy and low in its vertical center of gravity 205 or center of mass window. Also, any ballast added to the payload bay 105 may be generally below the center of gravity 205 box, thereby pulling the center of gravity of the aircraft down further and thus potentially exceeding the manufacturer's center of gravity specification. This may affect the aircraft's maximum takeoff weight and potentially result in the inability of the aircraft 200 to carry sufficient fuel. To address this, the UAVs 10*a*, 10*b*, 10*c*, 10*d* are preferably positioned further inwards within the payload bay 105 as physically possible when stowed. Additionally, the UAVs 10*a*, 10*b*, 10*c*, 10*d* are preferably arranged around the center of gravity 205 of the aircraft and evenly distributed along both sides of the aircraft, such that an equal number of UAVs 10*a*, 10*b*, 10*c*, 10*d* are stowed on each side of the multiple UAV jettison apparatus 100. As such, in an exemplary embodiment of the multiple UAV jettison apparatus 100, two UAVs 10*a*, 10*b*, 10*c*, 10*d* are preferably stowed on each side of the payload bay 105, thereby allowing the multiple UAV jettison apparatus 100 to carry and transport four UAVs 10*a*, 10*b*, 10*c*, 10*d*. In this manner, the center of gravity of the aircraft 200 may be substantially maintained during the deployment of the UAVs 10*a*, 10*b*, 10*c*, 10*d*.

In another embodiment, where center of gravity is more critical, station 1 210*a* would be launched first which would shift the center of gravity of the aircraft 200 to the back, port portion of the center of gravity box 205, followed by station 4 210*d* which would shift the center of gravity of the aircraft 200 to the forward portion of the center of gravity box 205, followed by station 3 210*c*, which will shift the center of gravity 200 to the forward, port portion of the center of gravity box 205, and finally station 2 210*b* which will shift the center of gravity to be back towards the middle of the center of gravity box 205 of the aircraft 200.

Figure 4:
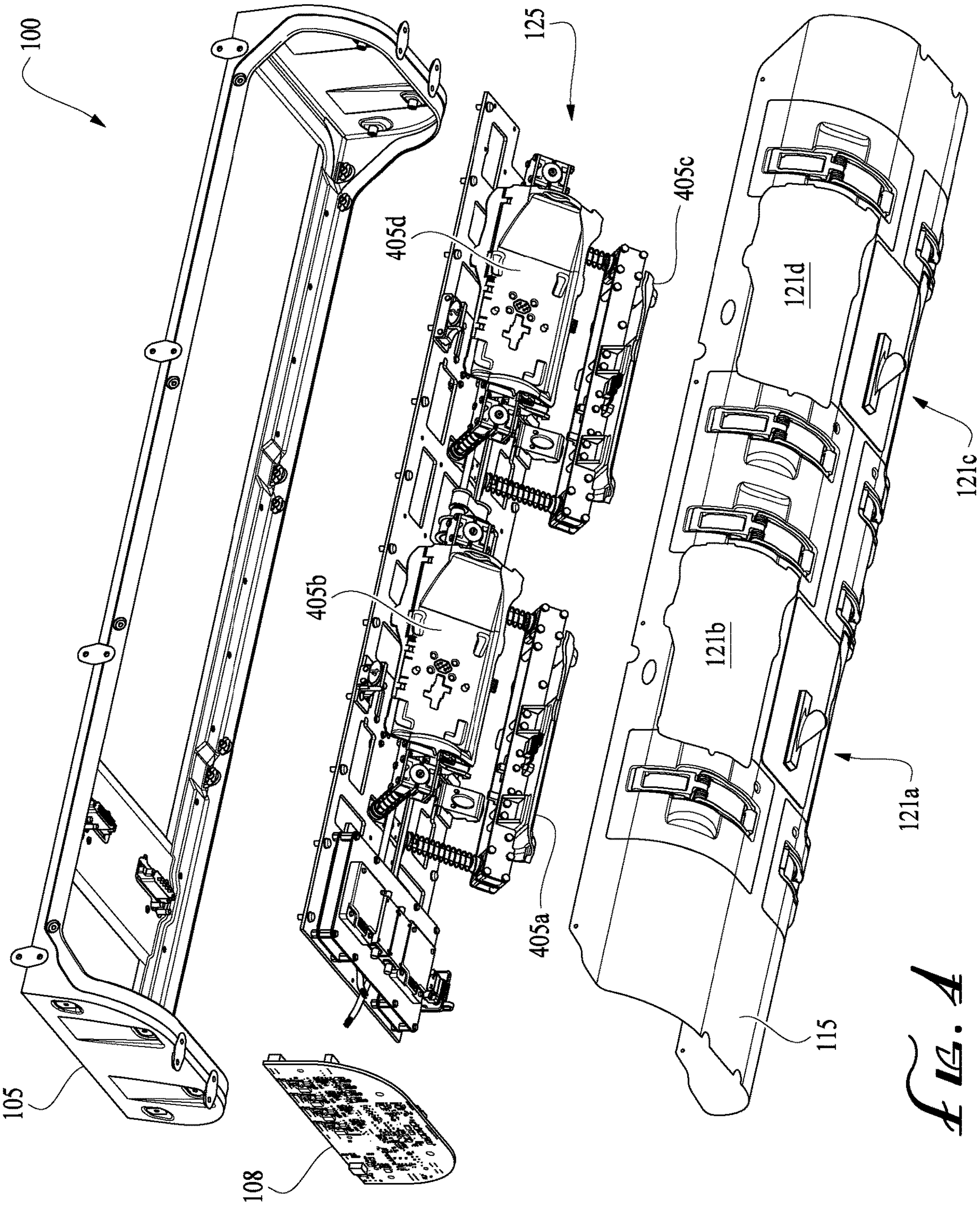
FIG. 4 is an illustration of an exploded view of one embodiment of the multiple UAV jettison apparatus.

FIG. 4 is an illustration of an exploded view of one embodiment of the multiple UAV jettison apparatus 100. As shown in FIG. 4, one embodiment of the multiple UAV jettison apparatus 100 may comprise: a payload bay 105, aircraft interface board 108, fairing 115, and top plate assembly 125. As discussed above, the payload bay 105 generally serves as a large compartment area for the aircraft 200 where payloads and their respective support equipment may be transported. An exemplary embodiment of the payload bay 105, for example, may accommodate several multirotor UAVs 10*a*, 10*b*, 10*c*, 10*d*. The fairing 115 preferably serves as the outer structure of the aircraft 200, and thus, substantially covers the inner space of the payload bay 105. The fairing 115 may also be smooth and aerodynamic to minimize drag.

The aircraft interface board 108 generally provides electrical power from the aircraft 200 to the multiple UAV jettison apparatus 100 and may facilitate communication between the aircraft 200 and multiple UAV jettison apparatus 100. Thus, data and information may transfer between the aircraft 200 and UAVs 10*a*, 10*b*, 10*c*, 10*d* via the aircraft interface board 108. For example, in an embodiment, the user may communicate with the multiple UAV jettison apparatus 100 to control the deployment of the UAVs 10*a*, 10*b*, 10*c*, 10*d* during operation or autonomously. Additionally, the aircraft interface board 108 can also provide switched charging and power delivery to each UAV 10*a*, 10*b*, 10*c*, 10*d*, such that the aircraft 200 can supply the necessary power. The aircraft 200 also provides GPS data and a link to the ground control station such that the UAVs 10*a*, 10*b*, 10*c*, 10*d* do not require large radios.

Notably, FIG. 4 shows the top plate assembly 125, which generally possesses the main components that operate the multiple UAV jettison apparatus 100. These components generally include the driveline assembly 400 (shown in FIG. 7), UAV stations 210*a*, 210*b*, 210*c*, 210*d*, (shown in FIG. 3A) and related components thereof. As mentioned above, a "UAV station" 210*a*, 210*b*, 210*c*, 210*d* generally refers to a designated location on the multiple UAV jettison apparatus 100 capable of housing, stowing, or deploying a single UAV 10*a*, 10*b*, 10*c*, 10*d*. Each UAV station 210*a*, 210*b*, 210*c*, 210*d* is also generally associated with a UAV opening 121*a*, 121*b*, 121*c*, 121*d*. Additional details of the top plate assembly 125 is discussed below.

Figure 5:
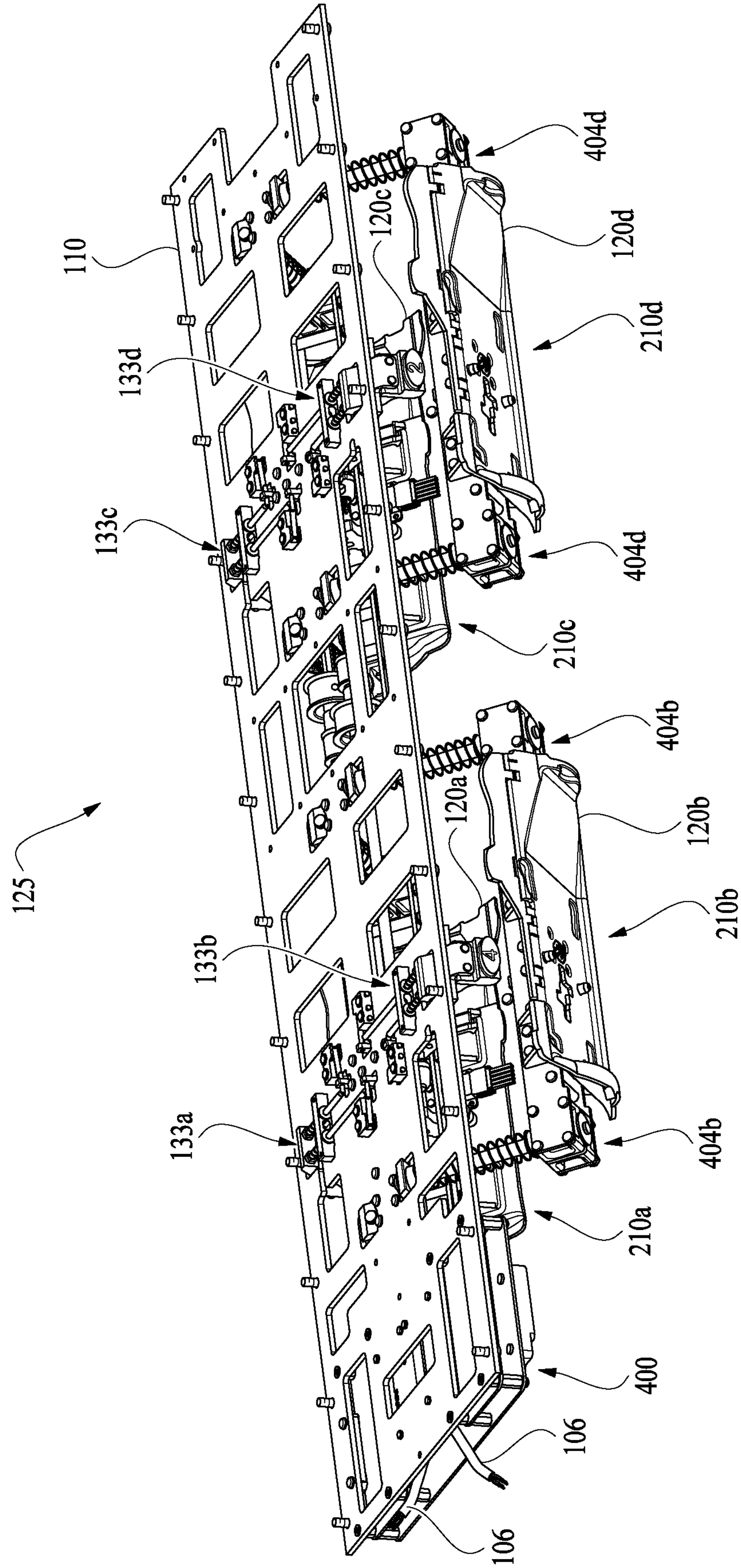
FIG. 5 is an illustration of a perspective view of one embodiment of the top plate assembly.

FIG. 5 is an illustration of a perspective view of one embodiment of the top plate assembly 125. As shown in FIG. 5, one embodiment of the top plate assembly 125 may comprise a top plate 110, driveline assembly 400 and four UAV stations 210*a*, 210*b*, 210*c*, 210*d*. As recited above, each UAV station 210*a*, 210*b*, 210*c*, 210*d* may comprise a respective ejector plate assembly 120*a*, 120*b*, 120*c*, 120*d*, respective pairs of linear bearing assemblies 404*a*, 404*b*, 404*c*, 404*d*, and corresponding manual ejection assembly 133*a*, 133*b*, 133*c*, 133*d*. Each UAV station 210*a*, 210*b*, 210*c*, 210*d* is also generally associated with a UAV opening 121*a*, 121*b*, 121*c*, 121*d*, shown in FIG. 4.

The top plate 110 may couple within the inner space of the payload bay 105 (preferably within the fuselage of the aircraft 200) and may be in an area proximate to where the UAVs 10*a*, 10*b*, 10*c*, 10*d* may be stowed and transported beneath the aircraft 200. The top plate 110 may also be positioned in an area that substantially affects the center of gravity 205 or center of mass of the aircraft 200. The top plate 110 preferably serves as a mounting structure for various components of the multiple UAV jettison apparatus 100, including the driveline assembly 400, linear bearing forward station 300*a* (shown in FIG. 6), linear bearing aft station 300*b* (shown in FIG. 6), forward latch assembly 600 (shown in FIG. 6), aft latch assembly 700 (shown in FIG. 6), ejector plate assemblies 120*a*, 120*b*, 120*c*, 120*d*, linear bearing assemblies 404*a*, 404*b*, 404*c*, 404*d*, and manual ejection assemblies 133*a*, 133*b*, 133*c*, 133*d*.

Finally, the top plate assembly 125 may be in electrical communication with the aircraft interface board 108 via cable harnesses 106 to receive electrical power from the aircraft 200. The top plate assembly 125 may also be configured to transmit and receive telemetry data for operation of the multiple UAV jettison apparatus 100.

Figure 6:
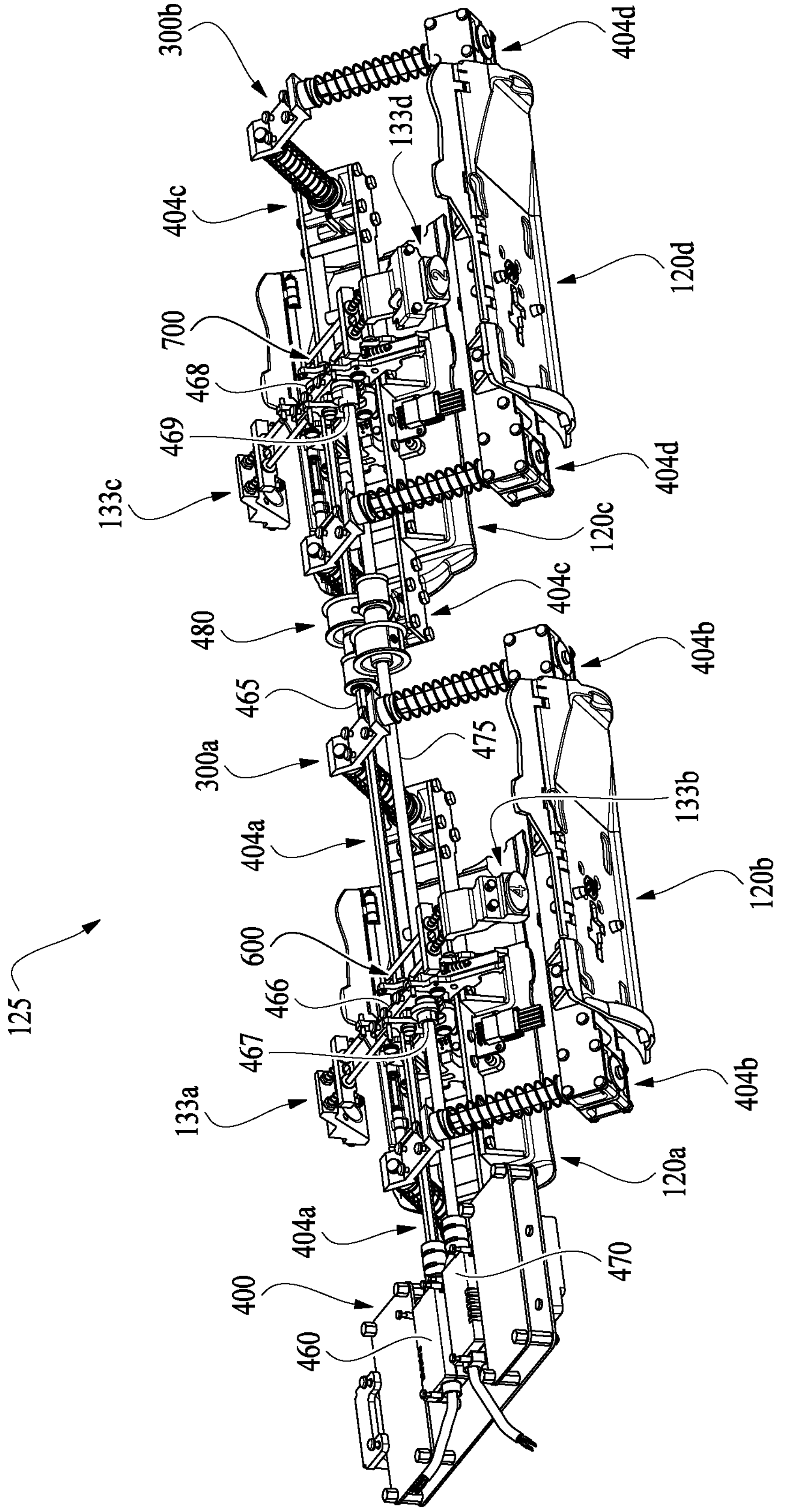
FIG. 6 is an illustration of a perspective view of one embodiment of the top plate assembly without the top plate.

FIG. 6 is an illustration of a perspective view of one embodiment of the top plate assembly 125 without the top plate 110. As shown in FIG. 6, an embodiment of the top plate assembly 125 may comprise a driveline assembly 400 having a first servomotor 460, second servomotor 470, first driveshaft 465, second driveshaft 475, and torsional bias assembly 480. Details of the driveline assembly 400 are discussed further below. FIG. 6 also shows that the top plate assembly 125 may also comprise a linear bearing forward station 300*a*, linear bearing aft station 300*b*, forward latch assembly 600, aft latch assembly 700, ejector plate assemblies 120*a*, 120*b*, 120*c*, 120*d*, linear bearing assemblies 404*a*, 404*b*, 404*c*, 404*d*, and manual ejection assemblies 133*a*, 133*b*, 133*c*, 133*d*.

Without the top plate 110, FIG. 6 shows how the driveline assembly 400 may be operably coupled to the forward latch assembly 600 and aft latch assembly 700 via driveshafts 465, 475 and cams, which may include a first cam 466, second cam 467, third cam 468, and fourth cam 469. In particular, the first cam 466 and third cam 468 may be fixedly attached to the first driveshaft 465, whereas the second cam 467 and fourth cam 469 may be fixedly attached to the second driveshaft 470. In this manner, the first servomotor 460 preferably rotates the first cam 466, third cam 468, and first driveshaft 465 in a first rotating direction 465*b* (shown in FIG. 7) in unison, whereas the second servomotor 470 preferably rotates the second cam 467, fourth cam 469, and second driveshaft 475 in a second rotating direction 475*b* (shown in FIG. 7) in unison. Also, FIG. 6 shows the second cam 467 and the fourth cam 469 operably coupled to the front or forward sides of the forward latch assembly 600 and aft latch assembly 700, respectively. Conversely, the first cam 466 and third cam 468 may be operably coupled to the back or rear sides of the forward latch assembly 600 and aft latch assembly 700, respectively.

Finally, FIG. 6 also shows that, in some embodiments, much of the components of the top plate assembly 125 may be positioned near the forward portion of the payload bay 105. Because some embodiments of the aircraft 200 may be inherently tail heavy, the weight located near the forward portion of the multiple UAV jettison apparatus 100 may bias and balance against the other weight of the aircraft 200, thereby promoting weight distribution that allows the aircraft 200 to carry more payload weight (e.g., UAVs 10*a*, 10*b*, 10*c*, 10*d*).

Figure 7:
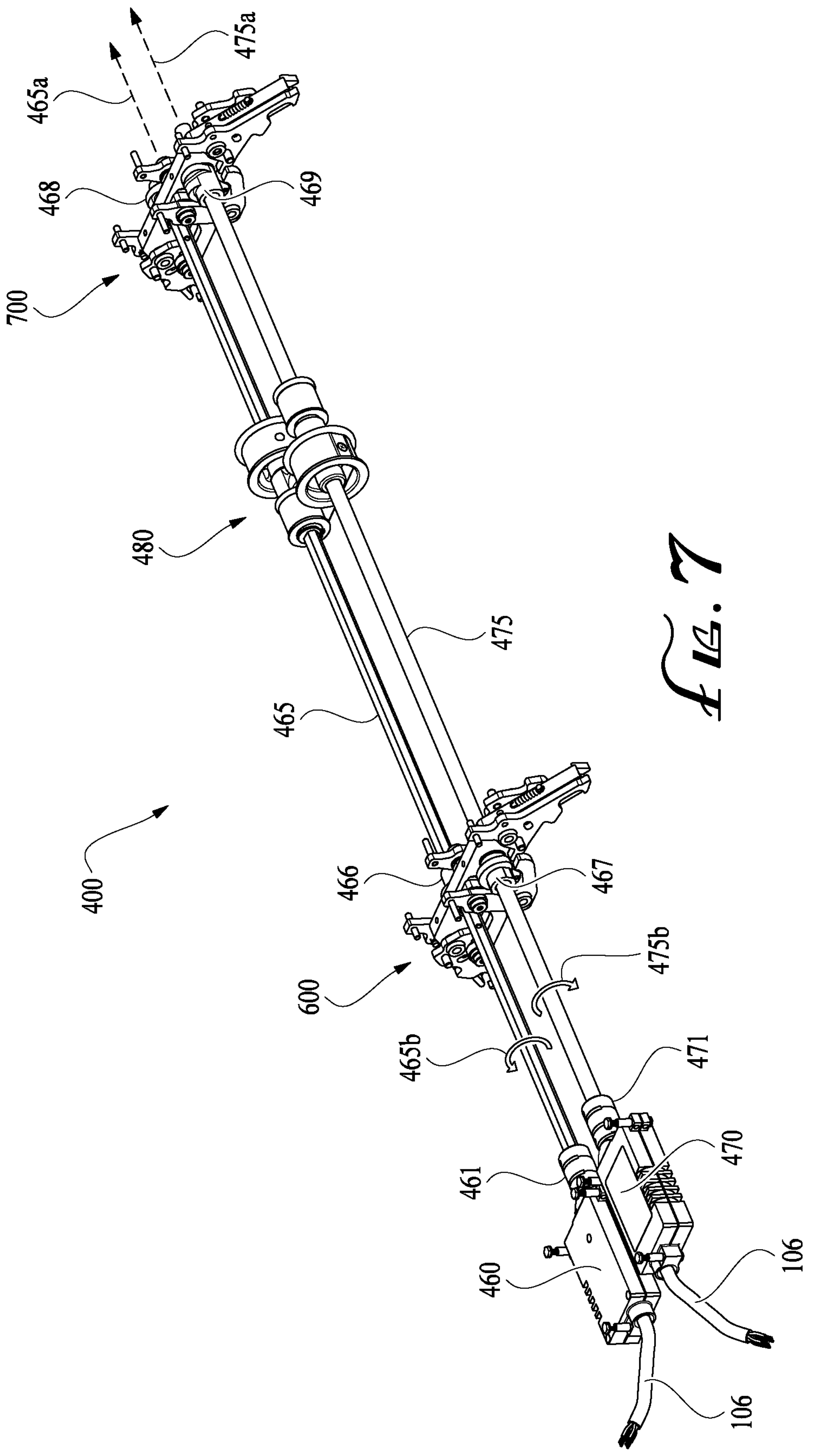
FIG. 7 is an illustration of a perspective view of the driveline assembly and shows the forward latch assembly and aft latch assembly operably coupled to the driveline assembly.

FIG. 7 is an illustration of a perspective view of the driveline assembly 400 and shows the forward latch assembly 600 and aft latch assembly 700 operably coupled to the driveline assembly 400. As shown in FIG. 7, an embodiment of the driveline assembly 400 may comprise: first and second servomotors 460, 470, driveline couplers 461, 471, first and second driveshafts 465, 475, torsional bias assembly 480, and first, second, third, and fourth cams 466, 467, 468, 469.

The driveline assembly 400 may deliver rotational energy from the first and second servomotors 460, 470 to the first and second driveshafts 465, 475, respectively. In this manner, the first and second servomotors 460, 470 may actuate the cams 466, 467, 468, 469 and latch mechanisms of the forward and aft latch assemblies 600,700. As shown in FIG. 7, to mechanically restrict the order or sequence to which the UAVs 10*a*, 10*b*, 10*c*, 10*d* are deployed, the driveline assembly 400 may utilize the two driveshafts 465, 475 to control the cam system. Importantly, by utilizing only two servomotors 460, 470 and two driveshafts 465, 475, which may be less complex and less heavy, (rather than having each UAV station 210*a*, 210*b*, 210*c*, 210*d* utilize two servomotors), the two driveshafts 465, 475 and four cams 466, 467, 468, 469 may serve as a redundant step to prevent inadvertent release of a UAV 10*a*, 10*b*, 10*c*, 10*d*.

FIG. 7 shows that the first and second driveshafts 465, 475 may be longitudinally disposed in parallel relation to each other along a first central longitudinal axis 465*a* and second central longitudinal axis 475*a*, respectively. The first and second driveshafts 465, 475 may also be aligned along a horizontal plane 462 (shown in FIGS. 17B and 17C) that is transverse to the central vertical longitudinal plane 101 (shown in FIGS. 17C and 18C). In this manner, the first driveshaft 465 and second driveshaft 475 may be positioned on either side of the central vertical longitudinal plane.

FIG. 7 shows that the proximal ends of the first and second driveshafts 465, 475 may be operably coupled to the first and second servomotors 460, 470, respectively, via the driveline couplers 461, 471. Additionally, as described above, the cams 466, 467, 468, 469 may be operably coupled to the driveshafts 465, 475. For example, in an exemplary embodiment as shown, the first cam 466 and second cam 467 may be disposed in somewhat (side-by-side) parallel relation to each other and fixedly and non-rotatably mounted to the proximal portions of the first driveshafts 465 and second driveshaft 475, respectively. Similarly, the third cam 468 and fourth cam 469 may also be disposed in somewhat (side-by-side) parallel relation to each other and fixedly and non-rotatably mounted to the distal portions of the first driveshaft 465 and second driveshaft 475, respectively. As a result, the first cam 466 and third cam 468 may be fixedly attached to the first driveshaft 465, such that when the first servomotor 460 actuates or rotates the first driveshaft 465 in a first rotating direction 465*b*, the first cam 466 and third cam 468 may rotate in that same first rotating direction 465*b* in unison. Similarly, the second cam 467 and fourth cam 469 may be fixedly attached to the second driveshaft 470, such that when the second servomotor 470 actuates or rotates the second driveshaft 475 in a second rotating direction 475*b*, the second cam 467 and fourth cam 469 may likewise rotate in that same second rotating direction 475*b* in unison. Preferably, the first rotating direction 465*b* is opposite from the second rotating direction 475*b*, as shown in FIG. 7.

Each cam 466, 467, 468, 469 may comprise a corresponding cam flange portion, such that each cam 466, 467, 468, 469 comprises an inner circumferential cam surface 466*a*, 467*a*, 468*a*, 469*a* (shown in FIGS. 15A to 15D) and an outer circumferential cam surface 466*b*, 467*b*, 468*b*, 469*b* (shown in FIGS. 15A to 15D). Additionally, each of the inner circumferential cam surfaces 466*a*, 467*a*, 468*a*, 469*a* and outer circumferential cam surfaces 466*b*, 467*b*, 468*b*, 469*b* may define a cam inner thickness and a cam outer thickness, thereby allowing certain latch components of the forward and aft latch assembly 600,700 to overlap and operate alongside each other. Additionally details about how the inner circumferential cam surfaces 466*a*, 467*a*, 468*a*, 469*a* and the outer circumferential cam surfaces 466*b*, 467*b*, 468*b*, 469*b* of the cams 466, 467, 468, 469 interact with the latch components are described further below.

Importantly, FIG. 7 also shows how the cams 466, 467, 468, 469 are operably coupled to the forward latch assembly 600 and aft latch assembly 700. In an exemplary embodiment, the second cam 467 may be fixedly coupled to the second driveshaft 475 and operably coupled to the first side 605*a* or front side of the forward latch assembly 600, whereas the fourth cam 469 may be fixedly coupled to the second driveshaft 475 and operably coupled to the first side 705*a* or front side of the aft latch assembly 700. Similarly, in the same embodiment, the first cam 466 may be fixedly coupled to the first driveshaft 465 and operably coupled to the second side 605*b* or rear side of the forward latch assembly 600, whereas the third cam 468 may be fixedly coupled to the first driveshaft 465 and operably coupled to the second side 705*b* or rear side of the aft latch assembly 700. The cams 466, 467, 468, 469, however, may be operably coupled in other configurations as well.

Finally, FIG. 7 depicts a torsional bias assembly 480. The torsional bias assembly 480 is preferably, operably coupled to the first driveshaft 465 and second driveshaft 475 and may be located between the forward latch assembly 600 and aft latch assembly 700. The torsional bias assembly 480 is also preferably configured to aid the first servomotor 460 and second servomotor 470 by exerting a constant torque in their respective rotating directions. Thus, the torsional bias assembly 480 helps rotate the first driveshaft 465 and second driveshaft 475 in the first rotating direction 465*b* and second rotating direction 475*b*, respectively, to help open the latch mechanisms of the forward latch assembly 600 and aft latch assembly 700. Details of the torsional bias assembly 480 is also discussed below.

Figure 8B:
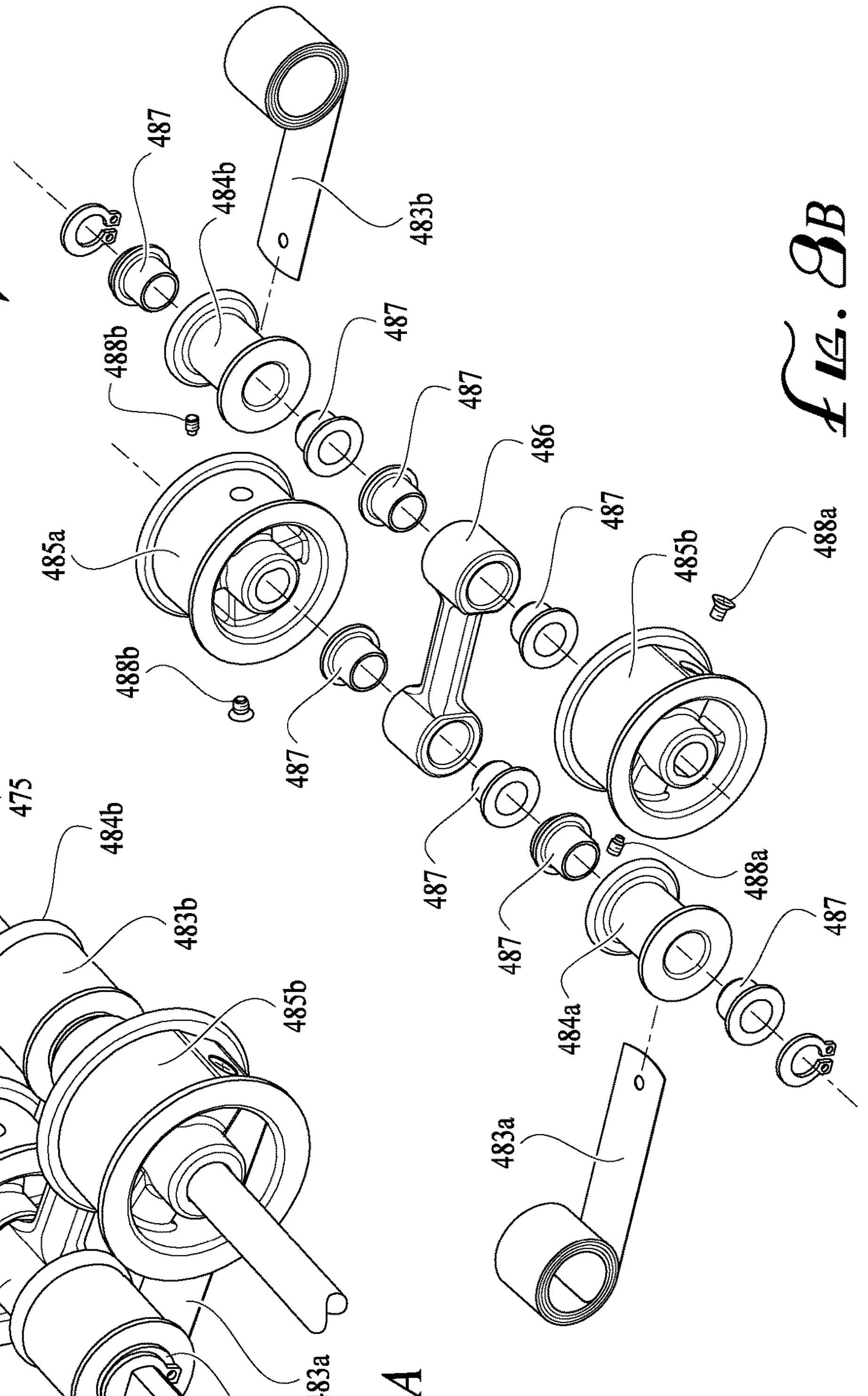
FIGS. 8A and 8B are illustrations of assembled and exploded, perspective views of one embodiment of the torsional bias assembly.
Figure 8A:
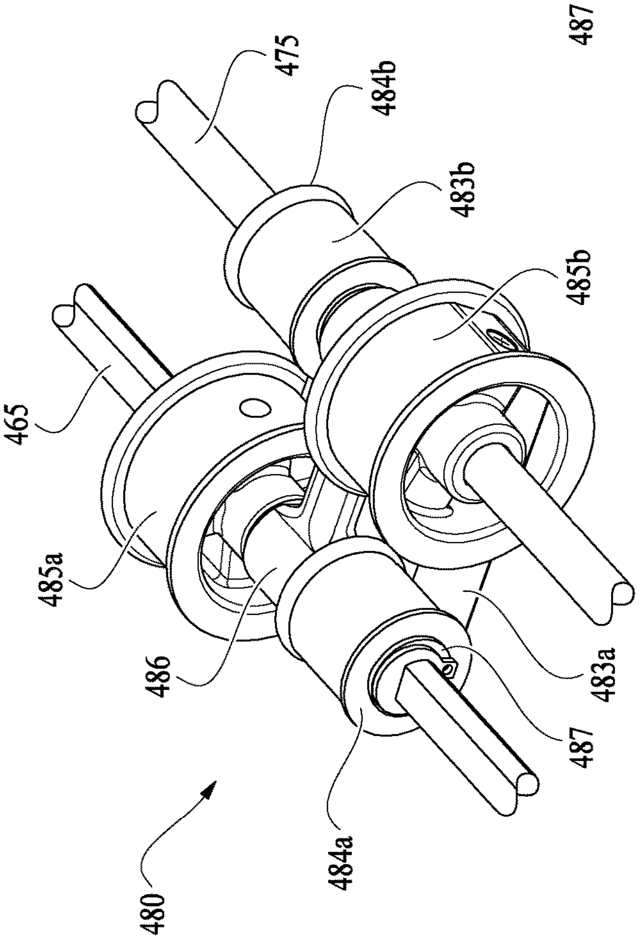

FIGS. 8A and 8B are illustrations of assembled and exploded, perspective views of one embodiment of the torsional bias assembly 480. The torsional bias assembly 480 may operably couple to the first and second driveshafts 465, 475, and in some embodiments, between the forward and aft latch assemblies 600, 700. The torsional bias assembly 480 is also preferably configured to aid in the rotation of the first and second driveshafts 465, 475. When the first and second driveshafts 465, 475 rotate in their respective first and second rotating directions 465*b*, 475*b*, the torsional bias assembly 480 preferably exerts a constant torque towards the first and second driveshafts 465, 475.

As shown in FIGS. 8A and 8B, embodiments of the torsional bias assembly 480 may comprise: constant force torsional springs 483*a*, 483*b*, spring storage drums 484*a*, 484*b*, torsion drums 485*a*, 485*b*, sleeve bearings 487, screw fasteners 488*a*, 488*b*, and a driveshaft spreader 486. The first and second spring storage drums 484*a*, 484*b* may be rotatably mounted to the first and second driveshafts 465, 475, respectively, via sleeve bearings 487, such that the first and second spring storage drums 484*a*, 484*b* may spin or freely rotate on their respective mounted driveshafts 465, 475. Conversely, the first and second torsion drums 485*a*, 485*b* may be fixedly and non-rotatably mounted to the first and second driveshafts 465, 475, such that: (1) the first torsion drum 485*a* and the first driveshaft 465 may rotate in the first rotating direction 465*b* in unison and (2) the second torsion drum 485*b* and the second driveshaft 475 may rotate in the second rotating direction 475*b* in unison.

FIGS. 8A and 8B also show that the first end of the first constant force torsional spring 483*a* may be fixedly engaged to the second torsion drum 485*b* via screw fasteners 488*a* while the second end of the first constant force torsional spring 483*a* may be rotatably engaged to the first spring storage drum 484*a*. Thus, upon loading or winding a portion of the first constant force torsional spring 483*a* onto the second torsion drum 485*b* in the first rotating direction 465*b* (i.e., prior to launch or deployment of the second or fourth UAV 10*b*, 10*d*), the first constant force torsional spring 483*a* may be configured to pull or urge the second torsion drum 485*b* to rotate in the second rotating direction 475*b* upon rotation of the second driveshaft 475 in that same second rotating direction 475*b*. This urging or biasing by the first constant force torsional spring 483*a* may aid in the rotation of the second driveshaft 475. At the same time, the first spring storage drum 484*a* may freely rotate on the first driveshaft 465 to dispense rotational energy of the first constant force torsional springs 483*a* with minimal exertion. As a result, the first constant force torsional spring 483*a*, first spring storage drum 484*a*, and the second torsion drum 485*b* together may assist the second driveshaft 475 by providing additional torque to rotate the second driveshaft 475 in the second rotating direction 475*b*.

Similarly, regarding the second constant force torsional spring 483*b*, the first end of the second constant force torsional spring 483*b* may be fixedly engaged to the first torsion drum 485*a* via screw fasteners 488*b* while the second end of the second constant force torsional spring 483*b* may be rotatably engaged to the second spring storage drum 484*b*. Thus, upon loading or winding a portion of the second constant force torsional spring 483*b* onto the first torsion drum 485*a* in the second rotating direction 465*b* (i.e., prior to launch or deployment of the first or third UAV 10*a*, 10*c*), the second constant force torsional spring 483*b* may be configured to pull or urge the first torsion drum 485*a* to rotate in the first rotating direction 465*b* upon rotation of the first driveshaft 465 in that same first rotating direction 465*b*. Like the first constant force torsional spring 483*a*, this urging or biasing by the second constant force torsional spring 483*b* may aid the rotation of the first driveshaft 465 in the first rotating direction 465*b*. At the same time, the second spring storage drum 484*b* may freely rotate on the second driveshaft 475 to dispense rotational energy of the second constant force torsional spring 483*b* with minimal exertion. As a result, the second constant force torsional spring 483*b*, second spring storage drum 484*b*, and the first torsion drum 485*a* together may assist the first driveshaft 465 by providing additional torque to rotate in the first rotating direction 465*b*.

The driveshaft spreader 486 may be rotatably mounted to the first and second driveshafts 465, 475 and may prevent excess deflection of the first and second driveshafts 465, 475 toward each other due to the spring forces of the first and second constant force torsional springs 483*a*, 483*b*. The driveshaft spreader 486 may also separate components of the torsional bias assembly 480 at a fixed distance (i.e., the driveshaft spreader 486 may separate the first constant force torsional spring 483*a*, first spring storage drum 484*a*, and the second torsion drum 485*b* from the second constant force torsional spring 483*b*, second spring storage drum 484*b*, and first torsion drum 485*a*), so as to prevent interference between the components of the torsional bias assembly 480.

Accordingly, the torsional bias assembly 480 may aid the first and second servomotors 460, 470 by exerting a constant torque to the first and second driveshafts 465, 475 in their respective rotating directions (i.e., the torsional bias assembly 480 may aid in the rotations of the first driveshaft 465 in the first rotating direction 465*b* and the second driveshaft 475 in the second rotating direction 475*b*). The constant torques exerted by the torsional bias assembly 480 preferably provide the necessary torque to rotate the cams and thus release the latches 625, 630, 725, 730 (shown in FIGS. 9A to 9C) of the forward latch assembly 600 and aft latch assembly 700. Thus, without the torsional bias assembly 480, the biasing or spring force used in the forward latch assembly 600 and aft latch assembly 700 alone may be insufficient to release the latches 625, 630, 725, 730 due to the frictional forces inherent within the system. As such, the torsional bias generated by the torsional bias assembly 480 preferably allows the multiple UAV jettison apparatus 100 to utilize smaller and lighter servomotors and other related components to provide the extra torque needed for the driveline assembly 400.

Figure 9A:
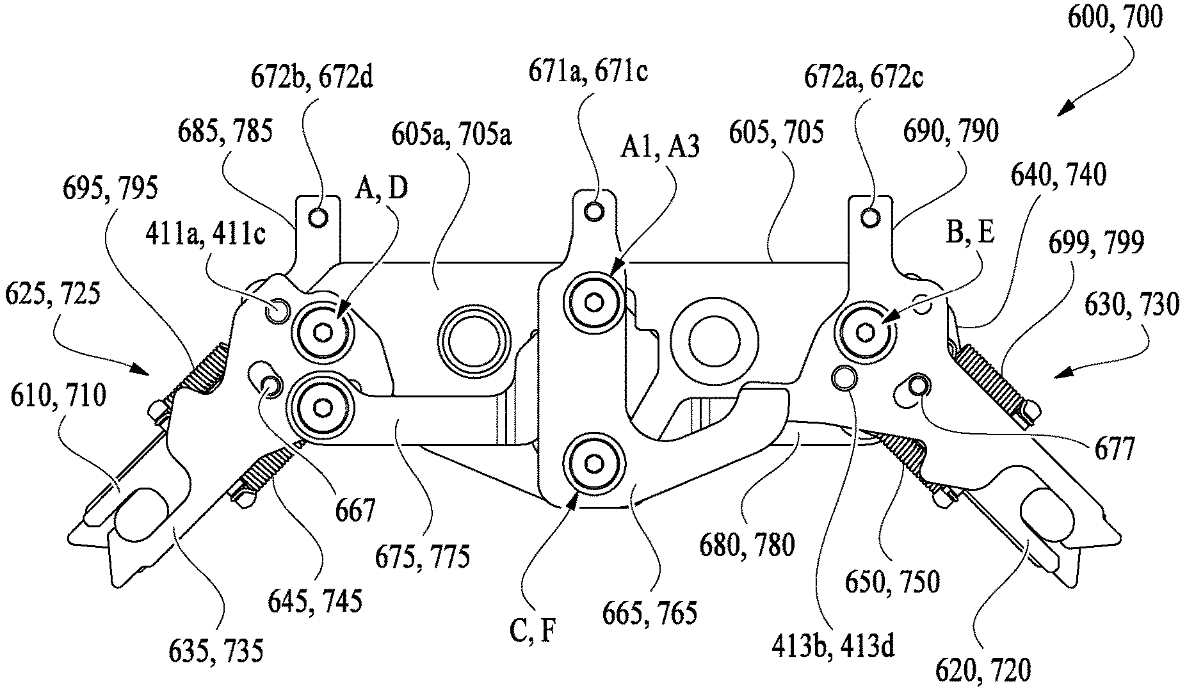
FIGS. 9A to 9C are illustrations of front elevation, perspective, and exploded views of embodiments of either a forward latch assembly or aft latch assembly.
Figure 9B:
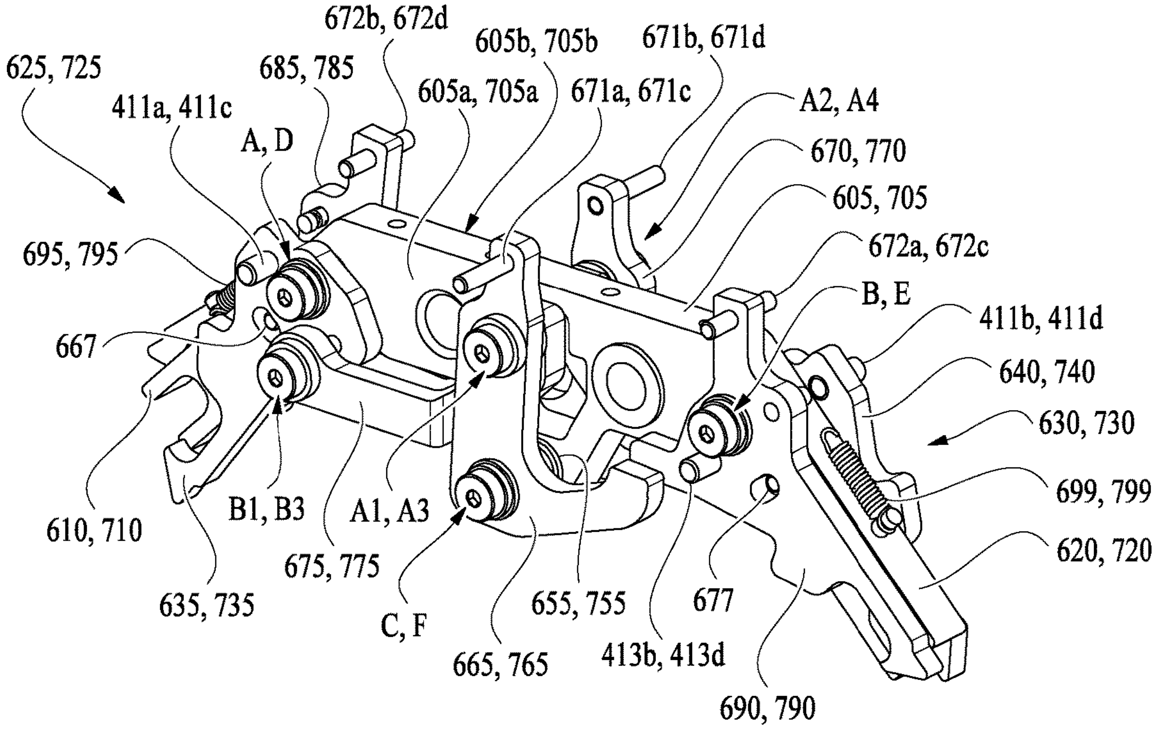
Figure 9C:
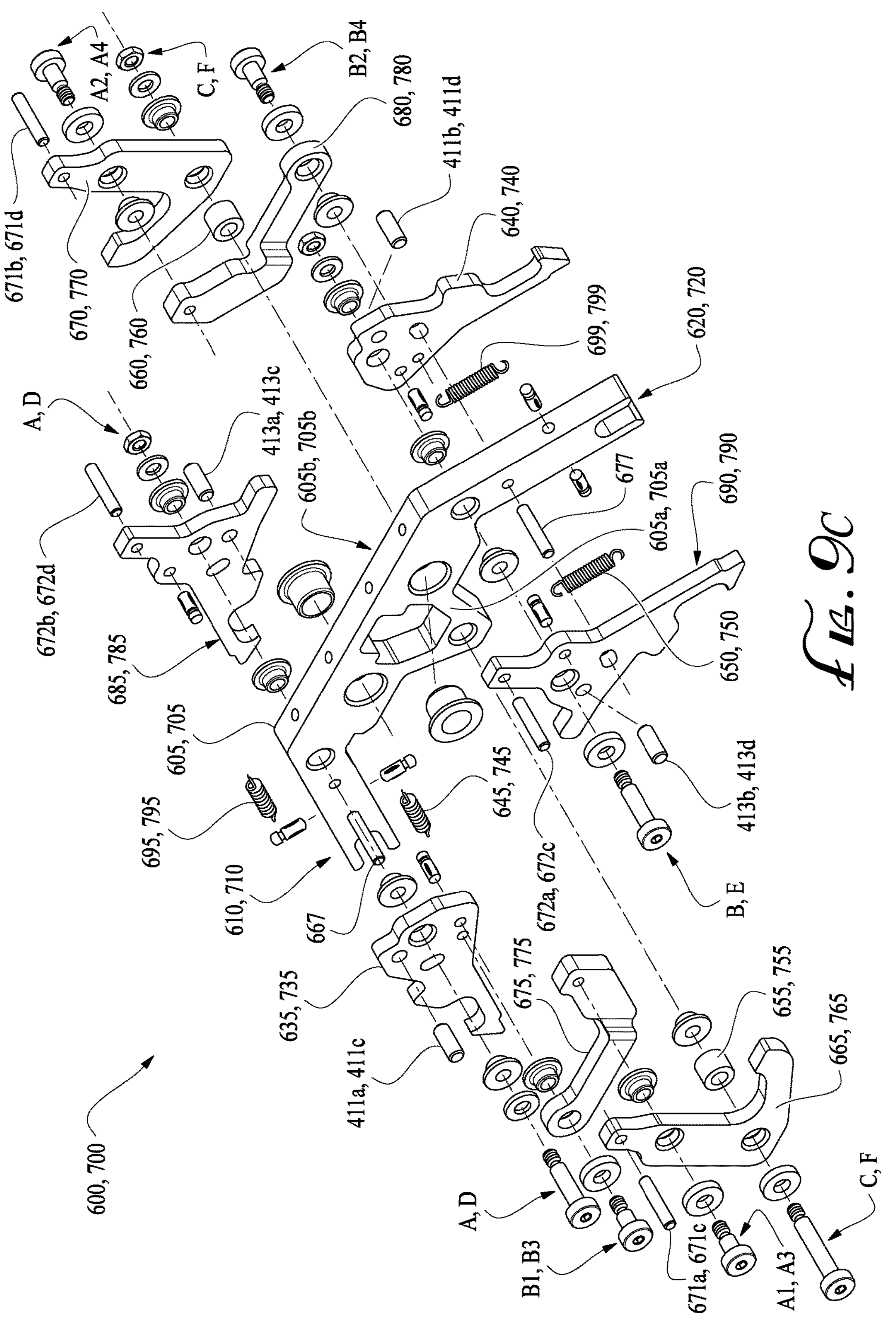

FIGS. 9A to 9C are illustrations of front elevation, perspective, and exploded views of one embodiment of either a forward latch assembly 600 or aft latch assembly 700. As noted above, the forward latch assembly 600 and aft latch assembly 700 are both configured to lock and release the ejector plate assemblies 120*a*, 120*b*, 120*c*, 120*d* from their respective stowed position to their corresponding launch position via spring-loaded mechanisms and latches 625, 630, 725, 730. This may allow the release of a respective UAV 10*a*, 10*b*, 10*c*, 10*d* during flight of the aircraft 200. Both the forward latch assembly 600 and aft latch assembly 700 preferably implement a safety requirement by requiring each latch 625, 630, 725, 730 to perform two actions to release a UAV 10*a*, 10*b*, 10*c*, 10*d* (i.e., actuating both a lock mechanism and a release mechanism for each latch 625, 630, 725, 730). Both the lock mechanism and release mechanism are preferably independently controlled by the first and second servomotors 460, 470 and accompanying driveline assembly 400. Also, each associated latch 625, 630, 725, 730 of the forward latch assembly 600 and aft latch assembly 700 may also include a manual ejection assembly 133*a*, 133*b*, 133*c*, 133*d* that allows a user to manually eject a UAV 10*a*, 10*b*, 10*c*, 10*d* while unpowered to actuate the servomotors 460, 470. This may be performed by manually pressing a button accessible externally on the payload bay 105. Details of the manual ejection assemblies 133*a*, 133*b*, 133*c*, 133*d* are described further below.

Each latch 625, 630, 725, 730 of the forward and aft latch assemblies 600, 700 may function by utilizing return springs to keep the latches 625, 630, 725, 730 closed and secured against limit stops. As a UAV 10*a*, 10*b*, 10*c*, 10*d* is inserted and pushed inwardly into the payload bay 105, the bar lug 104 of the UAV (shown in FIGS. 20A to 21) may contact the slope end of each hook portion of a respective latch 625, 630, 725, 730 and a torque may be exerted to overcome the return spring, thereby opening the latch 625, 630, 725, 730. Once the UAV bar lug 104 has passed the outermost projection of the hook portion of the latch 625, 630, 725, 730, the return springs may close the latch 625, 630, 725, 730 and the hook portion of the latch 625, 630, 725, 730, preferably retaining the UAV bar lug 104. Notably, the return springs may be sufficiently strong to prevent inadvertent opening of each latch 625, 630, 725, 730 under flight accelerations while still being capable of opening under forces caused by the UAV during flight of aircraft 200.

As a general matter, FIGS. 9A to 9C show that the physical structure of both the forward latch assembly 600 and aft latch assembly 700 is preferably identical to each other. Additionally, FIGS. 9A to 9C show that the opposing sides of the forward latch assembly 600 and aft latch assembly 700 may likewise be substantially similar or identical, such that both sides of the forward latch assembly 600 or aft latch assembly 700 may comprise the same physical components.

As shown in FIGS. 9A to 9C, embodiments of the forward latch assembly 600 and aft latch assembly 700 may comprise: a forward latch housing 605 or aft latch housing 705 each having a respective arm portion 610, 620, 710, 720 and latches 625, 630, 725, 730 assigned to each respective arm portion 610, 620, 710, 720. Additionally, each latch 625, 630, 725, 730 may comprise a lock mechanism on one side of a respective arm portion 610, 620, 710, 720 of the forward and aft latch housings 605, 705 and a release mechanism on the opposing side of that same respective arm portion 610, 620, 710, 720, such that both a lock mechanism and release mechanism may occupy a side of the forward latch housing 605 or aft latch housing 705. Each lock mechanism may comprise: a lock latch 635, 640, 735, 740, lock latch return spring 645, 650, 745, 750, spacer 655, 660, 755, 760, rocker arm 665, 670, 765, 770, and linkage 675, 680, 775, 780. Additionally, each release mechanism may comprise: a release latch 685, 690, 785, 790 and release latch return spring 695, 699, 795, 799.

For example, an exemplary embodiment of the forward latch assembly 600 may comprise a forward latch housing 605 having a first arm portion 610 and a second arm portion 620, wherein the first latch 625 may correspond with the first arm portion 610 and the second latch 630 may correspond with the second arm portion 620. The first latch 625 associated with the first arm portion 610 may comprise a first lock latch mechanism having a first lock latch 635, first lock latch return spring 645, first spacer 655, first rocker arm 665, and first linkage 675 on a first side 605*a* of the forward latch housing 605. The first latch 625 associated with the first arm portion 610 may also comprise a first release latch mechanism having a first release latch 685 and first release latch return spring 695 on the second side 605*b* of the forward latch housing 605.

Regarding the second arm portion 620 and second latch 630 of this same embodiment, the second latch 630 associated with the second arm portion 620 may comprise a second lock latch mechanism having a second lock latch 640, second lock latch return spring 650, second spacer 660, second rocker arm 670, and second linkage 680 on a second side 605*b* of the forward latch housing 605. The second latch 630 associated with the second arm portion 620 may also comprise a second release latch mechanism having a second release latch 690 and first release latch return spring 699 on the first side 605*a* of the forward latch housing 605.

Similarly, an exemplary embodiment of the aft latch assembly 700 may comprise an aft latch housing 705 having a third arm portion 710 and a fourth arm portion 720, wherein the third latch 725 may correspond with the third arm portion 710 and the fourth latch 730 may correspond with the fourth arm portion 720. The third latch 725 associated with the third arm portion 710 may comprise a third lock latch mechanism having a third lock latch 735, third lock latch return spring 745, third spacer 755, third rocker arm 765, and third linkage 775 on a first side 705*a* of the aft latch housing 705. The third latch 725 associated with the third arm portion 710 may also comprise a third release latch mechanism having a third release latch 785 and third release latch return spring 795 on the second side 705*b* of the aft latch housing 705.

Regarding the fourth arm portion 720 and fourth latch 730 of the same embodiment, the fourth latch 730 associated with the fourth arm portion 720 may comprise a fourth lock latch mechanism having a fourth lock latch 740, fourth lock latch return spring 750, fourth spacer 760, fourth rocker arm 770, and fourth linkage 780 on a second side 705*b* of the aft latch housing 705. The fourth latch 730 associated with the fourth arm portion 720 may also comprise a fourth release latch mechanism having a fourth release latch 790 and fourth release latch return spring 799 on the first side 705*a* of the aft latch housing 705. Details on how the latch components operate are discussed further below.

Figure 10:
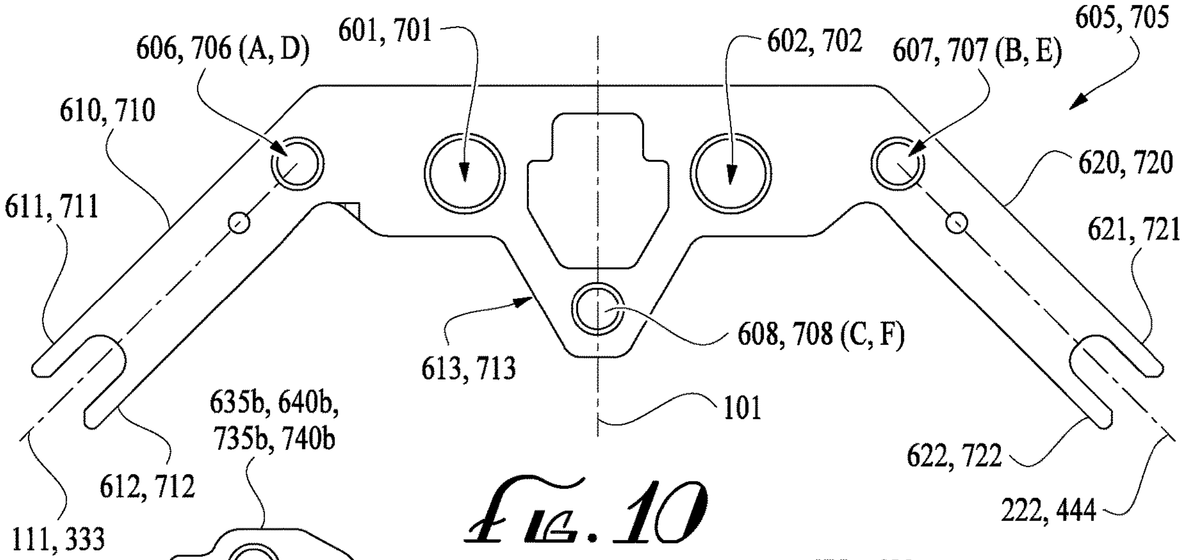
FIG. 10 is an illustration of a front elevation view of embodiments of either a forward latch housing or an aft latch housing.

FIG. 10 is an illustration of a front elevation view of one embodiment of either a forward latch housing 605 or aft latch housing 705. The forward and aft latch housings 605, 705 may serve as mounting structures for attaching various latch components, and in exemplary embodiments, may have bilateral symmetry along the central vertical longitudinal plane 101, as shown (i.e., both right and left sides of the forward latch housing 605 or aft latch housing 705 may be mirror images of each other). Embodiments of the forward and aft latch housings 605, 705 may each comprise: arm portions 610, 620, 710, 720 (first arm portion 610 for forward latch housing 605; second arm portion 620 for forward latch housing 605; third arm portion 710 for aft latch housing 705; and fourth arm portion 720 for aft latch housing 705) and a latch middle section 613, 713 (forward latch middle section 613 for the forward latch housing 605; aft latch middle section 713 for the aft latch housing 705).

Each arm portion 610, 620, 710, 720 may have a two-prong end configured to engage a respective UAV bar lug 104 and may comprise a top prong 611, 621, 711, 721 and bottom prong 612, 622, 712, 722 with a respective UAV axis 111, 222, 333, 444 traversing therebetween. For example, the two-prong end of the first arm portion 610 of the forward latch housing 605 may comprise a first top prong 611 and a first bottom prong 612 with a first UAV axis 111 traversing therebetween. Additionally, the two-prong end of the third arm portion 710 of the aft latch housing 705 may comprise a third top prong 711 and a third bottom prong 712 with a third UAV axis 333 traversing therebetween. Given that the first UAV axis 111 and third UAV axis 333 may be both aligned with the first diagonal plane 202 (shown in FIG. 18C), the first and third arm portions 610, 710 may be angled at a first angle 201 (shown in FIG. 18C) with respect to the central vertical longitudinal plane 101.

Similarly, the two-prong end of the second arm portion 620 of the forward latch housing 605 may comprise a second top prong 621 and a second bottom prong 622 with a second UAV axis 222 traversing therebetween. Additionally, the two-prong end of the fourth arm portion 720 of the aft latch housing 705 may comprise a fourth top prong 721 and a fourth bottom prong 722 with a fourth UAV axis 444 traversing therebetween. Given that the second UAV axis 222 and fourth UAV axis 444 may be both aligned with the second diagonal plane 302 (shown in FIG. 18C), the second and fourth arm portions 620, 720 may be angled at a second angle 301 (as shown in FIG. 18C) with respect to the central vertical longitudinal plane 101.

Figure 17B:
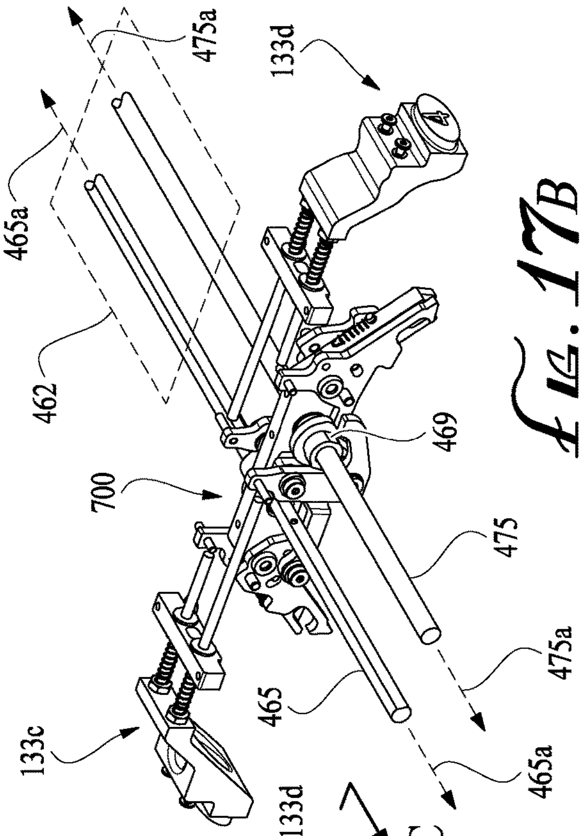
FIGS. 17A to 17C are illustrations of perspective and front elevation views of embodiments of the manual ejection assembly and show the manual ejection assembly operably coupled to the aft latch assembly.

The latch middle section 613, 713 may comprise driveshaft openings 601, 602, 701, 702 (first driveshaft opening 601 of the forward latch housing 605, second driveshaft opening 602 of the forward latch housing 605, third driveshaft opening 701 of the aft latch housing 705, and fourth driveshaft opening 702 of the aft latch housing 705), all of which are preferably disposed on a horizontal plane 462 (shown in FIG. 17B). The first and third driveshaft openings 601, 701 may also have centers aligned with the first central longitudinal axis 465*a*, whereas the second and fourth driveshaft openings 602, 702 may also have centers aligned with the second central longitudinal axis 475*a*. The first and third driveshaft openings 601, 701 are preferably adapted to permit the first driveshaft 465 to freely rotate therein, whereas the second and fourth driveshaft openings 602, 702 are preferably adapted to permit the second driveshaft 475 to freely rotate therein.

Regarding cam placement, in an exemplary embodiment, the first cam 466 of the driveline assembly 400 may be adjacent to the first driveshaft opening 601 at a second side 605*b* of the forward latch housing 605, whereas the second cam 467 of the driveline assembly 400 may be adjacent to the second driveshaft opening 602 at a first side 605*a* of the forward latch housing 605. Further, the third cam 468 of the driveline assembly 400 may be adjacent to a third driveshaft opening 701 at a second side 705*b* of the aft latch housing 705, whereas the fourth cam 469 of the driveline assembly 400 may be adjacent to a fourth driveshaft opening 702 at a first side 705*a* of the aft latch housing 705.

Finally, FIG. 10 shows the locations of pivots A, B, C, D, E, F (i.e., first pivot A, second pivot B, third pivot C, fourth pivot D, fifth pivot E, and sixth pivot F) with respect to pivot holes 606, 607, 608, 706, 707, 708. Specifically, first pivot A may be located at pivot hole 606 for both first and second sides 605*a*, 605*b* of the forward latch housing 605; second pivot B may be located at pivot hole 607 for both first and second sides 605*a*, 605*b* of the forward latch housing 605; third pivot C may be located at pivot hole 608 for both first and second sides 605*a*, 605*b* of the forward latch housing 605; fourth pivot D may be located at pivot hole 706 for both first and second sides 705*a*, 705*b* of the aft latch housing 705; fifth pivot E may be located at pivot hole 707 for both first and second sides 705*a*, 705*b* of the aft latch housing 705; and sixth pivot F may be located at pivot hole 708 for both first and second sides 705*a*, 705*b* of the aft latch housing 705.

Figure 11:
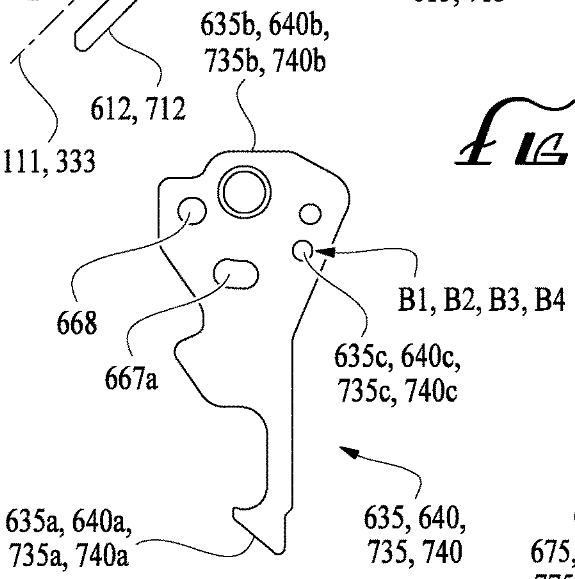
FIG. 11 is an illustration of a front elevation view of one embodiment of a lock latch.

FIG. 11 is an illustration of a front elevation view of one embodiment of the lock latch 635, 640, 735, 740. As shown in FIG. 11, embodiments of the lock latch 635, 640, 735, 740 may comprise: a lock latch hook end 635*a*, 640*b*, 735*a*, 740*a*, lock latch pivot end 635*b*, 640*b*, 735*b*, 740*b*, lock latch linkage opening 635*c*, 640*c*, 735*c*, 740*c*, lock latch travel stop opening 667*a*, and lock latch close assist pin opening 668. As a general matter, in exemplary embodiments, the first lock latch hook end 635*a*, first lock latch pivot end 635*b*, and first lock latch linkage opening 635*c* may correspond to the first lock latch 635 of the forward latch assembly 600; second lock latch hook end 640*a*, second lock latch pivot end 640*b*, and second lock latch linkage opening 640*c* may correspond to the second lock latch 640 of the forward latch assembly 600; third lock latch hook end 735*a*, third lock latch pivot end 735*b*, and third lock latch linkage opening 735*c* may correspond to the third lock latch 735 of the aft latch assembly 700; and fourth lock latch hook end 740*a*, fourth lock latch pivot end 740*b*, and fourth lock latch linkage opening 740*c* may correspond to the fourth lock latch 740 of the aft latch assembly 700.

As recited above, a single lock latch 635, 640, 735, 740 may pivotally mount onto each side 605*a*, 605*b*, 705*a*, 705*b* of the forward and aft latch housings 605, 705 (preferably at the left-hand side of each side 605*a*, 605*b*, 705*a*, 705*b* of the forward and aft latch housings 605, 705). Each lock latch 635, 640, 735, 740 is also preferably configured to pivot between a respective locked position and a respective unlocked position relative to the corresponding arm portion 610, 620, 710, 720 of the forward and aft latch housings 605, 705. For example, in an exemplary embodiment, a first lock latch pivot end 635*b* of the first lock latch 635 may be pivotally mounted to the first side 605*a* of the forward latch housing 605 via first pivot A, which is preferably aligned or disposed along the first UAV axis 111, and the first lock latch 635 may pivot between a first locked position (shown in FIG. 15A) and first unlocked position (shown in FIG. 15C) relative to the first arm portion 610. Additionally, in an exemplary embodiment, a second lock latch pivot end 640*b* of the second lock latch 640 may be pivotally mounted to the second side 605*b* of the forward latch housing 605 via the second pivot B, which may be aligned and disposed along the second UAV axis 222, and the second lock latch 640 may pivot between a second locked position (shown in FIG. 15B) and second unlocked position (shown in FIG. 15D) relative to the second arm portion 620.

Regarding the third and fourth lock latches 735, 740, in the same embodiment as above, the a third lock latch pivot end 735*b* of the third lock latch 735 may be pivotally mounted to the first side 705*a* of the aft latch housing 705 via fourth pivot D, which is preferably aligned or disposed along the third UAV axis 333, and the third lock latch 735 may pivot between a third locked position (shown in FIG. 15A) and third unlocked position (shown in FIG. 15C) relative to the third arm portion 710. Additionally, in an exemplary embodiment, the fourth lock latch pivot end 740*b* of the fourth lock latch 740 may be pivotally mounted to the second side 705*b* of the aft latch housing 705 via fifth pivot E, which may be aligned and disposed along the fourth UAV axis 444, and fourth lock latch 740 may pivot between a fourth locked position (shown in FIG. 15B) and fourth unlocked position (shown in FIG. 15D) relative to the fourth arm portion 720.

In various embodiments, each lock latch hook end 635*a*, 640*a*, 735*a*, 740*a* may have a bottom prong hook portion, which may cause a lock latch hook end 635*a*, 640*a*, 735*a*, 740*a* to resemble the bottom prong 612, 622, 712, 722 of a respective arm portion 610, 620, 710, 720. Importantly, when the lock latch 635, 640, 735, 740 is in its respective locked position, its respective bottom prong hook portion may extend or project inwardly towards a corresponding top prong 611, 621, 711, 721 of the associated arm portion 610, 620, 710, 720. The bottom prong hook portion of the lock latch hook end 635*a*, 640*a*, 735*a*, 740*a* may also be adjacent to a space between the corresponding top prong 611, 621, 711, 721 and bottom prong 612, 622, 712, 722 of the respective arm portion 610, 620, 710, 720 when the lock latch 635, 640, 735, 740 is in its respective locked position. In this manner, the bottom prong hook portion may inhibit release of the UAV bar lug 104 from the forward latch housing 605 or aft latch housing 705 when the lock latch 635, 640, 735, 740 is in its respective locked position.

For example, when the first lock latch 635 is in its first locked position, the first bottom prong hook portion of the first lock latch hook end 635*a* may extend or project inwardly towards the first top prong 611 of the first arm portion 610 of the forward latch housing 605. The first bottom prong hook portion of the first lock latch hook end 635*a* may also be adjacent to a first space between the first top prong 611 and first bottom prong 612 of the first arm portion 610 of the forward latch housing 605 when the first lock latch 635 is in its first locked position.

Additionally, when the second lock latch 640 is in its second locked position, the second bottom prong hook portion of the second lock latch hook end 640*a* may extend or project inwardly towards the second top prong 621 of the second arm portion 620 of the forward latch housing 605. The second bottom prong hook portion of the second lock latch hook end 640*a* may also be adjacent to a second space between the second top prong 621 and second bottom prong 622 of the second arm portion 620 of the forward latch housing 605 when the second lock latch 640 is in its second locked position.

Further, when the third lock latch 735 is in its third locked position, the third bottom prong hook portion of the third lock latch hook end 735*a* may extend or project inwardly towards the third top prong 711 of the third arm portion 710 of the aft latch housing 705. The third bottom prong hook portion of the third lock latch hook end 735*a* may also be adjacent to a third space between the third top prong 711 and third bottom prong 712 of the third arm portion 710 of the aft latch housing 705 when the third lock latch 735 is in its third locked position.

Finally, when the fourth lock latch 740 is in its fourth locked position, the fourth bottom prong hook portion of the fourth lock latch hook end 740*a* may extend or project inwardly towards the fourth top prong 721 of the fourth arm portion 720 of the aft latch housing 705. The fourth bottom prong hook portion of the fourth lock latch hook end 740*a* may also be adjacent to a fourth space between the fourth top prong 721 and fourth bottom prong 722 of the fourth arm portion 720 of the aft latch housing 705 when the fourth lock latch 740 is in its fourth locked position.

Regarding the lock latch linkage openings 635*c*, 640*c*, 735*c*, 740*c*, these openings may be used to pivotally couple a respective lock latch 635, 640, 735, 740 to a second end 675*b*, 680*b*, 775*b*, 780*b* of a linkage 675, 680, 775, 780 at pivots B1, B2, B3, B4 (shown in FIG. 11). Specifically, these linkages 675, 680, 775, 780 may pivotally couple a respective lock latch 635, 640, 735, 740 to a corresponding rocker arm 665, 670, 765, 770, thereby allowing the lock latch 635, 640, 735, 740 to pivot from its respective locked position and to its respective unlocked position when the corresponding rocker arm 665, 670, 765, 770 pivots. Details on how the rocker arms 665, 670, 765, 770, linkages 675, 680, 775, 780, and lock latches 635, 640, 735, 740 together pivot are discussed further below.

In multiple embodiments, each lock latch 635, 640, 735, 740 may also have a thickness substantially equal the thickness of a cam inner thickness of a corresponding cam 466, 467, 468, 469. For example, in an exemplary embodiment, the first lock latch 635 may have a thickness substantially equal to the thickness of the second cam inner thickness associated with the inner circumferential second cam surface 467*a* (shown in FIGS. 15A and 15C) of the second cam 467. Additionally, the second lock latch 640 may have a thickness of substantially equal to the thickness of the first cam inner thickness associated with the inner circumferential first cam surface 466*a* (shown in FIGS. 15B and 15D) of the first cam 466. Moreover, the third lock latch 735 may have a thickness substantially equal to the thickness of the fourth cam inner thickness associated with the inner circumferential fourth cam surface 469*a* (shown in FIGS. 15A and 15C) of the fourth cam 469. Finally, the fourth lock latch 740 may have a thickness substantially equal to the thickness of the third cam inner thickness associated with the inner circumferential third cam surface 468*a* (shown in FIGS. 15B and 15D) of the third cam 468.

Finally, FIG. 11 shows that each lock latch 635, 640, 735, 740 may comprise a lock latch travel stop opening 667*a* and a lock latch close assist pin opening 668. The lock latch travel stop opening 667*a* may be used to engage a lock latch travel stop 667, which is generally configured to limit movement of a lock latch 635, 640, 735, 740 beyond its respective locked and unlocked positions. Additionally, the lock latch close assist pin opening 668 may be used to insert a lock latch close assist pin 411*a*, 411*b*, 411*c*, 411*d*, which preferably aids in pivoting the respective lock latch 635, 640, 735, 740 from their unlocked position to their corresponding locked position. Thus, when an ejector plate assembly 120*a*, 120*b*, 120*c*, 120*d* moves from its launch position to its stowed position, a corresponding lock latch face 414*a*, 414*b*, 414*c*, 414*d* of a stowed stroke stop assembly 409*a*, 409*b*, 409*c*, 409*d* may engage the corresponding lock latch close assist pin 411*a*, 411*b*, 411*c*, 411*d*, thereby pivoting, closing, or securing the respective lock latch 635, 640, 735, 740 around a UAV bar lug 104.

Figure 12:
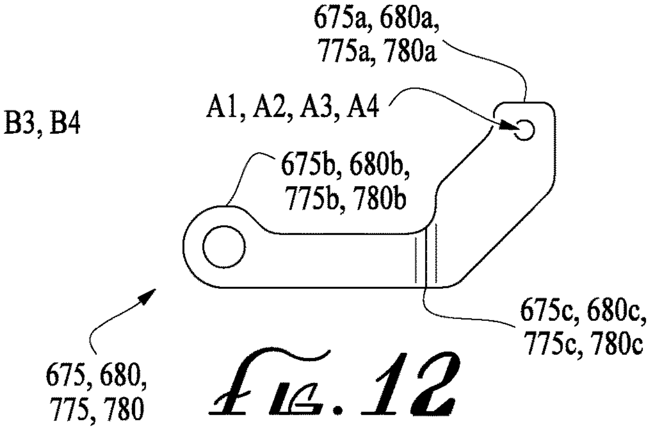
FIG. 12 is an illustration of a front elevation view of one embodiment of a linkage.

FIG. 12 is an illustration of a front elevation view of one embodiment of a linkage 675, 680, 775, 780. As shown in FIG. 12, one embodiment of the linkage 675, 680, 775, 780 may comprise a first end 675*a*, 680*a*, 775*a*, 780*a* and second end 675*b*, 680*b*, 775*b*, 780*b*. In exemplary embodiments, a respective first end 675*a*, 680*a*, 775*a*, 780*a* of the linkage 675, 680, 775, 780 may pivotally couple to a corresponding linkage end 665*a*, 670*a*, 765*a*, 770*a* of a rocker arm 665, 670, 765, 770 at a pivot A1, A2, A3, A4 (shown in FIG. 12), whereas the corresponding second end 675*b*, 680*b*, 775*b*, 780*b* of the linkage 675, 680, 775, 780 may pivotally couple to the outer surface of a respective lock latch 635, 640, 735, 740 via a corresponding lock latch linkage opening 635*c*, 640*c*, 735*c*, 740*c* at a pivot B1, B2, B3, B4 (shown in FIG. 11). In this manner, as the rocker arm 665, 670, 765, 770 pivots from its respective rocker arm locked position to its corresponding rocker arm unlocked position, the associated lock latch 635, 640, 735, 740 may pivot from its respective locked position to its respective unlocked position.

For example, in an embodiment, the first end 675*a* of the first linkage 675 may pivotally couple to the first linkage end 665*a* of the first rocker arm 665 at pivot A1 and may be disposed between the first side 605*a* of the forward latch housing 605 and first linkage end 665*a* of the first rocker arm 665. In the same embodiment, the second end 675*b* of the first linkage 675 may pivotally couple to the outer surface of the first lock latch 635 at the first lock latch linkage opening 635*c* via pivot B1. Thus, as the first rocker arm 665 pivots from its first rocker arm locked position to its first rocker arm unlocked position, the first linkage end 665*a* of the first rocker arm 665 may likewise pivot and thus pull the first linkage 675, thereby causing the first lock latch 635 to likewise pivot from its first locked position to its first unlocked position.

Additionally, in an embodiment, the first end 680*a* of the second linkage 680 may pivotally couple to the second linkage end 670*a* of the second rocker arm 670 at pivot A2 and may be disposed between the second side 605*b* of the forward latch housing 605 and second linkage end 670*a* of the second rocker arm 670. In the same embodiment, the second end 680*b* of the second linkage 680 may pivotally couple to the outer surface of the second lock latch 640 at the second lock latch linkage opening 640*c* via pivot B2. Thus, as the second rocker arm 670 pivots from its second rocker arm locked position to its second rocker arm unlocked position, the second linkage end 670*a* of the second rocker arm 670 may likewise pivot and thus pull the second linkage 680, thereby causing the second lock latch 640 to likewise pivot from its second locked position to its second unlocked position.

Furthermore, in an embodiment, the first end 775*a* of the third linkage 775 may pivotally couple to the third linkage end 765*a* of the third rocker arm 765 at pivot A3 and may be disposed between the first side 705*a* of the aft latch housing 705 and the third linkage end 765*a* of the third rocker arm 765. In the same embodiment, the second end 775*b* of the third linkage 775 may pivotally couple to the outer surface of the third lock latch 735 at the third lock latch linkage opening 735*c* via pivot B3. Thus, as the third rocker arm 765 pivots from its third rocker arm locked position to its third rocker arm unlocked position, the third linkage end 765*a* of the third rocker arm 765 may likewise pivot and thus pull the third linkage 775, thereby causing the third lock latch 735 to likewise pivot from its third locked position to its third unlocked position.

Finally, in an embodiment, the first end 780*a* of the fourth linkage 780 may pivotally couple to the fourth linkage end 770*a* of the fourth rocker arm 770 at pivot A4 and may be disposed between the second side 705*b* of the aft latch housing 705 and the fourth linkage end 770*a* of the fourth rocker arm 770. In the same embodiment, the second end 780*b* of the fourth linkage 780 may pivotally couple to the outer surface of the fourth lock latch 740 at the fourth lock latch linkage opening 740*c* via pivot B4. Thus, as the fourth rocker arm 770 pivots from its fourth rocker arm locked position to its fourth rocker arm unlocked position, the fourth linkage end 770*a* of the fourth rocker arm 770 may likewise pivot and thus pull the fourth linkage 780, thereby causing the fourth lock latch 740 to likewise pivot from its fourth locked position to its fourth unlocked position.

Given that the first ends 675*a*, 680*a*, 775*a*, 780*a* of each respective linkage 675, 680, 775, 780 may be positioned between an associated rocker arm 665, 670, 765, 770 and the forward or aft latch housing 605, 705, clearance is needed to permit pivotal movement of the rocker arm 665, 670, 765, 770 and associated linkage 675, 680, 775, 780. Additional details about the clearance size are discussed further below.

Finally, FIG. 12 shows that the first ends 675*a*, 680*a*, 775*a*, 780*a* and second ends 675*b*, 680*b*, 775*b*, 780*b* of the linkage 675, 680, 775, 780 may be flat. However, in order for a respective linkage 675, 680, 775, 780 to pivotally couple both the respective lock latch 635, 640, 735, 740 and corresponding rocker arm 665, 670, 765, 770, the first ends 675*a*, 680*a*, 775*a*, 780*a* and second ends 675*b*, 680*b*, 775*b*, 780*b* of the linkage 675, 680, 775, 780 are preferably vertically disposed and offset in separate parallel planes, such that a step-shaped recess is formed (similar to a rabbet). In this manner, the first ends 675*a*, 680*a*, 775*a*, 780*a* and second ends 675*b*, 680*b*, 775*b*, 780*b* of the linkage 675, 680, 775, 780 may be in stair-step relation to each other to create a linkage rabbet edge 675*c*, 680*c*, 775*c*, 780*c* between the first ends 675*a*, 680*a*, 775*a*, 780*a* and second ends 675*b*, 680*b*, 775*b*, 780*b* of the linkage 675, 680, 775, 780. In some embodiments, the linkage rabbet edge 675*c*, 680*c*, 775*c*, 780*c* may be configured to restrict movement of the rocker arm 665, 670, 765, 770, when the rocker arm 665, 670, 765, 770 moves between its respective rocker arm locked position and a respective rocker arm unlocked position.

Figure 13:
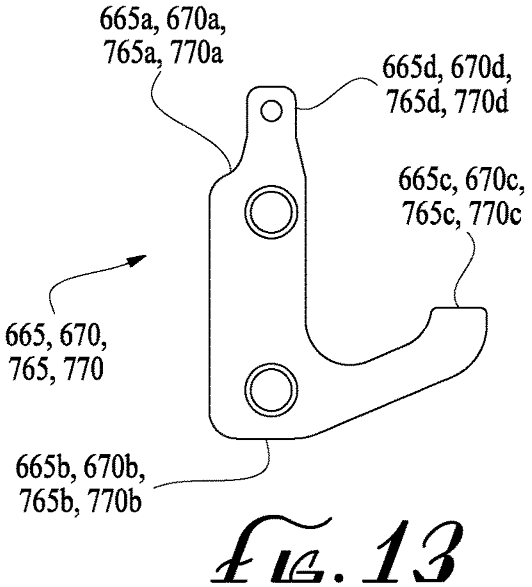
FIG. 13 is an illustration of a front elevation view of one embodiment of a rocker arm.

FIG. 13 is an illustration of a front elevation view of one embodiment of a rocker arm 665, 670, 765, 770. As shown in FIG. 13, embodiments of the rocker arm 665, 670, 765, 770 may comprise: a linkage end 665*a*, 670*a*, 765*a*, 770*a*, rocker arm pivot end 665*b*, 670*b*, 765*b*, 770*b*, cam engagement end 665*c*, 670*c*, 765*c*, 770*c*, and rocker arm extension 665*d*, 670*d*, 765*d*, 770*d*. As a general matter, in exemplary embodiments, the first linkage end 665*a*, first rocker arm pivot end 665*b*, second cam engagement end 665*c*, and first rocker arm extension 665*d* are generally associated with the first rocker arm 665 located on the first side 605*a* of the forward latch housing 605; the second linkage end 670*a*, second rocker arm pivot end 670*b*, first cam engagement end 670*c*, and second rocker arm extension 670*d* are generally associated with the second rocker arm 670 located on the second side 605*b* of the forward latch housing 605; the third linkage end 765*a*, third rocker arm pivot end 765*b*, fourth cam engagement end 765*c*, and third rocker arm extension 765*d* are generally associated with the third rocker arm 765 located on the first side 705*a* of the aft latch housing 705; and the fourth linkage end 770*a*, fourth rocker arm pivot end 770*b*, third cam engagement end 770*c*, and fourth rocker arm extension 770*d* are generally associated with the fourth rocker arm 770 located on the second side 705*b* of the aft latch housing 705.

As described above, each single rocker arm 665, 670, 765, 770 may pivotally mount onto either the forward latch middle section 613 of the forward latch housing 605 or the aft latch middle section 713 of the aft latch housing 705. Each rocker arm 665, 670, 765, 770 is also preferably configured to pivot between a respective rocker arm locked position and a respective rocker arm unlocked position relative to their corresponding latch middle section 613, 713 of either the forward or aft latch housings 605, 705. Preferably, each rocker arm 665, 670, 765, 770 is pivotally coupled to either the forward latch middle section 613 of the forward latch housing 605 or the aft latch middle section 713 of the aft latch housing 705 with a respective spacer 655, 660, 755, 760 disposed therebetween.

For example, in an exemplary embodiment, the first rocker arm pivot end 665*b* of the first rocker arm 665 may pivotally mount to the first side 605*a* of the forward latch housing 605 at third pivot C, which may be aligned or disposed along the central vertical longitudinal plane 101. The first rocker arm 665 may pivot between a first rocker arm locked position (shown in FIG. 15A) and a first rocker arm unlocked position (shown in FIG. 15C) relative to the forward latch middle section 613 of the forward latch housing 605. In some embodiments, a first spacer 655 may be pivotally disposed between the first rocker arm pivot end 665*b* and the first side 605*a* of the forward latch housing 605, such that the first spacer 655 may be located at third pivot C.

Additionally, in an exemplary embodiment, the second rocker arm pivot end 670*b* of the second rocker arm 670 may pivotally mount to the second side 605*b* of the forward latch housing 605 at third pivot C, which may be aligned and disposed along the central vertical longitudinal plane 101. The second rocker arm 670 may pivot between a second rocker arm locked position (shown in FIG. 15B) and second rocker arm unlocked position (shown in FIG. 15D) relative to the forward latch middle section 613 of the forward latch housing 605. In some embodiments, a second spacer 660 may be pivotally disposed between the second rocker arm pivot end 670*b* and the second side 605*b* of the forward latch housing 605, such that the second spacer 660 may be located at third pivot C.

Regarding the third and fourth rocker arms 765, 770, the third rocker arm pivot end 765*b* of the third rocker arm 765 may pivotally mount to the first side 705*a* of the aft latch housing 705 at sixth pivot F, which is preferably aligned or disposed along the central vertical longitudinal plane 101. The third rocker arm 765 may pivot between a third rocker arm locked position (shown in FIG. 15A) and a third rocker arm unlocked position (shown in FIG. 15C) relative to the aft latch middle section 713 of the aft latch housing 705. In some embodiments, a third spacer 755 may be pivotally disposed between the third rocker arm pivot end 765*b* and the first side 705*a* of the aft latch housing 705, such that the third spacer 755 may be located at sixth pivot F.

Additionally, in an exemplary embodiment, the fourth rocker arm pivot end 770*b* of the fourth rocker arm 770 may pivotally mount to the second side 705*b* of the aft latch housing 705 at sixth pivot F, which may be aligned and disposed along the central vertical longitudinal plane 101. The fourth rocker arm 770 may pivot between a fourth rocker arm locked position (shown in FIG. 15B) and a fourth rocker arm unlocked position (shown in FIG. 15D) relative to aft latch middle section 713 of the aft latch housing 705. In some embodiments, a fourth spacer 760 may be pivotally disposed between the fourth rocker arm pivot end 770*b* and the second side 705*b* of the aft latch housing 705, such that the fourth spacer 760 may be located at sixth pivot F.

As discussed above, each linkage end 665*a*, 670*a*, 765*a*, 770*a* may pivotally couple to a first end 675*a*, 680*a*, 775*a*, 780*a* of the linkage 675, 680, 775, 780 via pivots A1, A2, A3, A4. Additionally, each linkage end 665*a*, 670*a*, 765*a*, 770*a* of the rocker arms 665, 670, 765, 770 may extend upwards and may be positioned between associated driveshaft openings 601, 602, 701, 702 of their respective forward or aft latch housing 605, 705. In this manner, as a rocker arm 665, 670, 765, 770 pivots from its respective rocker arm locked position to its respective rocker arm unlocked position, the corresponding linkage end 665*a*, 670*a*, 765*a*, 770*a* of that rocker arm 665, 670, 765, 770 may likewise pivot and thus pull the associated linkage 675, 680, 775, 780. This may cause the corresponding lock latch 635, 640, 735, 740 to likewise pivot from its respective locked position to its respective unlocked position.

For example, the first linkage end 665*a* of the first rocker arm 665 may pivotally couple to a first end 675*a* of the first linkage 675 at pivot A1 and may extend upwards between the first and second driveshaft openings 601, 602 on the first side 605*a* of the forward latch housing 605. In this manner, as the first rocker arm 665 pivots from its first rocker arm locked position to its first rocker arm unlocked position, the first linkage end 665*a* of the first rocker arm 665 may likewise pivot and thus pull the first linkage 675, thereby causing the first lock latch 635 to likewise pivot from its first locked position to its first unlocked position.

Additionally, the second linkage end 670*a* of the second rocker arm 670 may pivotally couple to a first end 680*a* of the second linkage 680 at pivot A2 and may extend upwards between the first and second driveshaft openings 601, 602 on the second side 605*b* of the forward latch housing 605. In this manner, as the second rocker arm 670 pivots from its second rocker arm locked position to its second rocker arm unlocked position, the second linkage end 670*a* of the second rocker arm 670 may likewise pivot and thus pull the second linkage 680, thereby causing the second lock latch 640 to likewise pivot from its second locked position to its second unlocked position.

Furthermore, the third linkage end 765*a* of the third rocker arm 765 may pivotally couple to a first end 775*a* of the third linkage 775 at pivot A3 and may extend upwards between the third and fourth driveshaft openings 701, 702 on the first side 705*a* of the aft latch housing 705. In this manner, as the third rocker arm 765 pivots from its third rocker arm locked position to its third rocker arm unlocked position, the third linkage end 765*a* of the third rocker arm 765 may likewise pivot and thus pull the third linkage 775, thereby causing the third lock latch 735 to likewise pivot from its third locked position to its third unlocked position.

Finally, the fourth linkage end 770*a* of the fourth rocker arm 770 may pivotally couple to a first end 780*a* of the fourth linkage 780 at pivot A4 and may extend upwards between the third and fourth driveshaft openings 701, 702 on the second side 705*b* of the aft latch housing 705. In this manner, as the fourth rocker arm 770 pivots from its fourth rocker arm locked position to its fourth rocker arm unlocked position, the fourth linkage end 770*a* of the fourth rocker arm 770 may likewise pivot and thus pull the fourth linkage 780, thereby causing the fourth lock latch 740 to likewise pivot from its fourth locked position to its fourth unlocked position.

FIG. 13 also shows that each rocker arm 665, 670, 765, 770 may comprise a respective cam engagement end 665*c*, 670*c*, 765*c*, 770*c* extending from a respective rocker arm pivot end 665*b*, 670*b*, 765*b*, 770*b* and configured to cammingly engage a corresponding outer circumferential cam surface 466*b*, 467*b*, 468*b*, 469*b* (shown in FIGS. 15A to 15D) of an associated cam 466, 467, 468, 469. In this manner, as either the first or second driveshafts 465, 475 rotate in their respective first or second rotating directions 465*b*, 475*b*, a corresponding cam 466, 467, 468, 469 may rotate against their associated cam engagement end 665*c*, 670*c*, 765*c*, 770*c*, thereby causing the corresponding rocker arm 665, 670, 765, 770 to pivot from its respective rocker arm locked position to its respective rocker arm unlocked position. Notably, as the rocker arm 665, 670, 765, 770 pivots from its respective rocker arm locked position to its respective rocker arm unlocked position, the lock latch 635, 640, 735, 740 associated with that rocker arm 665, 670, 765, 770 may likewise pivot from its respective locked position to its respective unlocked position due to coupling between its associated lock latch pivot end 635*b*, 640*b*, 735*b*, 740*b* and the respective linkage end 665*a*, 670*a*, 765*a*, 770*a* of the corresponding rocker arm 665, 670, 765, 770 via an associated linkage 675, 680, 775, 780.

For example, in an embodiment, the second cam engagement end 665*c* of the first rocker arm 665 may extend from the first rocker arm pivot end 665*b* and may cammingly engage the outer circumferential second cam surface 467*b* of the second cam 467. Thus, when the second driveshaft 475 rotates in the second rotating direction 475*b*, the second cam 467 may rotate against the second cam engagement end 665*c*, thereby causing the first rocker arm 665 to pivot from its first rocker arm locked position to its first rocker arm unlocked position. As the first rocker arm 665 pivots from its first rocker arm locked position to its first rocker arm unlocked position, the first lock latch 635 associated with that first rocker arm 665 may likewise pivot from its first locked position to its first unlocked position due to coupling between its first lock latch linkage opening 635*c* and the first linkage end 665*a* of the first rocker arm 665 via the first linkage 675.

Additionally, in another embodiment, the first cam engagement end 670*c* of the second rocker arm 670 may extend from the second rocker arm pivot end 670*b* and may cammingly engage the outer circumferential first cam surface 466*b* of the first cam 466. Thus, when the first driveshaft 465 rotates in the first rotating direction 465*b*, the first cam 466 may rotate against the first cam engagement end 670*c*, thereby causing the second rocker arm 670 to pivot from its second rocker arm locked position to its second rocker arm unlocked position. As the second rocker arm 670 pivots from its second rocker arm locked position to its second rocker arm unlocked position, the second lock latch 640 associated with that second rocker arm 670 may likewise pivot from its second locked position to its second unlocked position due to coupling between its second lock latch linkage opening 640*c* and the second linkage end 670*a* of the second rocker arm 670 via the second linkage 680.

Further, in another embodiment, the fourth cam engagement end 765*c* of the third rocker arm 765 may extend from the third rocker arm pivot end 765*b* and may cammingly engage the outer circumferential fourth cam surface 469*b* of the fourth cam 469. Thus, when the second driveshaft 475 rotates in the second rotating direction 475*b*, the fourth cam 469 may rotate against the fourth cam engagement end 765*c*, thereby causing the third rocker arm 765 to pivot from its third rocker arm locked position to its third rocker arm unlocked position. As the third rocker arm 765 pivots from its third rocker arm locked position to its third rocker arm unlocked position, the third lock latch 735 associated with that third rocker arm 765 may likewise pivot from its third locked position to its third unlocked position due to coupling between its third lock latch linkage opening 735*c* and the third linkage end 765*a* of the third rocker arm 765 via the third linkage 775.

Finally, in an embodiment, the third cam engagement end 770*c* of the fourth rocker arm 770 may extend from the fourth rocker arm pivot end 770*b* and may cammingly engage the outer circumferential third cam surface 468*b* of the third cam 468. In this manner, when the first driveshaft 465 rotates in the first rotating direction 465*b*, the third cam 468 may rotate against the third cam engagement end 770*c*, thereby causing the fourth rocker arm 770 to pivot from its fourth rocker arm locked position to its fourth rocker arm unlocked position. As the fourth rocker arm 770 pivots from its fourth rocker arm locked position to its fourth rocker arm unlocked position, the fourth lock latch 740 associated with that fourth rocker arm 770 may likewise pivot from its fourth locked position to its fourth unlocked position due to coupling between its fourth lock latch linkage opening 740*c* and the fourth linkage end 770*a* of the fourth rocker arm 770 via the fourth linkage 780.

Notably, FIG. 13 also shows that each rocker arm 665, 670, 765, 770 may comprise a respective rocker arm extension 665*d*, 670*d*, 765*d*, 770*d* extending from its respective linkage end 665*a*, 670*a*, 765*a*, 770*a* and configured to receive a respective latch manual ejection pin 671*a*, 671*b*, 671*c*, 671*d*. The respective lock latch manual ejection pin 671*a*, 671*b*, 671*c*, 671*d* is preferably configured to be engaged by a respective lock latch manual ejection rod 136 (shown in FIG. 16) of a manual ejection assembly 133*a*, 133*b*, 133*c*, 133*d*, such that when a manual ejection button 131*a*, 131*b*, 131*c*, 131*d* transitions from the raise position to the depressed position, a corresponding rocker arm 665, 670, 765, 770 may pivot from its respective rocker arm locked position to its corresponding rocker arm unlocked position. In this manner, the corresponding lock latch 635, 640, 735, 740 may likewise pivot from its respective locked position to its corresponding unlocked position.

For example, in an embodiment, the first rocker arm extension 665*d* of the first rocker arm 665 may extend from the first linkage end 665*a* and may include a first lock latch manual ejection pin 671*a* configured to be engaged by a first lock latch manual ejection rod 136. Thus, when a first manual ejection button 131*a* transitions from the raise position to the depressed position, the first rocker arm 665 may pivot from its first rocker arm locked position to its first rocker arm unlocked position, thereby pivoting the first lock latch 635 from its first locked position to its first unlocked position.

Additionally, in an embodiment, the second rocker arm extension 670*d* of the second rocker arm 670 may extend from the second linkage end 670*a* and may include a second lock latch manual ejection pin 671*b* configured to be engaged by a second lock latch manual ejection rod 136. Thus, when a second manual ejection button 131*b* transitions from the raise position to the depressed position, the second rocker arm 670 may pivot from its second rocker arm locked position to its second rocker arm unlocked position, thereby pivoting the second lock latch 640 from its second locked position to its second unlocked position.

Furthermore, in an embodiment, the third rocker arm extension 765*d* of the third rocker arm 765 may extend from the third linkage end 765*a* and may include a third lock latch manual ejection pin 671*c* configured to be engaged by a third lock latch manual ejection rod 136. Thus, when a third manual ejection button 131*c* transitions from the raise position to the depressed position, the third rocker arm 765 may pivot from its third rocker arm locked position to its third rocker arm unlocked position, thereby pivoting the third lock latch 735 from its third locked position to its third unlocked position.

Finally, in an embodiment, the fourth rocker arm extension 770*d* of the fourth rocker arm 770 may extend from the fourth linkage end 770*a* and may include a fourth lock latch manual ejection pin 671*d* configured to be engaged by a fourth lock latch manual ejection rod 136. Thus, when a fourth manual ejection button 131*d* transitions from the raise position to the depressed position, the fourth rocker arm 770 may pivot from its fourth rocker arm locked position to its fourth rocker arm unlocked position, thereby pivoting the fourth lock latch 740 from its fourth locked position to its fourth unlocked position.

As discussed above, a spacer 655, 660, 755, 760 may be disposed between a respective rocker arm 665, 670, 765, 770 and corresponding latch middle section 613, 713. Because a linkage 675, 680, 775, 780 may be positioned between the linkage end 665*a*, 670*a*, 765*a*, 770*a* of the rocker arm 665, 670, 765, 770 and forward or aft latch housing 605, 705, clearance is needed to permit pivotal movement of the rocker arm 665, 670, 765, 770 and associated linkage 675, 680, 775, 780. Thus, the spacer 655, 660, 755, 760 should have a thickness at least greater than the thickness of a cam inner thickness of a corresponding cam 466, 467, 468, 469. For example, in an exemplary embodiment, the first spacer 655 may have a thickness at least greater than the thickness of the second cam inner thickness associated with the inner circumferential second cam surface 467*a* of the second cam 467. Additionally, the second spacer 660 may have a thickness at least greater than the thickness of the first cam inner thickness associated with the inner circumferential first cam surface 466*a* of the first cam 466. Moreover, the third spacer 755 may have a thickness at least greater than the thickness of the fourth cam inner thickness associated with the inner circumferential fourth cam surface 469*a* of the fourth cam 469. Finally, the fourth spacer 765 may have a thickness at least greater than the thickness of the third cam inner thickness associated with the inner circumferential third cam surface 468*a* of the third cam 468.

Figure 14:
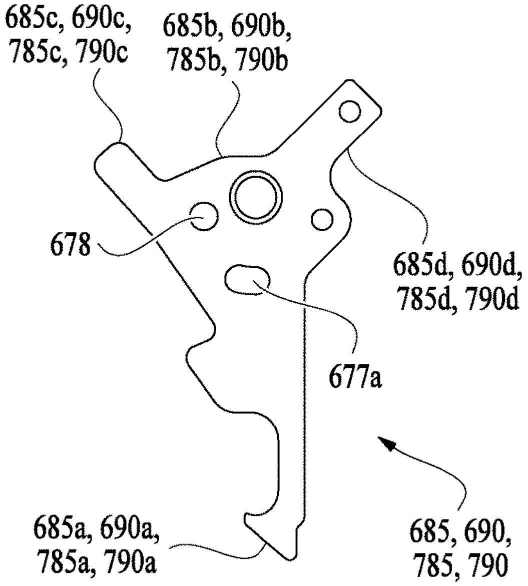
FIG. 14 is an illustration of a front elevation view of one embodiment of a release latch.

FIG. 14 is an illustration of a front elevation view of one embodiment of a release latch 685, 690, 785, 790. As shown in FIG. 14, embodiments of the release latch 685, 690, 785, 790 may comprise: a release latch hook end 685*a*, 690*a*, 785*a*, 790*a*, release latch pivot end 685*b*, 690*b*, 785*b*, 790*b*, cam engagement portion 685*c*, 690*c*, 785*c*, 790*c*, release latch extension 685*d*, 690*d*, 785*d*, 790*d*, release latch travel stop opening 677*a*, and release latch close assist pin opening 678. As a general matter, in exemplary embodiments, the first release latch hook end 685*a*, first release latch pivot end 685*b*, first cam engagement portion 685*c*, and first release latch extension 685*d* may correspond with the first release latch 685 located on the second side 605*b* of the forward latch housing 605; second release latch hook end 690*a*, second release latch pivot end 690*b*, second cam engagement portion 690*c*, and second release latch extension 690*d* may correspond with the second release latch 690 located on the first side 605*a* of the forward latch housing 605; third release latch hook end 785*a*, third release latch pivot end 785*b*, third cam engagement portion 785*c*, and third release latch extension 785*d* may correspond with the third release latch 785 located on the second side 705*b* of the aft latch housing 705; and fourth release latch hook end 790*a*, fourth release latch pivot end 790*b*, fourth cam engagement portion 790*c*, and fourth release latch extension 790*d* may correspond with the fourth release latch 790 located on the first side 705*a* of the aft latch housing 705.

As described above, a single release latch 685, 690, 785, 790 may pivotally mount onto each side 605*a*, 605*b*, 705*a*, 705*b* of the forward and aft latch housings 605, 705. Also, unlike the lock latches 635, 640, 735, 740, each release latch 685, 690, 785, 790 may be mounted on the right-hand side of each side 605*a*, 605*b*, 705*a*, 705*b* of the forward and aft latch housings 605, 705. Each release latch 685, 690, 785, 790 may be configured to pivot between a respective retaining position and a respective release position relative to the corresponding arm portion 610, 620, 710, 720 of the forward and aft latch housings 605, 705. For example, in an exemplary embodiment, a first release latch pivot end 685*b* of the first release latch 685 may pivotally mount to the second side 605*b* of the forward latch housing 605 via first pivot A, which may be aligned or disposed along the first UAV axis 111. The first release latch 685 may also pivot between a first retaining position (shown in FIG. 15B) and first release position (shown in FIG. 15D) relative to the first arm portion 610. Additionally, in an exemplary embodiment, a second release latch pivot end 690*b* of the second release latch 690 may pivotally mount to the first side 605*a* of the forward latch housing 605 via second pivot B, which may be aligned and disposed along the second UAV axis 222. The second release latch 690 may also pivot between a second retaining position (shown in FIG. 15A) and second release position (shown in FIG. 15C) relative to the second arm portion 620.

Regarding the third and fourth release latches 785, 790, in the same embodiments as above, the third release latch pivot end 785*b* of the third release latch 785 may pivotally mount to the second side 705*b* of the aft latch housing 705 via fourth pivot D, which is preferably aligned or disposed along the third UAV axis 333. The third release latch 785 may also pivot between a third retaining position (shown in FIG. 15B) and third release position (shown in FIG. 15D) relative to the third arm portion 710. Additionally, in an exemplary embodiment, the fourth release latch pivot end 790*b* of the fourth release latch 790 may pivotally mount to the first side 705*a* of the aft latch housing 705 via the fifth pivot E, which may be aligned and disposed along the fourth UAV axis 444. The fourth release latch 790 may also pivot between a fourth retaining position (shown in FIG. 15A) and fourth release position (shown in FIG. 15C) relative to the fourth arm portion 720.

In various embodiments, each release latch hook end 685*a*, 690*a*, 785*a*, 790*a* may have a top prong hook portion, which may cause a release latch hook end 685*a*, 690*a*, 785*a*, 790*a* to resemble the top prong 611, 621, 711, 721 of a respective arm portion 610, 620, 710, 720. Importantly, when the release latch 685, 690, 785, 790 is in its respective retaining position, its corresponding top prong hook portion may extend or project inwardly towards a corresponding bottom prong 612, 622, 712, 722 of the associated arm portion 610, 620, 710, 720. The top prong hook portion of the release latch hook end 685*a*, 690*a*, 785*a*, 790*a* may also be adjacent to a space between the corresponding top prong and bottom prong of the respective arm portion 610, 620, 710, 720 when the release latch 685, 690, 785, 790 is in its respective retaining position. In this manner, the top prong hook portion may further inhibit release of the UAV bar lug 104 from the forward latch housing 605 or aft latch housing 705 when the release latch 685, 690, 785, 790 is in its respective locked position.

For example, when the first release latch 685 is in its first retaining position, the first top prong hook portion of the first release latch hook end 685*a* may extend or project inwardly towards the first bottom prong 612 of the first arm portion 610 of the forward latch housing 605. The first top prong hook portion of the first release latch hook end 685*a* may also be adjacent to a first space between the first top prong 611 and first bottom prong 612 of the first arm portion 610 of the forward latch housing 605 when the first release latch 685 is in its first retaining position. Thus, when (1) the first UAV bar lug is located within the first space between the first top prong 611 and first bottom prong 612 of the first arm portion 610 and (2) the first release latch 685 is in its first retaining position, this may inhibit release of the first UAV 10*a* from the multiple UAV jettison apparatus 100.

Additionally, when the second release latch 690 is in its second retaining position, the second top prong hook portion of the second release latch hook end 690*a* may extend or project inwardly towards the second bottom prong 622 of the second arm portion 620 of the forward latch housing 605. The second top prong hook portion of the second release latch hook end 690*a* may also be adjacent to a second space between the second top prong 621 and second bottom prong 622 of the second arm portion 620 of the forward latch housing 605 when the second release latch 690 is in its second retaining position. Thus, when (1) the second UAV bar lug is located within the second space between the second top prong 621 and second bottom prong 622 of the second arm portion 620 and (2) the second release latch 690 is in its second retaining position, this may inhibit release of the second UAV 10*b* from the multiple UAV jettison apparatus 100.

Further, when the third release latch 785 is in its third retaining position, the third top prong hook portion of the third release latch hook end 785*a* may extend or project inwardly towards the third bottom prong 712 of the third arm portion 710 of the aft latch housing 705. The third top prong hook portion of the third release latch hook end 785*a* may also be adjacent to a third space between the third top prong 711 and third bottom prong 712 of the third arm portion 710 of the aft latch housing 705 when the third release latch 785 is in its third retaining position. Thus, when (1) the third UAV bar lug is located within the third space between the third top prong 711 and third bottom prong 712 of the third arm portion 710 and (2) the third release latch 785 is in its third retaining position, this may inhibit release of the third UAV 10*c* from the multiple UAV jettison apparatus 100.

Finally, when the fourth release latch 790 is in its fourth retaining position, the fourth top prong hook portion of the fourth release latch hook end 790*a* may extend or project inwardly towards the fourth bottom prong 722 of the fourth arm portion 720 of the aft latch housing 705. The fourth top prong hook portion of the fourth release latch hook end 790*a* may also be adjacent to a fourth space between the fourth top prong 721 and fourth bottom prong 722 of the fourth arm portion 720 of the aft latch housing 705 when the fourth release latch 790 is in its fourth retaining position. Thus, when (1) the fourth UAV bar lug is located within the fourth space between the fourth top prong 721 and fourth bottom prong 722 of the fourth arm portion 720 and (2) the fourth release latch 790 is in its fourth retaining position, this may inhibit release of the fourth UAV 10*d* from the multiple UAV jettison apparatus 100.

FIG. 14 also shows that each release latch 685, 690, 785, 790 may comprise a respective cam engagement portion 685*c*, 690*c*, 785*c*, 790*c* extending from a respective release latch pivot end 685*b*, 690*b*, 785*b*, 790*b* and configured to cammingly engage a respective inner circumferential cam surface 466*a*, 467*a*, 468*a*, 469*a*. In this manner, as either the first or second driveshafts 465, 475 rotate in their respective first or second rotating directions 465*b*, 475*b*, a corresponding cam 466, 467, 468, 469 may rotate against the respective cam engagement portion 685*c*, 690*c*, 785*c*, 790*c*, which may cause the corresponding release latch 685, 690, 785, 790 to pivot from its respective retaining position to its corresponding release position.

For example, in an exemplary embodiment, the first cam engagement portion 685*c* of the first release latch 685 may extend from the first release latch pivot end 685*b* and may cammingly engage the inner circumferential first cam surface 466*a* of the first cam 466. Thus, when the first driveshaft 465 rotates in the first rotating direction 465*b*, the first cam 466 may rotate against the first cam engagement portion 685*c*, thereby causing the first release latch 685 to pivot from its first retaining position to its first release position.

Additionally, in another exemplary embodiment, the second cam engagement portion 690*c* of the second release latch 690 may extend from the second release latch pivot end 690*b* and may cammingly engage the inner circumferential second cam surface 467*a* of the second cam 467. Thus, when the second driveshaft 475 rotates in the second rotating direction 475*b*, the second cam 467 may rotate against the second cam engagement portion 690*c*, thereby causing the second release latch 690 to pivot from its second retaining position to its second release position.

Further, in another exemplary embodiment, the third cam engagement portion 785*c* of the third release latch 785 may extend from the third release latch pivot end 785*b* and may cammingly engage the inner circumferential third cam surface 468*a* of the third cam 468. Thus, when the first driveshaft 465 rotates in the first rotating direction 465*b*, the third cam 468 may rotate against the third cam engagement portion 785*c*, thereby causing the third release latch 785 to pivot from its third retaining position to its third release position.

Finally, in another exemplary embodiment, the fourth cam engagement portion 790*c* of the fourth release latch 790 may extend from the fourth release latch pivot end 790*b* and may cammingly engage the inner circumferential fourth cam surface 469*a* of the fourth cam 469. Thus, when the second driveshaft 475 rotates in the second rotating direction 475*b*, the fourth cam 469 may rotate against the fourth cam engagement portion 790*c*, thereby causing the fourth release latch 790 to pivot from its fourth retaining position to its fourth release position.

FIG. 14 also shows that each release latch 685, 690, 785, 790 may comprise a respective release latch extension 685*d*, 690*d*, 785*d*, 790*d* extending from its respective release latch pivot end 685*b*, 690*b*, 785*b*, 790*b* and configured to receive a respective release latch manual ejection pin 672*a*, 672*b*, 672*c*, 672*d*. The respective release latch manual ejection pin 672*a*, 672*b*, 672*c*, 672*d* is preferably configured to be engaged by a respective release latch manual ejection rod 137 (shown in FIG. 16) of a manual ejection assembly 133*a*, 133*b*, 133*c*, 133*d*, such that when a manual ejection button 131*a*, 131*b*, 131*c*, 131*d* transitions from the raise position to the depressed position, the corresponding release latch 685, 690, 785, 790 may pivot from its respective retaining position to its corresponding release position, thereby manually releasing the corresponding UAV bar lug 104.

For example, in an embodiment, the first release latch extension 685*d* of the first release latch 685 may extend from the first release latch pivot end 685*b* and may include a first release latch manual ejection pin 672*a* configured to be engaged by a first release latch manual ejection rod 137. Thus, when a first manual ejection button 131*a* transitions from the raise position to the depressed position, the first release latch 685 may pivot from its first retaining position to its first release position.

Additionally, the second release latch extension 690*d* of the second release latch 690 may extend from the second release latch pivot end 690*b* and may include a second release latch manual ejection pin 672*b* configured to be engaged by a second release latch manual ejection rod 137. Thus, when a second manual ejection button 131*b* transitions from the raise position to the depressed position, the second release latch 690 may pivot from its second retaining position to its second release position.

Furthermore, the third release latch extension 785*d* of the third release latch 785 may extend from the third release latch pivot end 785*b* and may include a third release latch manual ejection pin 672*c* configured to be engaged by a third release latch manual ejection rod 137. Thus, when a third manual ejection button 131*c* transitions from the raise position to the depressed position, the third release latch 785 may pivot from its third retaining position to its third release position.

Finally, the fourth release latch extension 790*d* of the fourth release latch 790 may extend from the fourth release latch pivot end 790*b* and may include a fourth release latch manual ejection pin 672*d* configured to be engaged by a fourth release latch manual ejection rod 137. Thus, when a fourth manual ejection button 131*d* transitions from the raise position to the depressed position, the fourth release latch 790 may pivot from its fourth retaining position to its fourth release position.

In multiple embodiments, each release latch 685, 690, 785, 790 may also have a thickness substantially equal to the thickness of a cam inner thickness of a corresponding cam 466, 467, 468, 469 to allow the respective cam engagement portion 685*c*, 690*c*, 785*c*, 790*c* to engage with the corresponding cam 466, 467, 468, 469. For example, in an exemplary embodiment, the first release latch 685 may have a thickness substantially equal to the thickness of the first cam inner thickness associated with the inner circumferential first cam surface 466*a* of the first cam 466. Additionally, the second release latch 690 may have a thickness of substantially equal to the thickness of the second cam inner thickness associated with the inner circumferential second cam surface 467*a* of the second cam 467. Moreover, the third release latch 785 may have a thickness substantially equal to the thickness of the third cam inner thickness associated with the inner circumferential third cam surface 468*a* of the third cam 468. Finally, the fourth release latch 790 may have a thickness substantially equal to the thickness of the fourth cam inner thickness associated with the inner circumferential fourth cam surface 469*a* of the fourth cam 469.

Finally, FIG. 14 shows that each release latch 685, 690, 785, 790 may comprise a release latch travel stop opening 677*a* and a release latch close assist pin opening 678. The release latch travel stop opening 677*a* may be used to engage a release latch travel stop 677, which is configured to limit movement of a release latch 685, 690, 785, 790 beyond its respective retaining and release positions. Additionally, the release latch close assist pin opening 678 may be used to insert a release latch close assist pin 413*a*, 413*b*, 413*c*, 413*d*, which preferably aids in pivoting the respective release latch 685, 690, 785, 790 from its release position to its corresponding retaining position. Thus, when an ejector plate assembly 120*a*, 120*b*, 120*c*, 120*d* moves from its launch position to its stowed position, a release latch face 412*a*, 412*b*, 412*c*, 412*d* of a stowed stroke stop assembly 409*a*, 409*b*, 409*c*, 409*d* may engage a corresponding release latch close assist pin 413*a*, 413*b*, 413*c*, 413*d*, thereby closing and securing the respective release latch 685, 690, 785, 790 around a UAV bar lug 104.

FIGS. 15A to 15D are illustrations of front and rear elevation views of embodiments of either the forward latch assembly 600 or aft latch assembly 700 and show lock latches 635, 640, 735, 740 in their respective locked and unlocked positions and release latches 685, 690, 785, 790 in their respective retaining and release positions. As shown in FIGS. 15A to 15D, embodiments of the forward latch assembly 600 or aft latch assembly 700 may comprise: lock latches 635, 640, 735, 740, lock latch return springs 645, 650, 745, 750, rocker arms 665, 670, 765, 770, linkages 675, 680, 775, 780, release latches 685, 690, 785, 790, release latch return springs 695, 699, 795, 799, and cams 466, 467, 468, 469.

As a general matter, FIGS. 15A to 15D shows that each cam 466, 467, 468, 469 may comprise a corresponding cam flange portion, such that each cam 466, 467, 468, 469 comprises an inner circumferential cam surface 466*a*, 467*a*, 468*a*, 469*a* and an outer circumferential cam surface 466*b*, 467*b*, 468*b*, 469*b*. Additionally, each of the inner circumferential cam surfaces 466*a*, 467*a*, 468*a*, 469*a* and outer circumferential cam surfaces 466*b*, 467*b*, 468*b*, 469*b* may define a cam inner thickness and a cam outer thickness, thereby allowing certain latch components of the forward and aft latch assembly 600, 700 to overlap and operate alongside each other.

Figure 15B:
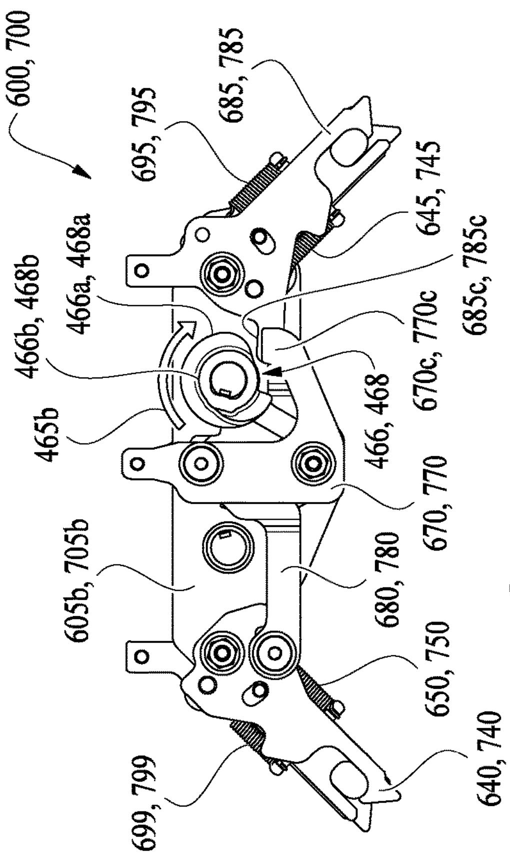
FIGS. 15A to 15D are illustrations of front elevation views of embodiments of either the forward latch assembly or aft latch assembly and show lock latches in their respective locked and unlocked positions and release latches in their respective retaining and release positions.
Figure 15D:
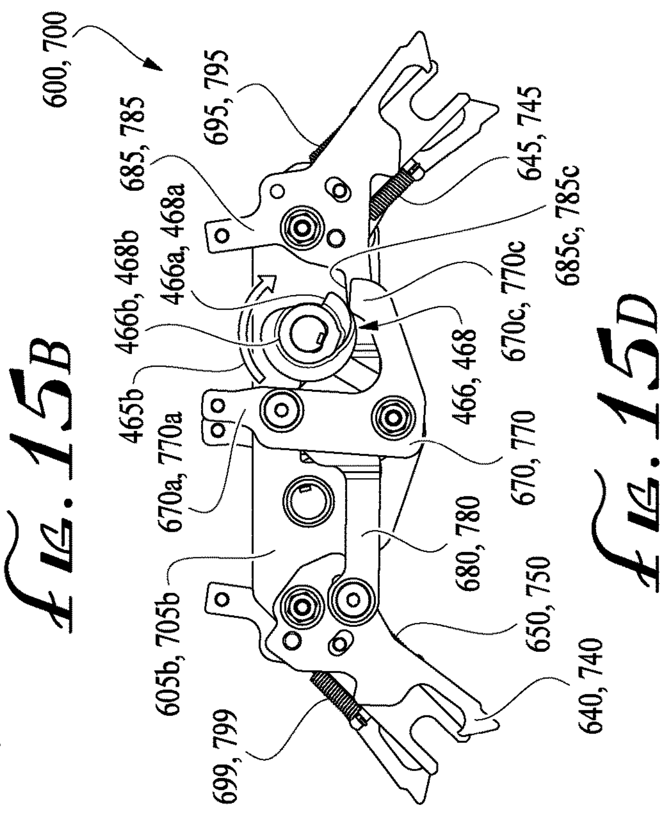

For example, assuming FIGS. 15B and 15D depict rear elevation views of an embodiment of the forward latch assembly 600, FIGS. 15B and 15D show that the first cam 466 may be located on the second side 605*b* or rear side of the forward latch assembly 600 and may comprise a first cam flange portion. Thus, the first cam 466 may comprise an inner circumferential first cam surface 466*a* and an outer circumferential first cam surface 466*b*. Additionally, the inner circumferential first cam surface 466*a* may have a first cam inner thickness whereas the outer circumferential first cam surface 466*b* may also have a first cam outer thickness. Here, the inner circumferential first cam surface 466*a* of the first cam 466 may cammingly engage a first cam engagement portion 685*c* of the first release latch 685, such that the inner circumferential first cam surface 466*a* and the first cam engagement portion 685*c* of the first release latch 685 have similar structural thicknesses. Additionally, in this same embodiment, the outer circumferential first cam surface 466*b* of the first cam 466 may cammingly engage a first cam engagement end 670*c* of the second rocker arm 670, such that the outer circumferential first cam surface 466*b* of the first cam 466 and the first cam engagement end 670*c* of the second rocker arm 670 likewise have a similar structural thicknesses. This may allow a portion of the first cam engagement end 670*c* of the second rocker arm 670 to somewhat overlap the first cam engagement portion 685*c* of the first release latch 685 on the second side 605*b* or rear side of the forward latch assembly 600. This configuration may extend to embodiments of the second cam 467, third cam 468, and fourth cam 469, as described below.

Figure 15A:
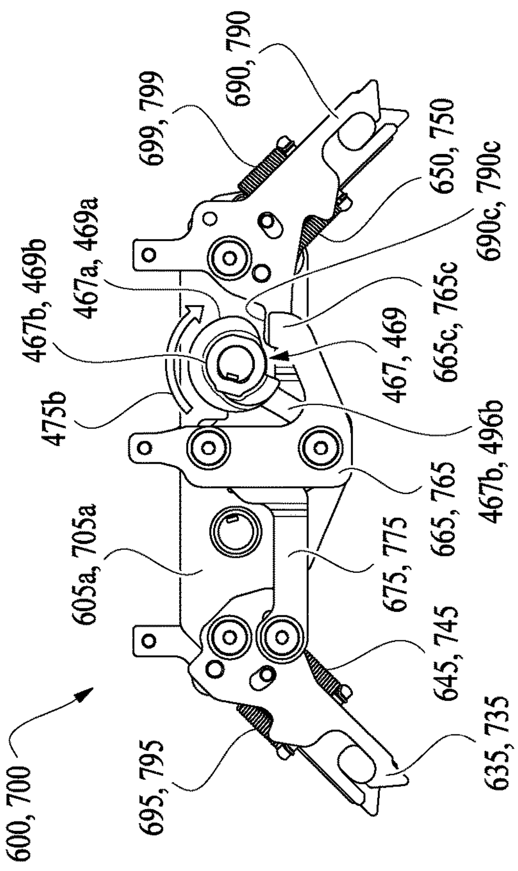
Figure 15C:
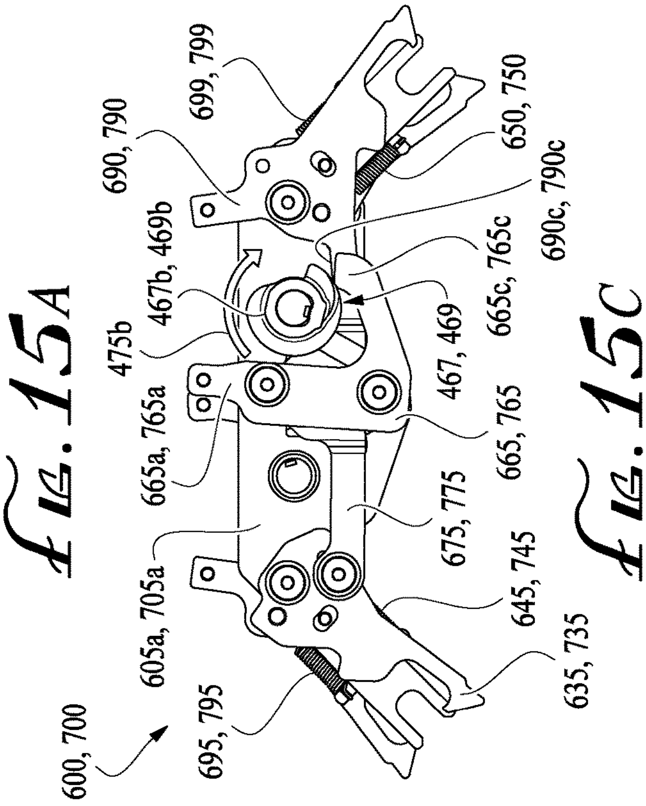

For example, assuming FIGS. 15A and 15C depict front elevation views of an embodiment of the forward latch assembly 600, FIGS. 15A and 15C show that the second cam 467 may be located on the first side 605*a* or front side of the forward latch assembly 600 and may comprise a second cam flange portion. Thus, the second cam 467 may comprise an inner circumferential second cam surface 467*a* and an outer circumferential second cam surface 467*b*. The inner circumferential second cam surfaces 467*a* may define a second cam inner thickness, whereas the outer circumferential second cam surface 467*b* may define a second cam outer thickness. Here, the inner circumferential second cam surface 467*a* of the second cam 467 may cammingly engage a second cam engagement portion 690*c* of the second release latch 690, such that the inner circumferential second cam surface 467*a* and the second cam engagement portion 690*c* of the second release latch 690 have similar structural thicknesses. Additionally, the outer circumferential second cam surface 467*b* of the second cam 467 may cammingly engage a second cam engagement end 665*c* of the first rocker arm 665, such that the outer circumferential second cam surface 467*b* of the second cam 467 and the second cam engagement end 665*c* of the first rocker arm 665 may likewise have similar structural thicknesses. This may allow a portion of the second cam engagement end 665*c* of the first rocker arm 665 to somewhat overlap the second cam engagement portion 690*c* of the second release latch 690 on the first side 605*a* or front side of the forward latch assembly 600.

Further, assuming FIGS. 15B and 15D depict rear elevation views of embodiments of the aft latch assembly 700, FIGS. 15B and 15D show that the third cam 468 may be located on the second side 705*b* or rear side of the aft latch assembly 700 and may comprise a third cam flange portion. Thus, the third cam 468 may comprise an inner circumferential third cam surface 468*a* and an outer circumferential third cam surface 468*b*. The inner circumferential third cam surface 468*a* may define a third cam inner thickness, whereas the outer circumferential third cam surface 468*b* may define a third cam outer thickness. Here, the inner circumferential third cam surface 468*a* of the third cam 468 may cammingly engage a third cam engagement portion 785*c* of the third release latch 785, such that the inner circumferential third cam surface 468*a* and third cam engagement portion 785*c* of the third release latch 785 may have similar structural thicknesses. Additionally, the outer circumferential third cam surface 468*b* of the third cam 468 may cammingly engage a third cam engagement end 770*c* of the fourth rocker arm 770, such that the outer circumferential third cam surface 468*b* of the third cam 468 and the third cam engagement end 770*c* of the fourth rocker arm 770 may likewise have similar structural thicknesses. This may allow a portion of the third cam engagement end 770*c* of the fourth rocker arm 770 to somewhat overlap the third cam engagement portion 785*c* of the third release latch 785 on the second side 705*b* or rear side of the aft latch assembly 700.

Finally, regarding the fourth cam 469, assuming FIGS. 15A and 15C depict front elevation views of an embodiment of the aft latch assembly 600, FIGS. 15A and 15C show that the fourth cam 469 may be located on the first side 705*a* or front side of the aft latch assembly 700 and may comprise a fourth cam flange portion. Thus, the fourth cam 469 may comprise an inner circumferential fourth cam surface 469*a* and an outer circumferential fourth cam surface 469*b*. The inner circumferential fourth cam surface 469*a* may define a fourth cam inner thickness, whereas the outer circumferential fourth cam surface 469*b* may define a fourth cam outer thickness. Here, the inner circumferential fourth cam surface 469*a* of the fourth cam 469 may cammingly engage a fourth cam engagement portion 790*c* of the fourth release latch 790, such that the inner circumferential fourth cam surface 469*a* and the fourth cam engagement portion 790*c* of the fourth release latch 790 may have similar structural thicknesses. Additionally, the outer circumferential fourth cam surface 469*b* of the fourth cam 469 may be configured to cammingly engage a fourth cam engagement end 765*c* of the third rocker arm 765, such that the outer circumferential fourth cam surface 469*b* of the fourth cam 469 and the fourth cam engagement end 765*c* of the third rocker arm 765 may likewise have similar structural thicknesses. This may allow a portion of the fourth cam engagement end 765*c* of the third rocker arm 765 to somewhat overlap the fourth cam engagement portion 790*c* of the fourth release latch 790 on the first side 705 or front side of the aft latch assembly 700.

Notably, FIG. 15A depicts a front elevation view of either the forward latch assembly 600 or aft latch assembly 700 and shows the lock latches 635, 640, 735, 740 in their respective locked positions and release latches 685, 690, 785, 790 in their respective retaining positions. Assuming FIG. 15A depicts a front elevation view of an embodiment of the forward latch assembly 600, FIG. 15A shows the operation of the major components located on the first side 605*a* of the forward latch assembly 600 (i.e., first rocker arm 665, first linkage 675, first lock latch 635, first lock latch return spring 645, second release latch 690, and second release latch return spring 699). As described above, the second cam engagement end 665*c* of the first rocker arm 665 may contact and cammingly engage the outer circumferential second cam surface 467*b* of the second cam 467. Additionally, the second cam engagement portion 690*c* of the second release latch 690 may contact and cammingly engage the inner circumferential second cam surface 467*a* of the second cam 467. Importantly, prior to rotation of the second driveshaft 475 in the second rotating direction 475*b*, (1) the first lock latch return spring 645 may continue to bias or urge the first lock latch 635 into the first locked position, and (2) the second release latch return spring 699 may continue to bias or urge the second release latch 690 into the second retaining position. As a result, FIG. 15A shows, on the first side 605*a* of this embodiment of the forward latch assembly 600, the first lock latch 635 in its first locked position, the first rocker arm 665 in its first rocker arm locked position, and the second release latch 690 in its second retaining position.

On the other hand, assuming FIG. 15A depicts a front elevation view of an embodiment of the aft latch assembly 700, FIG. 15A shows the operation of the major components located on the first side 705*a* of the aft latch assembly 700 (i.e., third rocker arm 765, third linkage 775, third lock latch 735, third lock latch return spring 745, fourth release latch 790, and fourth release latch return spring 799). As described above, the fourth cam engagement end 765*c* of the third rocker arm 765 may contact and cammingly engage the outer circumferential fourth cam surface 469*b* of the fourth cam 469. The fourth cam engagement portion 790*c* of the fourth release latch 790 may also contact and cammingly engage the inner circumferential fourth cam surface 469*a* of the fourth cam 469. Importantly, prior to rotation of the second driveshaft 475 in the second rotating direction 475*b*, (1) the third lock latch return spring 745 may continue to bias or urge the third lock latch 735 into its third locked position and (2) the fourth release latch return spring 799 may continue to bias or urge the fourth release latch 790 into its fourth retaining position. As a result, FIG. 15A shows, on the front side 705*a* of this embodiment of the aft latch assembly 700, the third lock latch 735 in its third locked position, the third rocker arm 765 in its third rocker arm locked position, and the fourth release latch 790 in its fourth retaining position.

Turning to FIG. 15B, FIG. 15B depicts a rear elevation view of an embodiment of either the forward latch assembly 600 or aft latch assembly 700 and shows the lock latches 635, 640, 735, 740 in their respective locked positions and release latches 685, 690, 785, 790 in their respective retaining positions. Assuming FIG. 15B depicts a rear elevation view of the forward latch assembly 600, FIG. 15B shows the operation of the major components located on the second side 605*b* of the forward latch assembly 600 (i.e., second rocker arm 670, second linkage 680, second lock latch 640, second lock latch return spring 650, first release latch 685, and first release latch return spring 695). As described above, the first cam engagement end 670*c* of the second rocker arm 670 may contact and cammingly engage the outer circumferential first cam surface 466*b* of the first cam 466. The first cam engagement portion 685*c* of the first release latch 685 may also contact and cammingly engage the inner circumferential first cam surface 466*a* of the first cam 466. Importantly, prior to rotation of the first driveshaft 465 in the first rotating direction 465*b*, (1) the second lock latch return spring 650 may continue to bias or urge the second lock latch 640 into its second locked position, and (2) the first release latch return spring 695 may continue to bias or urge the first release latch 685 into its first retaining position. As a result, FIG. 15B shows, on the second side 605*b* of this embodiment of the forward latch assembly 600, the second lock latch 640 in its second locked position, the second rocker arm 670 in its second rocker arm locked position, and the first release latch 685 in its first retaining position.

On the other hand, assuming FIG. 15B depicts a rear elevation view of an embodiment of the aft latch assembly 700, FIG. 15B shows the operation of the major components located on the second side 705*b* of the aft latch assembly 700 (i.e., fourth rocker arm 770, fourth linkage 780, fourth lock latch 740, fourth lock latch return spring 750, third release latch 785, and third release latch return spring 795). As described above, the third cam engagement end 770*c* of the fourth rocker arm 770 may contact and cammingly engage the outer circumferential third cam surface 468*b* of the third cam 468. The third cam engagement portion 785*c* of the third release latch 785 may also contact and cammingly engage the inner circumferential third cam surface 468*a* of the third cam 468. Importantly, prior to rotation of the first driveshaft 465 in the first rotating direction 465*b*, (1) the fourth lock latch return spring 750 may continue to bias or urge the fourth lock latch 740 into its fourth locked position, and (2) the third release latch return spring 795 may continue to bias or urge the third release latch 785 into its third retaining position. As a result, FIG. 15B shows, on the second side 705*b* of this embodiment of the aft latch assembly 700, the fourth lock latch 740 in its fourth locked position, the fourth rocker arm 770 in its fourth rocker arm locked position, and the third release latch 785 in its third retaining position.

Regarding FIG. 15C, FIG. 15C depicts an embodiment of the front elevation view of either the forward latch assembly 600 or aft latch assembly 700 and shows the lock latches 635, 640, 735, 740 in their respective unlocked positions and release latches 685, 690, 785, 790 in their respective release positions. Assuming FIG. 15C depicts a front elevation view of an embodiment of the forward latch assembly 600, FIG. 15C shows the operation of the major components located on the first side 605*a* of the forward latch assembly 600 (i.e., first rocker arm 665, first linkage 675, first lock latch 635, and second release latch 690). As described above, the second cam engagement end 665*c* of the first rocker arm 665 may contact and cammingly engage the outer circumferential second cam surface 467*b* of the second cam 467. The second cam engagement portion 690*c* of the second release latch 690 may also contact and cammingly engage the inner circumferential second cam surface 467*a* of the second cam 467. Importantly, FIG. 15C shows that, when the second driveshaft 475 rotates in the second rotating direction 475*b*, the second cam 467 may rotate against the second cam engagement end 665*c* of the first rocker arm 665, thereby causing the first rocker arm 665 to pivot from its first rocker arm locked position to its first rocker arm unlocked position. This may cause the first lock latch 635 associated with that first rocker arm 665 to likewise pivot from its first locked position to its first unlocked position due to coupling between its first lock latch linkage opening 635*c* and the first linkage end 665*a* of the first rocker arm 665 via the first linkage 675. When the second driveshaft 475 rotates in the second rotating direction 475*b*, the second cam 467 may also rotate against the second cam engagement portion 690*c* of the second release latch 690, thereby causing the second release latch 690 to pivot from its second retaining position to its second release position. As a result, FIG. 15C shows, on the first side 605*a* of this embodiment of the forward latch assembly 600, the first lock latch 635 in its first unlocked position, the first rocker arm 665 in its first rocker arm unlocked position, and the second release latch 690 in its second release position.

On the other hand, assuming FIG. 15C depicts a front elevation view of an embodiment of the aft latch assembly 700, FIG. 15C shows the operation of the major components located on the first side 705*a* of the aft latch assembly 700 (i.e., third rocker arm 765, third linkage 775, third lock latch 735, and fourth release latch 790). As described above, the fourth cam engagement end 765*c* of the third rocker arm 765 may contact and cammingly engage the outer circumferential fourth cam surface 469*b* of the fourth cam 469. The fourth cam engagement portion 790*c* of the fourth release latch 790 may also contact and cammingly engage the inner circumferential fourth cam surface 469*a* of the fourth cam 469. Importantly, FIG. 15C shows that, when the second driveshaft 475 rotates in the second rotating direction 475*b*, the fourth cam 469 may rotate against the fourth cam engagement end 765*c* of the third rocker arm 765, thereby causing the third rocker arm 765 to pivot from its third rocker arm locked position to its third rocker arm unlocked position. This may cause the third lock latch 735 associated with that third rocker arm 765 to likewise pivot from its third locked position to its third unlocked position due to coupling between its third lock latch linkage opening 735*c* and the third linkage end 765*a* of the third rocker arm 765 via the third linkage 775. When the second driveshaft 475 rotates in the second rotating direction 475*b*, the fourth cam 469 may also rotate against the fourth cam engagement portion 790*c* of the fourth release latch 790, thereby causing the fourth release latch 790 to pivot from its fourth retaining position to its fourth release position. As a result, FIG. 15C shows, on the first side 705*a* of this embodiment of the aft latch assembly 700, the third lock latch 735 in the third unlocked position, the third rocker arm 765 in the third rocker arm unlocked position, and the fourth release latch 790 in its fourth release position.

Finally, FIG. 15D depicts an embodiment of the rear elevation view of either the forward latch assembly 600 or aft latch assembly 700 and shows the lock latches 635, 640, 735, 740 in their respective unlocked positions and release latches 685, 690, 785, 790 in their respective release positions. Assuming FIG. 15D depicts a rear elevation view of an embodiment of the forward latch assembly 600, FIG. 15D shows the operation of the major components located on the second side 605*b* of the forward latch assembly 600 (i.e., second rocker arm 670, second linkage 680, second lock latch 640, and first release latch 685). As described above, the first cam engagement end 670*c* of the second rocker arm 670 may contact and cammingly engage the outer circumferential first cam surface 466*b* of the first cam 466. The first cam engagement portion 685*c* of the first release latch 685 may also contact and cammingly engage the inner circumferential first cam surface 466*a* of the first cam 466. Importantly, FIG. 15D shows that, when the first driveshaft 465 rotates in the first rotating direction 465*b*, the first cam 466 may rotate against the first cam engagement end 670*c* of the second rocker arm 670, thereby causing the second rocker arm 670 to pivot from its second rocker arm locked position to its second rocker arm unlocked position. This may cause the second lock latch 640 associated with that second rocker arm 670 to likewise pivot from its second locked position to its second unlocked position due to coupling between its second lock latch linkage opening 640*c* and the second linkage end 670*a* of the second rocker arm 670 via the second linkage 680. When the first driveshaft 465 rotates in the first rotating direction 465*b*, the first cam 466 may also rotate against the first cam engagement portion 685*c* of the first release latch 685, thereby causing the first release latch 685 to pivot from its first retaining position to its first release position. As a result, FIG. 15D shows, on the second side 605*b* of this embodiment of the forward latch assembly 600, the second lock latch 640 in its second unlocked position, the second rocker arm 670 in the second rocker arm unlocked position, and the first release latch 685 in its first release position.

On the other hand, assuming FIG. 15D depicts a rear elevation view of an embodiment of the aft latch assembly 700, FIG. 15D shows the operation of the major components located on the second side 705*b* of the aft latch assembly 700 (i.e., fourth rocker arm 770, fourth linkage 780, fourth lock latch 740, and third release latch 785). As described above, the third cam engagement end 770*c* of the fourth rocker arm 770 may contact and cammingly engage the outer circumferential third cam surface 468*b* of the third cam 468. The third cam engagement portion 785*c* of the third release latch 785 may also contact and cammingly engage the inner circumferential third cam surface 468*a* of the third cam 468. Importantly, when the first driveshaft 465 rotates in the first rotating direction 465*b*, the third cam 468 may rotate against the third cam engagement end 770*c* of the fourth rocker arm 770, thereby causing the fourth rocker arm 770 to pivot from its fourth rocker arm locked position to its fourth rocker arm unlocked position. This may cause the fourth lock latch 740 associated with that third rocker arm 770 to likewise pivot from its fourth locked position to its fourth unlocked position due to coupling between its fourth lock latch linkage opening 740*c* and the third linkage end 770*a* of the fourth rocker arm 770 via the fourth linkage 780. When the first driveshaft 465 rotates in the first rotating direction 465*b*, the third cam 468 may also rotate against the third cam engagement portion 785*c* of the third release latch 785, thereby causing the third release latch 785 to pivot from its third retaining position to its third release position. As a result, FIG. 15D shows, on the second side 705*b* of this embodiment of the aft latch assembly 700, the fourth lock latch 740 in its fourth unlocked position, the fourth rocker arm 770 in its fourth rocker arm unlocked position, and the third release latch 785 in its third release position.

Figure 16:
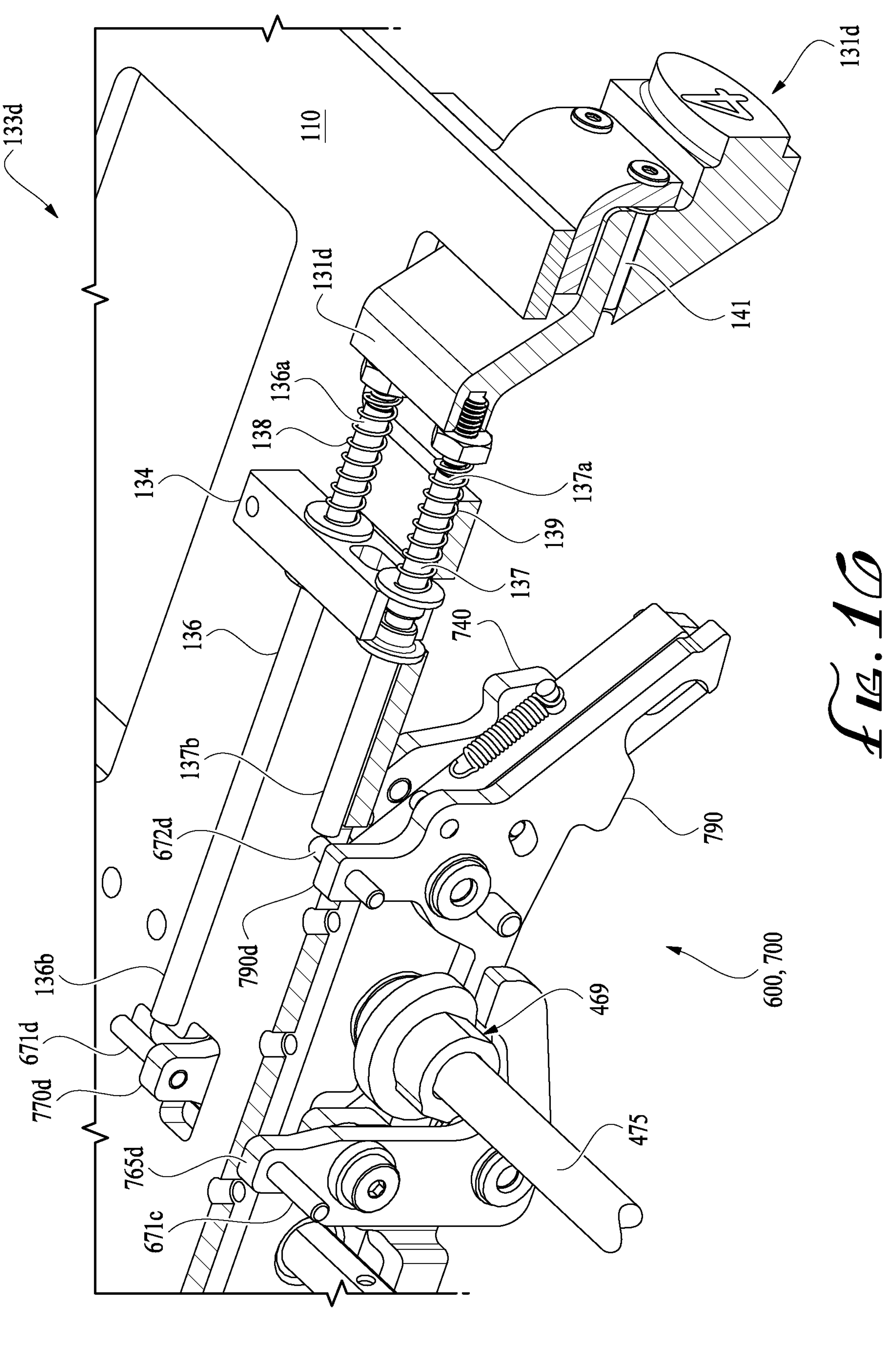
FIG. 16 is an illustration of a perspective view of one embodiment of a manual ejection assembly.

FIG. 16 is an illustration of a perspective view of one embodiment of a manual ejection assembly 133*d*. Specifically, FIG. 16 also shows a cutaway view of the manual ejection assembly 133_d_ without a portion of the top plate 110. As shown in FIG. 16, an embodiment of the manual ejection assembly 133_d_ may comprise: a manual ejection button 131_d_, manual ejection rod guide 134, lock latch manual ejection rod 136, release latch manual ejection rod 137, lock latch spring 138, and release latch spring 139. Notably, although FIG. 16 shows an embodiment of the fourth manual ejection assembly 133_d_ directed to UAV station 4 210_d_, the steps, components, and mechanisms shown in FIG. 16 and described herein may be applicable to the other UAV stations (i.e., UAV station 1 210_a_, UAV station 2 210_b_, UAV station 3 210_c_), which may include the other latches 625, 630, 725, forward latch assembly 600, first, second, and third manual ejection assemblies 133_a_, 133_b_, 133_c_, and associated components thereof.

As described above, the manual ejection assembly 133_a_, 133_b_, 133_c_, 133_d_, may be configured to manually release a UAV 10_a_, 10_b_, 10_c_, 10_d_ from a respective ejector plate assembly 120_a_, 120_b_, 120_c_, 120_d_ when a user presses the manual eject button 131_a_, 131_b_, 131_c_, 131_d_. The manual ejection assembly 133_a_, 133_b_, 133_c_, 133_d_ may be located near or proximate to that respective ejector plate assembly 120_a_, 120_b_, 120_c_, 120_d_ and is preferably in parallel relation with either the forward latch assembly 600 or aft latch assembly 700, as shown.

FIG. 16 shows that the manual ejection button 131_d_ may be slidably disposed within a manual ejection opening located on the fairing 115 (typically above the respective UAV opening) and may be guided by support pins 141. The manual ejection button 131_d_ may comprise a distal end 131_dd_ that extends upwards and above the top plate 110 and may be directly parallel with the forward latch assembly 600 or aft latch assembly 700. In this manner, the manual eject button 131_d_ may be capable of actuating the lock latch 635, 640, 735, 740 or release latch 685, 690, 785, 790 when the user presses the manual ejection button 131_d_.

FIG. 16 also shows a manual ejection rod guide 134 coupled above the top plate 110. The lock latch manual ejection rod 136 and release latch manual ejection rod 137 are preferably slidably coupled to the manual ejection rod guide 134 and are preferably disposed in parallel relation with each other. The first ends 136_a_, 137_a_ of the lock latch manual ejection rod 136 and release latch manual ejection rod 137 may also be coupled to the distal end 131_dd_ of the manual ejection button 131_d_, as shown. Thus, the manual ejection rod guide 134 is preferably positioned directly near the distal end 131_dd_ of the manual ejection button 131. The second end 136_b_ of the lock latch manual ejection rod 136 may be positioned near a fourth lock latch manual ejection pin 671_d_, which is generally coupled to a fourth rocker arm extension 770_d_. Similarly, the second end 137_b_ of the release latch manual ejection rod 137 may be positioned near a fourth release latch manual ejection pin 672_d_ that is coupled to a fourth release latch extension 790_d_.

Although FIG. 16 shows components of the fourth manual ejection assembly 133_d_ directed to UAV station 4 210_d_, the manual ejection assemblies 133_a_, 133_b_, 133_c_ of the other UAV stations may be structured similarly. For example, the second end 136_b_ of the lock latch manual ejection rod 136 may be positioned near the first, second, or third lock latch manual ejection pin 671_a_, 671_b_, 671_c_, which may be coupled to a first, second, or third rocker arm extension 665_d_, 670_d_, 765_d_. Similarly, the second end 137_b_ of the release latch manual ejection rod 137 may be positioned near the first, second, or third latch manual ejection pin 672_a_, 672_b_, 672_c_, that may be coupled to a corresponding first, second, or third release latch extension 685_d_, 690_d_, 785_d_.

Finally, FIG. 16 shows that the fourth manual ejection assembly 133_d_ may comprise a lock latch spring 138 and release latch spring 139. The lock latch spring 138 preferably surrounds a portion of the lock latch manual ejection rod 136, and the release latch spring 139 preferably surrounds a portion of the release latch manual ejection rod 137. Additionally, the lock latch spring 138 and release latch spring 139 are preferably positioned between the manual ejection rod guide 134 and distal end 131_dd_ of associated manual ejection button 131_d_. In this manner, the lock latch spring 138 and release latch spring 139 may bias the respective manual ejection button 131_d_ from a depressed position to a raised position.

In operation for all four manual ejection assemblies 133_a_, 133_b_, 133_c_, 133_d_, when the user presses the manual ejection button 131_a_, 131_b_, 131_c_, 131_d_, the manual ejection button 131_a_, 131_b_, 131_c_, 131_d_ may transition from its respective raise position to its corresponding depressed position, thereby causing the lock latch manual ejection rod 136 and release latch manual ejection rod 137 to slidably contact and push the associated lock latch manual ejection pin 671_a_, 671_b_, 671_c_, 671_d_ and corresponding release latch manual ejection pin 672_a_, 672_b_, 672_c_, 672_d_, respectively. As a result, the corresponding lock latch 635, 640, 735, 740 may pivot from its respective locked position to its corresponding unlocked position, while at the same time, the associated release latch 685, 690, 785, 790 may pivot from its respective retaining position to its corresponding release position. This may result in the lock latch 635, 640, 735, 740 and release latch 685, 690, 785, 790 releasing the UAV bar lug from the respective forward latch assembly 600 or aft latch assembly 700. When the user no longer presses the manual ejection button 131_a_, 131_b_, 131_c_, 131_d_, the lock latch spring 138 and release latch spring 139 preferably biases the manual ejection button 131_a_, 131_b_, 131_c_, 131_d_ from the depressed position to the raised position.

Figure 17A:
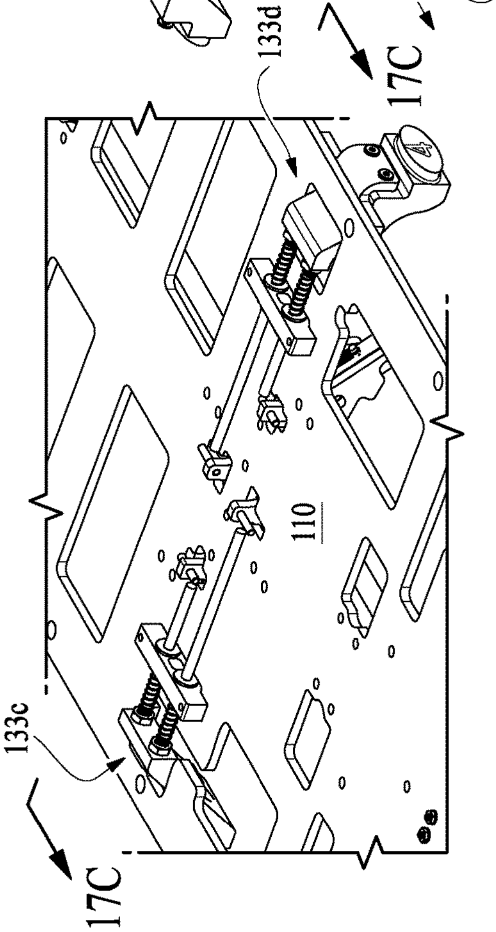
Figure 17C:
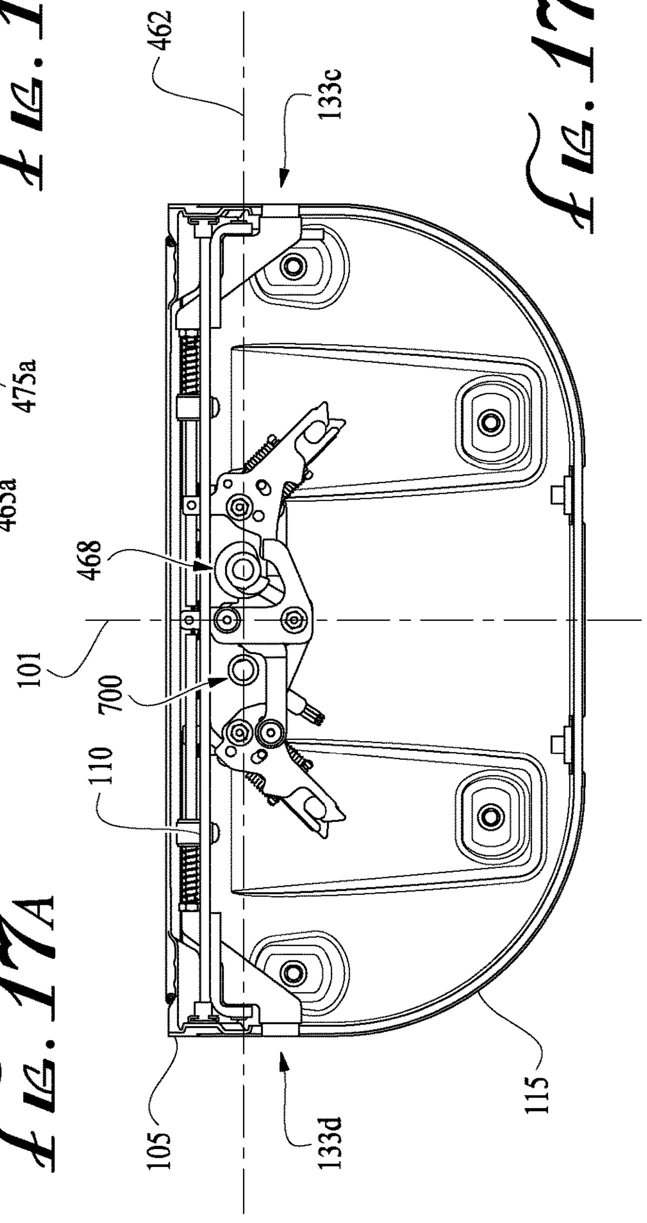

FIGS. 17A to 17C are illustrations of perspective and front elevation views of embodiments of the manual ejection assemblies 133_c_, 133_d_ and show the manual ejection assemblies 133_c_, 133_d_ operably coupled to the aft latch assembly 700. As shown in FIG. 17A, embodiments of the manual ejection assemblies 133_c_, 133_d_ may comprise: manual ejection buttons 131_c_, 133_d_, manual ejection rod guides 134, lock latch manual ejection rods 136, release latch manual ejection rods 137, lock latch springs 138, and release latch springs 139. Notably, although FIGS. 17A to 17C show embodiments of the third and fourth manual ejection assembly 133_c_, 133_d_ directed to UAV station 3 210_c_ and UAV station 4 210_d_, respectively, the steps, components, and mechanisms shown in FIGS. 17A to 17C and described herein may be applicable to other UAV stations (i.e., UAV station 1 210_a_, UAV station 2 210_b_), which may include the other latches 625, 630, forward latch assembly 600, first and second manual ejection assemblies 133_a_, 133_b_, and associated components thereof.

FIG. 17A shows that the third and fourth manual ejection assemblies 133_c_, 133_d_ may be positioned above the top plate 110 and may be located near the aft latch assembly 700. The distal ends 131_cc_, 131_dd_ of each manual ejection buttons 131_c_, 131_d_ may also extend above the top plate 110 and are typically attached to the lock latch and release latch manual ejection rods 136, 137. Further, the manual ejection rod guide 134 may be positioned above the top plate 110, and both the lock latch and release latch manual ejection rods

136, 137 may be slidably coupled to the manual ejection rod guide 134 and in parallel relation. Finally, FIG. 17A shows that the second ends 136*b* of the lock latch manual ejection rods 136 are preferably positioned near the corresponding third and fourth lock latch manual ejection pins 411*c*, 411*d*, whereas the second ends 137*b* of the release latch manual ejection rods 137 may be positioned near the third and fourth release latch manual ejection pins, all of which are preferably above the top plate 110.

FIG. 17B is a perspective view of the third and fourth manual ejection assemblies 133*c*, 133*d*, aft latch assembly 700, and driveline assembly 400 without the top plate 110. Here, FIG. 17B shows how the driveline assembly 400 may be operably coupled to the aft latch assembly 700 via the fourth cam 469. Also, FIG. 17B shows how the third and fourth manual ejection assemblies 133*c*, 133*d* may be positioned near the aft latch assembly 700. Finally, FIG. 17B shows how the first and second driveshafts 465, 475 may be aligned along a horizontal plane 462. Although FIG. 17B shows embodiments of the third and fourth manual ejection assemblies 133*c*, 133*d*, these components and mechanisms may be applicable to the forward latch assembly 600 and first and second manual ejection assemblies 133*a*, 133*b*.

FIG. 17C is a rear elevation view of the third and fourth manual ejection assemblies 133*c*, 133*d* taken from FIG. 17A. Like FIG. 17B, FIG. 17C shows how the driveline assembly 400 may be operably coupled to the aft latch assembly 700 via the third cam 468. FIG. 17C also shows how the third and fourth manual ejection assemblies 133*c*, 133*d* may be next or adjacent to the aft latch assembly 700 and how the first and second driveshafts 465, 475 may be aligned along a horizontal plane 462. FIG. 17C finally shows how the horizontal plane 462 may be traversed to the central vertical longitudinal plane 101 and how the first driveshaft 465 and second driveshaft 475 may be positioned on either side of the central vertical longitudinal plane 101.

FIGS. 18A to 18C are illustrations of perspective views and a front, exploded view of either a linear bearing forward station 300*a* or linear bearing aft station 300*b* and show how a pair of ejector plate assemblies 120*a*, 120*b*, 120*c*, 120*d* may operably couple to either the linear bearing forward station 300*a* or linear bearing aft station 300*b*. As shown in FIGS. 18A to 18C, embodiments of the linear bearing forward station 300*a* or linear bearing aft station 300*b* may comprise: support brackets 305, linear bearing assemblies 404*a*, 404*b*, 404*c*, 404*d*, and ejector plate assemblies 120*a*, 120*b*, 120*c*, 120*d*.

The linear bearing assemblies 404*a*, 404*b*, 404*c*, 404*d* may be configured to bias the ejector plate assemblies 120*a*, 120*b*, 120*c*, 120*d* from their stowed positions to their respective launch positions via spring action. Upon release via a respective latch, each ejector plate assembly 120*a*, 120*b*, 120*c*, 120*d* may be propelled into its launch position due to natural action of the coil springs 145. As mentioned above, each linear bearing assembly 404*a*, 404*b*, 404*c*, 404*d* may comprise: linear bearing sub-assemblies 410*a*, 410*b*, 410*c*, 410*d*, linear bearing rods 135, coil springs 145, and spring perches 155. Here, the coil springs 145 may surround the linear bearing rods 135 and may rest on the spring perches 155. The spring perches 155 may also interface the linear bearing sub-assemblies 410*a*, 410*b*, 410*c*, 410*d* to provide contact towards the coil springs 145 when each ejector plate assembly 120*a*, 120*b*, 120*c*, 120*d* moves between its respective stowed and launch positions. In this manner, when an ejector plate assembly 120*a*, 120*b*, 120*c*, 120*d* is operably coupled to its respective pair of linear bearing assemblies 404*a*, 404*b*, 404*c*, 404*d*, the coil springs 145 may bias that ejector plate assembly 120*a*, 120*b*, 120*c*, 120*d* along the length of the corresponding linear bearing rod 135. Thus, the coil springs 145 may provide a spring-loaded force to propel the ejector plate assemblies 120*a*, 120*b*, 120*c*, 120*d* downwards towards a corresponding UAV opening 121*a*, 121*b*, 121*c*, 121*d*. Because each ejector plate assembly 120*a*, 120*b*, 120*c*, 120*d* may be designed to move downwards along its respective linear bearing rods 135, the depth of the payload bay 105 may affect the length of the linear bearing rods 135. Although FIGS. 18A to 18C depict the use of spring perches 155 for each linear bearing assembly 404*a*, 404*b*, 404*c*, 404*d*, the linear bearing assemblies 404*a*, 404*b*, 404*c*, 404*d* may function without spring perches, such that the coil springs 145 may contact and provide a spring-loaded force against the linear bearing sub-assemblies 410*a*, 410*b*, 410*c*, 410*d* directly.

As discussed and shown above, the linear bearing forward station 300*a* and linear bearing aft station 300*b* may each comprise two pairs of linear bearing assemblies 404*a*, 404*b*, 404*c*, 404*d*. Each pair of linear bearing assemblies 404*a*, 404*b*, 404*c*, 404*d* may be disposed in parallel relation to each other along a respective plane. For example, FIGS. 16A and 16C show that one pair of linear bearing assemblies 404*a* may be disposed in parallel along a first diagonal plane 202, which may be associated with one UAV opening (e.g., first UAV opening 121*a*). FIGS. 16A and 16C also show another pair of linear bearing assemblies 404*b* disposed in parallel relation along a second diagonal plane 302, which may be associated with another UAV opening (e.g., second UAV opening 121*b*).

The support brackets 305 of the linear bearing forward station 300*a* and linear bearing aft station 300*b* may couple to the top plate 110 and be disposed in parallel relation to each other. For each pair of support brackets 305, either the forward latch assembly 600 or aft latch assembly 700 may be positioned between the support brackets 305, as shown in FIGS. 5 and 6. In particular, the forward latch assembly 600 may be positioned between the support brackets 305 of the linear bearing forward station 300*a*, whereas the aft latch assembly 700 may be positioned between the support brackets 305 of the linear bearing aft station 300*b*.

When the support brackets 305 are coupled to the top plate 110, the linear bearing forward station 300*a* and linear bearing aft station 300*b* may likewise be coupled to the top plate 110 and may be disposed in parallel relation to each other. When coupled to the top plate 110, the linear bearing forward station 300*a* and linear bearing aft station 300*b* may also have bilateral symmetry along a central vertical longitudinal plane 101, such that a first angle 201 between the first diagonal plane 202 and the vertical longitudinal plane 101 is substantially equal to a second angle 301 between the second diagonal plane 302 and the central vertical longitudinal plane 101.

Notably, the first ends 305*a* of each pair of support brackets 305 may couple to proximal ends of a pair of linear bearing assemblies 404*a*, 404*c*. These first ends 305*a* may also be angled at the first angle 201 with respect to the central longitudinal plane 101. In this manner, when fastening the first pair of linear bearing assemblies 404*a*, 404*c* to the support brackets 305, the first pair of linear bearing assemblies 404*a*, 404*c* may be aligned along the first diagonal plane 202. Similarly, the second ends 305*b* of each pair of support brackets 305 may couple to proximal ends of another pair of linear bearing assemblies 404*b*, 404*d*. These second ends 305*b* may also be angled at the second angle 301 with respect to the central longitudinal plane 101. In this manner, when fastening the second pair of linear bearing assemblies 404_b_, 404_d_ to the support brackets 305, the second pair of linear bearing assemblies 404_b_, 404_d_ may be aligned along the second diagonal plane 302. In order to maintain even payload weight distribution along the fuselage of the aircraft 200, the first angle 201 between the first diagonal plane 202 and the central vertical longitudinal plane 101 may be substantially equal to the second angle 301 between the second diagonal plane 302 and the central vertical longitudinal plane 101.

For example, in an exemplary embodiment, the linear bearing forward station 300_a_ may comprise first and second support brackets 305, and the forward latch assembly 600 may be positioned between these support brackets 305. Additionally, the first ends 305_a_ of these support brackets 305 may couple to proximal ends of a first pair of linear bearing sub-assemblies 410_a_ and may be angled at the first angle 201 with respect to the central vertical longitudinal plane 101. Thus, because the first pair of linear bearing sub-assemblies 410_a_ may be aligned with the first diagonal plane 202, the first diagonal plane 202 may be angled at the first angle 201 with respect to the central vertical longitudinal plane 101. Similarly, the second ends of the support brackets 305_b_ of the linear bearing forward station 300_a_ may couple to proximal ends of a second pair of linear bearing sub-assemblies 410_b_ and may be angled at a second angle 301 with respect to the central vertical longitudinal plane 101. Thus, because the second pair of linear bearing sub-assemblies 410_b_ may be aligned with the second diagonal plane 302, the second diagonal plane 302 may be angled at the second angle 301 with respect to the central vertical longitudinal plane 101.

Regarding the linear bearing aft station 300_b_, an exemplary embodiment of the linear bearing aft station 300_b_ may comprise third and fourth support brackets 305, and the aft latch assembly 700 may be positioned between these support brackets 305. Additionally, the first ends 305_a_ of the linear bearing aft station 300_b_ support brackets 305 may couple to proximal ends of a third pair of linear bearing sub-assemblies 410_c_ and may likewise be angled at a first angle 201 with respect to the central vertical longitudinal plane 101. Thus, because the third pair of linear bearing sub-assemblies 410_c_ may be aligned with the first diagonal plane 202, the first diagonal plane 202 may be angled at the first angle 201 with respect to the central vertical longitudinal plane 101. Similarly, the second ends 305_b_ of the support brackets 305 of the linear bearing aft station 300_b_ may couple to proximal ends of a fourth pair of linear bearing sub-assemblies 410_d_ and may be angled at a second angle 301 with respect to the central vertical longitudinal plane 101. Thus, because the fourth pair of linear bearing sub-assemblies 410_d_ may be aligned with the second diagonal plane 302, the second diagonal plane 302 may be angled at the second angle 301 with respect to the central vertical longitudinal plane 101.

Finally, FIG. 18C depicts a front elevation view of either a linear bearing forward station 300_a_ or linear bearing aft station 300_b_ and shows the relationship between the first angle 201 and second angle 301 with respect to the central vertical longitudinal plane 101. FIG. 18C shows that the linear bearing forward station 300_a_ or linear bearing aft station 300_b_ may have bilateral symmetry along the central vertical longitudinal plane 101, and in an exemplary embodiment, the first angle 201 and second angle 301 may be substantially equal. As a result, a pair of linear bearing sub-assemblies 410_a_, 410_b_, 410_c_, 410_d_ coupled to both ends of a single support bracket 305 may form a substantially inverted "V-shaped" figure, as shown in FIG. 18C.

Figure 19:
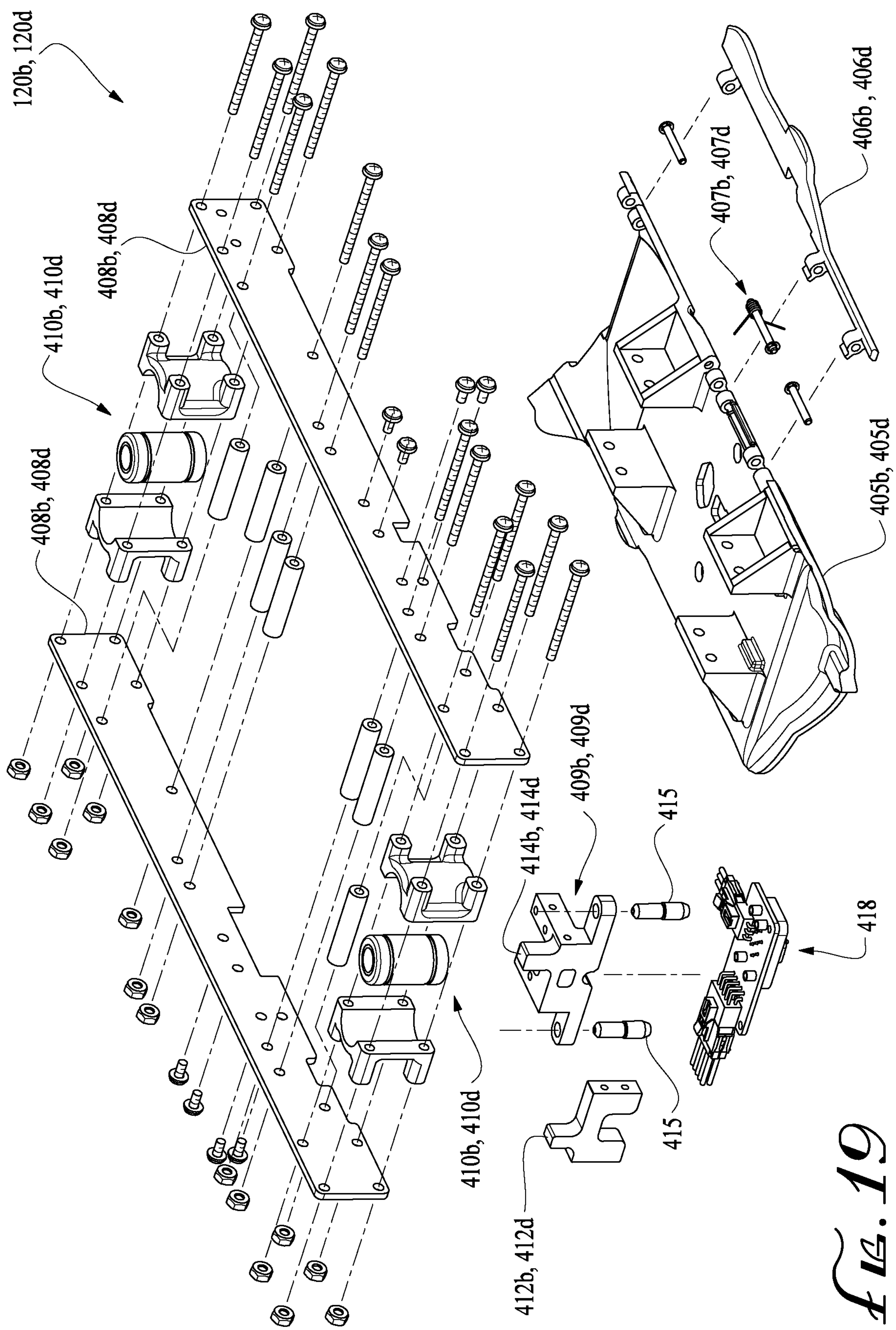
FIG. 19 is an illustration of an exploded view of one embodiment of an ejector plate assembly.

FIG. 19 is an illustration of an exploded view of one embodiment of an ejector plate assembly 120_b_, 120_d_. As recited above, each ejector plate assembly 120_b_, 120_d_ may substantially cover a corresponding UAV opening 121_b_, 121_d_ of the fairing 115 and may be used for mounting a UAV 10_b_, 10_d_ in an inverted manner. FIG. 19 shows that an embodiment of the ejector plate assembly 120_b_, 120_d_ may comprise: an ejector plate 405_b_, 405_d_, ejector plate flap 406_b_, 406_d_, supporting plates 408_b_, 408_d_, linear bearing sub-assemblies 410_b_, 410_d_, proximity sensor 418, and stowed stroke stop assembly 409_b_, 409_d_, all of which may correspond to UAV station 2 210_b_ or UAV station 4 210_d_. The stowed stroke stop assembly 409_b_, 409_d_ may further comprise a lock latch face 414_b_, 414_d_ and release latch face 412_b_, 412_d_. Although FIG. 19 shows an embodiment of the ejector plate assembly 120_b_, 120_d_ for either UAV station 2 210_b_ or UAV station 4 210_d_, components, and mechanisms shown in FIG. 19 and described herein may apply to ejector plate assemblies 120_a_, 120_c_ for UAV station 1 210_a_ or UAV station 3 210_c_ and components thereof, which may include ejector plates 405_a_, 405_c_, ejector plate flap 406_a_, 406_c_, supporting plates 408_a_, 408_c_, linear bearing sub-assemblies 410_a_, 410_c_, stowed stroke stop assemblies 409_a_, 409_c_, lock latch faces 414_a_, 414_c_ and release latch faces 412_a_, 412_c_, both configured to engage their respective latches.

In general, embodiments of a release latch face 412_a_, 412_b_, 412_c_, 412_d_ of an ejector plate assembly 120_a_, 120_b_, 120_c_, 120_d_ may be configured to engage a corresponding release latch close assist pin 413_a_, 413_b_, 413_c_, 413_d_. Upon engagement, the release latch face 412_a_, 412_b_, 412_c_, 412_d_ may pivot the respective release latch 685, 690, 785, 790 from their respective release position to their corresponding retaining position. Similarly, embodiments of a respective lock latch face 414_a_, 414_b_, 414_c_, 414_d_ may engage a corresponding lock latch close assist pin 411_a_, 411_b_, 411_c_, 411_d_. In doing so, the lock latch face 414_a_, 414_b_, 414_c_, 414_d_ may also pivot the respective lock latch 635, 640, 735, 740 from their respective unlocked position to their corresponding locked position.

The release latch face 412_a_, 412_b_, 412_c_, 412_d_ contacting the latch close assist pin 413_a_, 413_b_, 413_c_, 413_d_ and the lock latch face 414_a_, 414_b_, 414_c_, 414_d_ contacting the latch close assist pin 411_a_, 411_b_, 411_c_, 411_d_ also centrally locates all the forces experienced by the top plate 110 via the UAV 10_a_, 10_b_, 10_c_, 10_d_ through latch assembly 600, 700 during launch, recovery, and transit. In addition, the forces experienced by the latches 625, 630, 725, 730 also travel through the latch assembly 600, 700 to the top plate 110. Consolidation of the external forces through the latch assembly 600, 700 may minimize the resultant force the top plate 110 is required to resist in a localized area. The result is that the latch assembly 600, 700 may be sufficiently rigid to counteract the pulling and pushing of the forces, and the top plate 110 rigidity can be minimized causing substantial weight savings. Because the top plate assembly 125 is a large volume, minimizing the thickness of the top plate 110 may be necessary to maximize payload weight, especially in payload limited aircraft 200.

Like the fairing 115, embodiments of the ejector plate 405_a_, 405_b_, 405_c_, 405_d_ may have an outer aerodynamic surface used for reducing drag and may comprise ejector plate recesses located beneath the ejector plate 405_a_, 405_b_, 405_c_, 405_d_ for alignment and stability when mounting the UAV 10_a_, 10_b_, 10_c_, 10_d_. Embodiments of the ejector plate flap 406_a_, 406_b_, 406_c_, 406_d_ may also be operably coupled to the ejector plate 405_a_, 405_b_, 405_c_, 405_d_ and may provide additional clearance when mounting the UAV 10_a_, 10_b_, 10_c_, 10*d* within the payload bay 105. By allowing a large portion of the UAV 10*a*, 10*b*, 10*c*, 10*d* and ejector plate assembly 120*a*, 120*b*, 120*c*, 120*d* to be positioned within the payload bay 105, the center of gravity of the aircraft 200 may be less affected by the additional weight distribution caused by the UAVs 10*a*, 10*b*, 10*c*, 10*d*. The ejector plate flap 406*a*, 406*b*, 406*c*, 406*d* may also provide further coverage to the corresponding UAV opening 121*a*, 121*b*, 121*c*, 121*d* when the UAV 10*a*, 10*b*, 10*c*, 1*d* is jettison or ejected.

Various embodiments of the ejector plate flap 406*a*, 406*b*, 406*c*, 406*d* may be spring-loaded via a torsion spring 407*a*, 407*b*, 407*c*, 407*d* against a rotational travel stop when a UAV 10*a*, 10*b*, 10*c*, 1*d* is not loaded. When a UAV 10*a*, 10*b*, 10*c*, 10*d* is inserted and pushed upwards and inwards towards the payload bay 105, the respective ejector plate flap 406*a*, 406*b*, 406*c*, 406*d* may contact the top plate assembly 125 and swivel, causing the ejector plate flap 406*a*, 406*b*, 406*c*, 406*d* not to interfere with insertion of the UAV 10*a*, 10*b*, 10*c*, 10*d*. Upon ejection of the UAV 10*a*, 10*b*, 10*c*, 10*d*, the torsion spring 407*a*, 407*b*, 407*c*, 407*d* may return the ejector plate flap 406*a*, 406*b*, 406*c*, 406*d* against its rotational stop to close in its original position.

Embodiments of the support plates 408*a*, 408*b*, 408*c*, 408*d* may be orthogonally coupled to their respective ejector plate 405*a*, 405*b*, 405*c*, 405*d* and may be disposed in parallel to fasten a pair of linear bearing sub-assemblies 410*a*, 410*b*, 410*c*, 410*d* to the ejector plate 405*a*, 405*b*, 405*c*, 405*d*. In this manner, the linear bearing sub-assemblies 410*a*, 410*b*, 410*c*, 410*d* may be sandwiched between the support plates 408*a*, 408*b*, 408*c*, 408*d* while providing strengthening support to the ejector plate 405*a*, 405*b*, 405*c*, 405*d*.

As mentioned above, embodiments of the linear bearing sub-assemblies 410*a*, 410*b*, 410*c*, 410*d* may fixedly attached to the support plates 408*a*, 408*b*, 408*c*, 408*d* and may operably receive the linear bearing rods 135*a*, 135*b*, 135*c*, 135*d*. Thus, the linear bearing sub-assemblies 410*a*, 410*b*, 410*c*, 410*d* may provide free vertical movement of the corresponding ejector plate 405*a*, 405*b*, 405*c*, 405*d* along the linear bearing rods 135*a*, 135*b*, 135*c*, 135*d* and may guide the support plates 408*a*, 408*b*, 408*c*, 408*d* and ejector plate 406*a*, 406*b*, 406*c*, 406*d* with their respective UAV 10*a*, 10*b*, 10*c*, 10*d* to provide proper alignment. Various embodiments of the ejector plate assembly 120*a*, 120*b*, 120*c*, 120*d* may also include other components such as a connector designed to provide electrical communication to the UAVs 10*a*, 10*b*, 10*c*, 10*d*, such that telemetry between the aircraft 200 and UAVs 10*a*, 10*b*, 10*c*, 10*d* is established. Also, the proximity sensor 418 may be used to indicate whether the ejector plate assembly 120*a*, 120*b*, 120*c*, 120*d* has been moved towards the fairing 115. Shear pins 415 in the stowed stroke stop assembly 409*a*, 409*b*, 409*c*, 409*d* provide additional structural rigidity to the UAVs 10*a*, 10*b*, 10*c*, 10*d*. The shear pins 415 may be captured within the structural backbone of the UAV 10*a*, 10*b*, 10*c*, 10*d*, such that when the aircraft 200 launches and is recovered, the UAV remains structurally tied to the ejector plate assembly 120*a*, 120*b*, 120*c*, 120*d*. The shear pins 415 are intended to relieve axial forces from launching and recovering the aircraft 200.

Figure 20A:
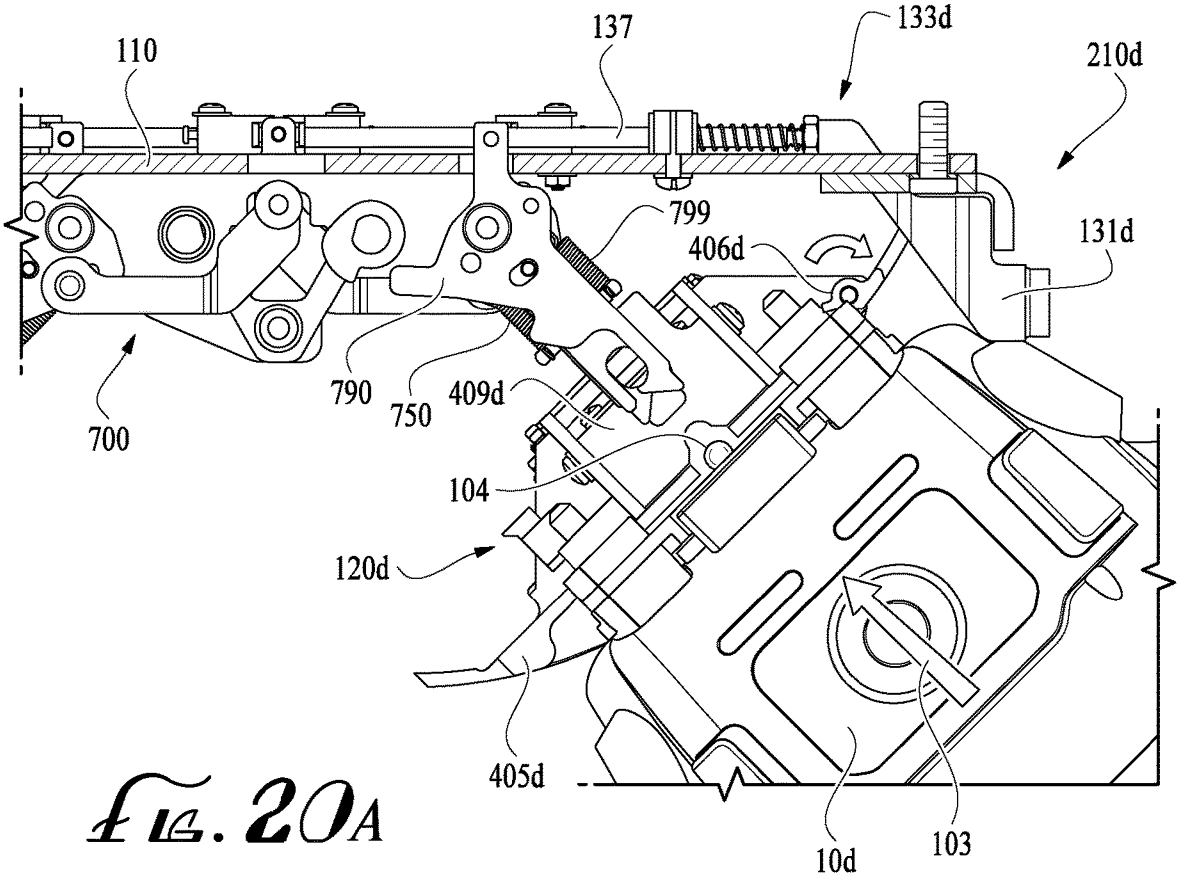
FIGS. 20A to 20C are illustrations of cutaway views of one embodiment of the multiple UAV jettison apparatus and show a UAV being loaded onto the multiple UAV jettison apparatus.
Figure 20B:
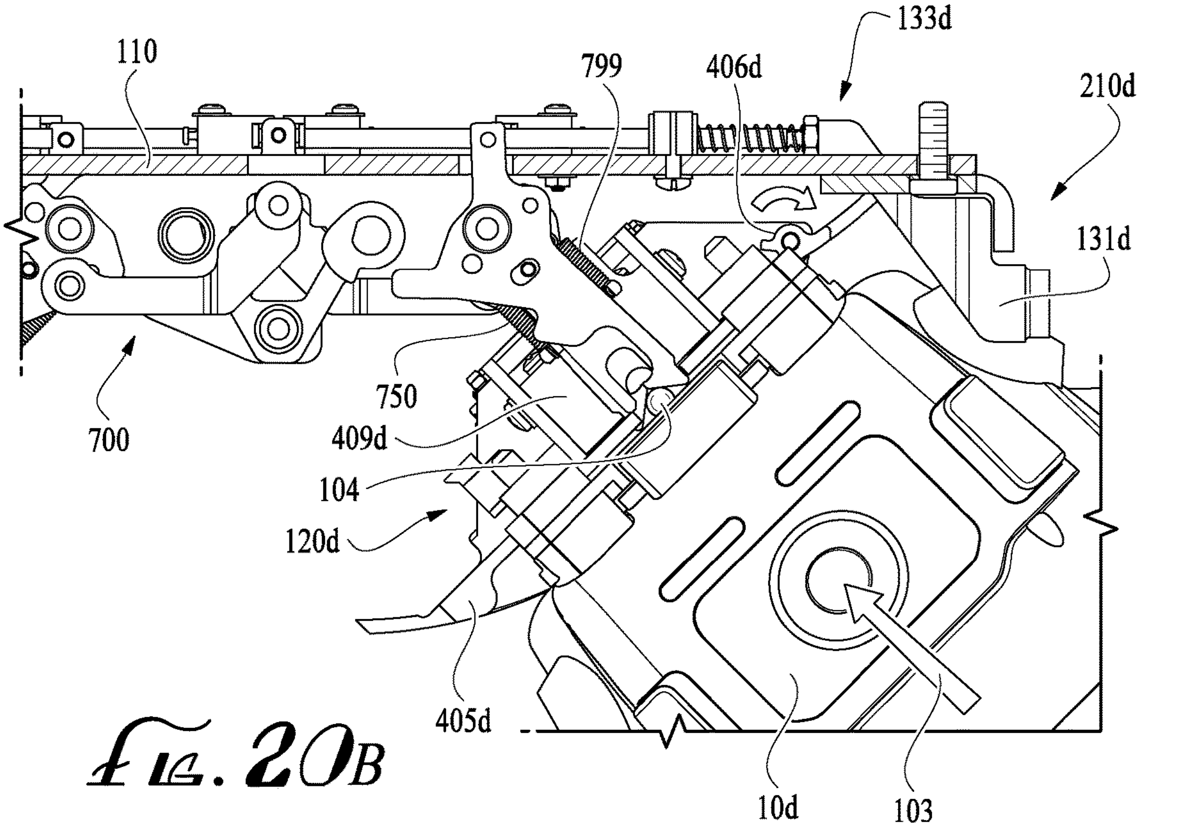
Figure 20C:
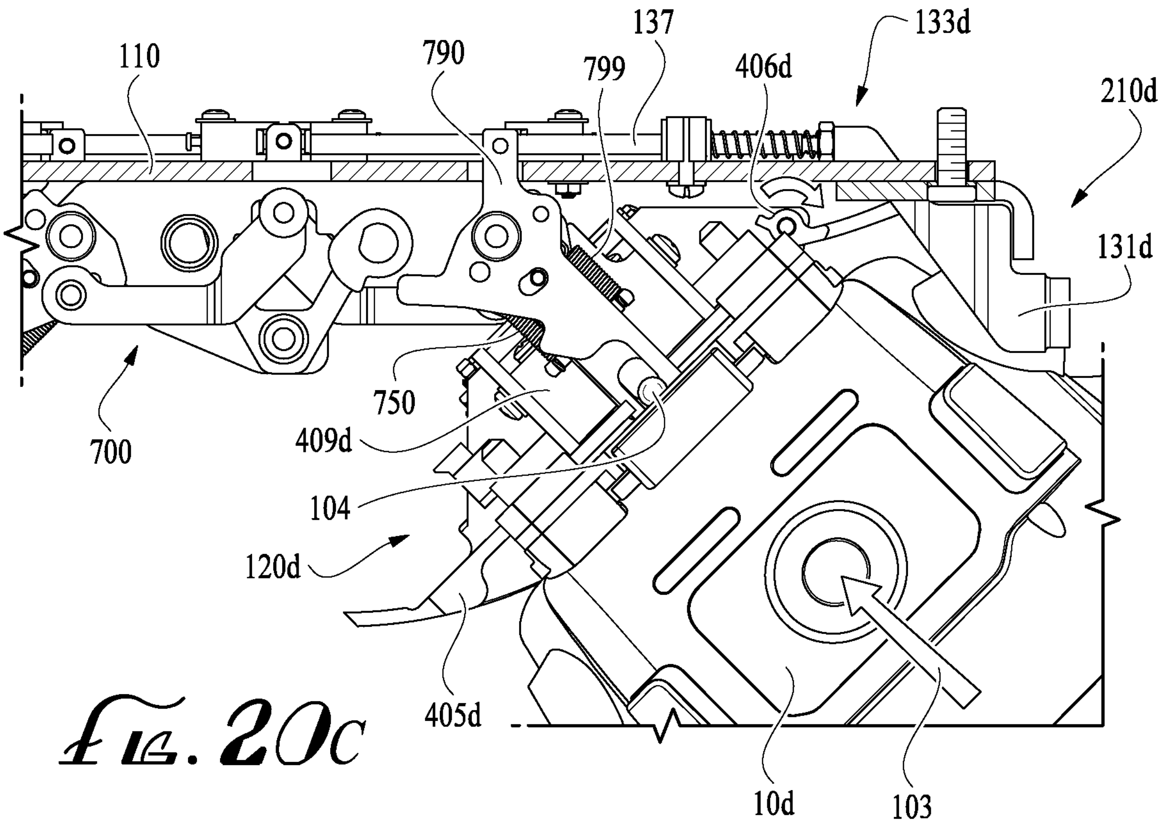

FIGS. 20A to 20C are illustrations of cutaway views of one embodiment of the multiple UAV jettison apparatus 100 and show a UAV 10*d* being loaded onto the multiple UAV jettison apparatus 100. As shown in FIGS. 20A to 20C, one embodiment of the multiple UAV jettison apparatus 100 may comprise a top plate 110, aft latch assembly 700, ejector plate assembly 120*d*, and manual ejection assembly 133*d*, all of which may correspond to UAV station 4 210*d*. The ejector plate assembly 120*d* may further comprise a stowed stroke stop assembly 409*d* and an ejector plate flap 406*d* operably coupled to the ejector plate 405. Notably, although FIGS. 20A to 20C show an embodiment directed to UAV station 4 210*d*, the steps, components, and mechanisms shown in FIGS. 20A to 20C and described herein may be applicable to UAV station 1 210*a*, UAV station 2 210*b*, and UAV station 3 210*c*, which may include the other latches 625, 630, 725, forward latch assembly 600, ejector plate assemblies 120*a*, 120*b*, 120*c*, manual ejection assemblies 133*a*, 133*b*, 133*c*, and associated components thereof.

FIG. 20A shows that, an upward force 103 may be applied onto the UAV 10*d* and may compress the coil springs 145 surrounding the linear bearing rods 135. Prior to applying the upward force 103, the lock latch 740 and release latch 790 may be in their locked position and retaining position, respectively, via the lock latch return spring 750 and release latch return spring 799 until the lock latch 740 and release latch 790 receive contact from the UAV bar lug 104 of the UAV 10*d*. Additionally, the ejector plate flap 406*d* may be held by an ejector plate flap torsion spring 407*d* biasing the ejector plate flap 406*d* against a rotational stop, until the ejector plate assembly 120*d* contacts the top plate 110 and the ejector plate flap 406*d* begins to rotate away.

In some embodiments, the ejector plate assembly 120*a*, 120*b*, 120*c*, 120*d* may further comprise pogo pins (not shown) configured to contact the pogo pin pads on the UAV 10*a*, 10*b*, 10*c*, 10*d* to provide electrical communication, indicating whether the UAV 10*a*, 10*b*, 10*c*, 10*d* is in the stowed position. In other embodiments, the multiple UAV jettison apparatus 100 may further comprise a proximity sensor 418 to indicate whether the ejector plate assembly 120*a*, 120*b*, 120*c*, 120*d* has been moved towards the fairing 115, allowing for an electrical indication that the ejector plate assembly 120*a*, 120*b*, 120*c*, 120*d* is in the launched position.

FIG. 20B shows that as an upward force 103 continues to be applied onto the UAV 10*d*, the UAV bar lug 104 may contact the slope end of each hook portion of the latch 730 (e.g., lock latch 740 and release latch 790). In this manner, the upward force 103 may apply a torque that overcomes the lock latch return spring 750 and release latch return spring 799, thereby pivoting the lock latch 740 and release latch 790 open. The ejector plate flap 406*d* may also continue contact with the top plate 110 and may continue to rotate.

Finally, FIG. 20C shows that, after the UAV bar lug 104 clears the slope end of each hook portion for the lock latch 740 and release latch 790, the lock latch 740 and release latch 790 may rotate inwards and close into its locked position and retaining position due to the spring forces of the lock latch return spring 750 and release latch return spring 799. The chamfer on the aft latch housing 705 may align the UAV bar lug 104 in the latch 730 and prevent yawing from inadvertently opening of the latch 730. In some embodiments, switches may be implemented above the top plate 110 and may be contacted by either the lock latch 635, 640, 735, 740 or release latch 685, 690, 785, 790 to provide an electrical indication that the respective latch 625, 630, 725, 730 (e.g., lock latch 635, 640, 735, 740 and release latch 685, 690, 785, 790) is closed.

Figure 21:
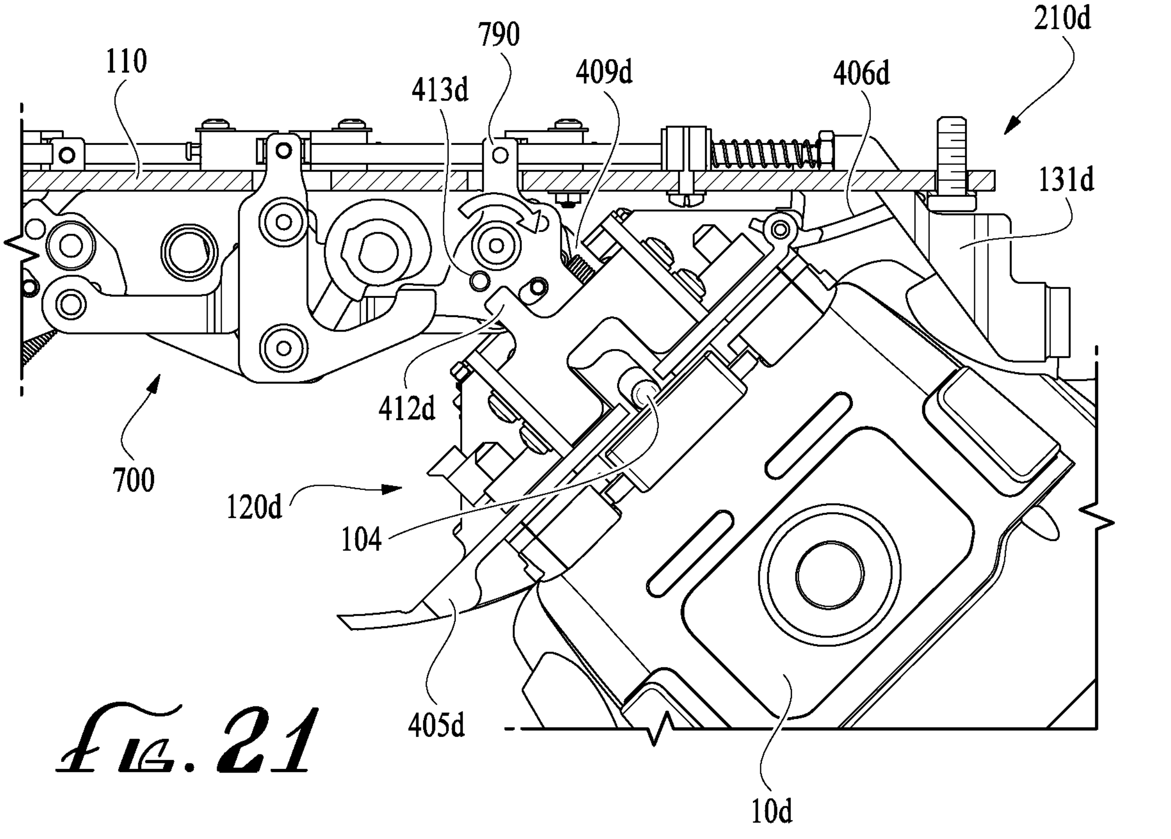
FIG. 21 is an illustration of cutaway view of one embodiment of the multiple UAV jettison apparatus and shows how a release latch face of an ejector plate assembly may engage a release latch close assist pin to pivot a release latch from a release position to a retaining position.

FIG. 21 is an illustration of cutaway view of one embodiment of the multiple UAV jettison apparatus 100 and shows how a release latch face 412*d* of an ejector plate assembly 120*d* may engage a release latch close assist pin 413*d* to pivot a release latch 790 from a release position to a retaining position. As shown in FIG. 21, one embodiment of the multiple UAV jettison apparatus 100 may comprise a top plate 110, aft latch assembly 700, ejector plate assembly 120*d*, and manual ejection assembly 133*d*. The ejector plate assembly 120*d* may further comprise a stowed stroke stop assembly 409*d*, comprising a release latch face 412*d*. Notably, although FIG. 21 shows an embodiment directed to UAV station 4 210*d*, the steps, components, and mechanisms shown in FIG. 21 and described herein may be applicable to UAV station 1 210*a*, UAV station 2 210*b*, and UAV station 3 210*c*, all of which may include the other latches 625, 630, 725, forward latch assembly 600, ejector plate assemblies 120*a*, 120*b*, 120*c*, manual ejection assemblies 133*a*, 133*b*, 133*c*, and associated components thereof.

FIG. 21 shows that when the ejector plate assembly 120*d* moves from its launch position to its stowed position, the release latch face 412*d* may engage the release latch close assist pin 413*d* and pivot the release latch 790 from its release position to its retaining position. At the same time, the lock latch face 414*d* of the stowed stroke stop assembly 409*d* may likewise engage the lock latch close assist pin 411*d*, thereby pivoting the lock latch 740 from its unlocked position to its locked position. Thus, when the ejector plate assembly 120*d* moves from its launch position to its stowed position, the lock latch 740 and release latch 790 may clamp around the UAV bar lug 104.

Importantly, FIG. 21 shows that the stowed stroke stop assembly 409*d* may contact the lock latch close assist pin 411*d* and release latch close assist pin 413*d* when the ejector plate assembly 120*d* transitions upwards into the stowed position. This may occur in two instances: (1) during insertion of the UAV 10*d*, where upward force 103 on the UAV 10*d* may translate into a force pushing the fourth lock latch 740 and fourth release latch 790, thereby ensuring that the fourth lock latch 740 and fourth release latch 790 are completely closed; and (2) when a G force is exerted with respect to the forward/aft direction of the aircraft 200, as for example, during the aircraft's catapult launch or rope recovery. During these events, while the UAV 10*d* is in the stowed position, the UAV 10*d* may pivot around the bar lug 104, with the feet of the UAV 10*d* on the opposite end of the axial force pushing the ejector plate assembly 120*d* upwards into the payload bay 105. This may force the stowed stroke stop assembly 409*d* into either the lock latch close assist pin 411*d* or release latch close assist pin 413*d*, keeping the lock latch 740 and release latch 790 closed, thereby making it difficult for the lock latch 740 and release latch 790 to open under high G launch/recovery events. Alternatively, during launch and recovery conditions, the result is that the UAV 1*d* becomes more retained, as the forces acting on the UAV 10*d* increase. This is generally critical for the safety of the aircraft 200 during launch events, as an inadvertent UAV release during launch may result in the UAV 10*d* contacting the aircraft's propeller and downing the aircraft 200. Conversely, an inadvertent release of a UAV 1*d* may pose a safety concern to personnel in the form of flying debris.

Figure 22A:
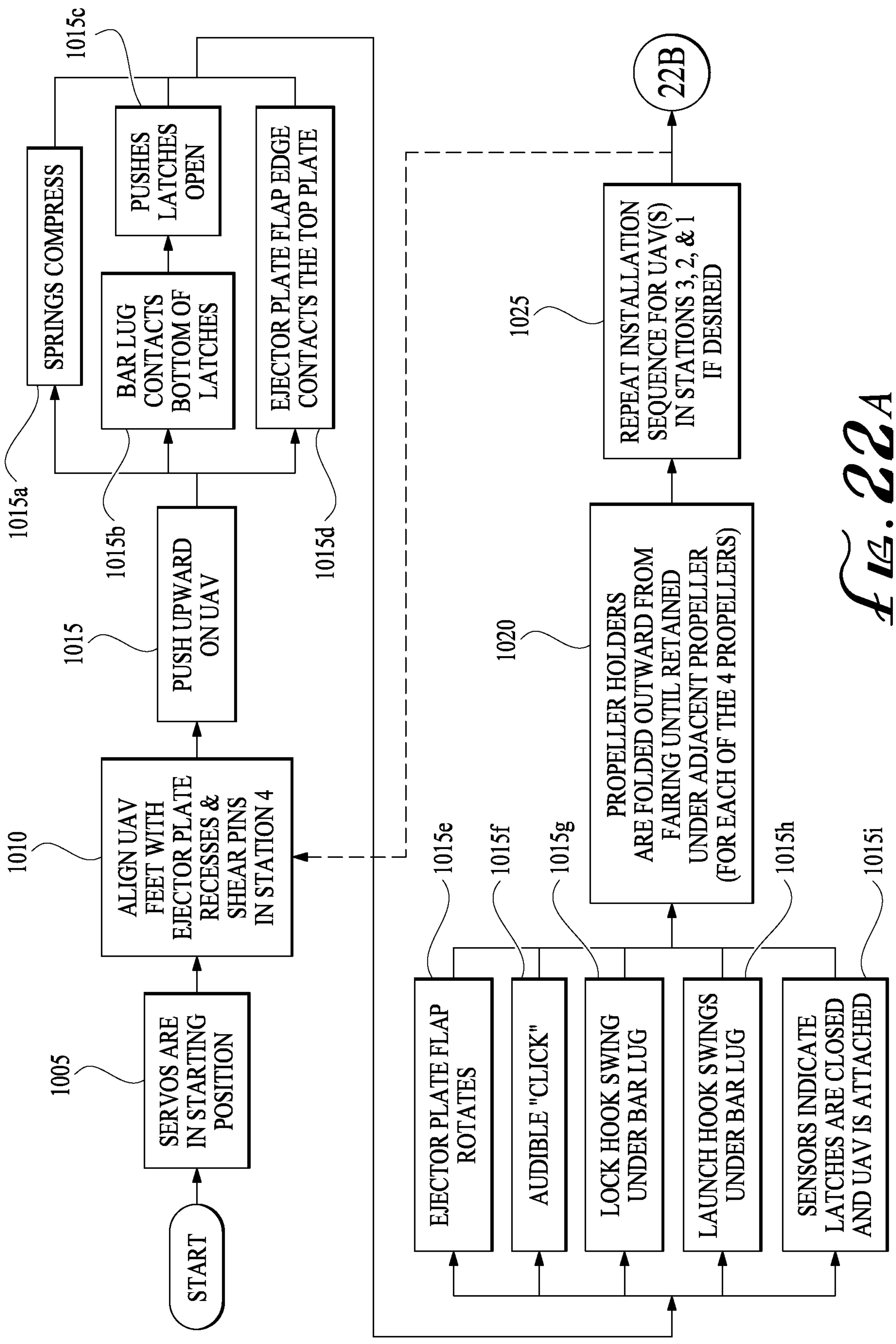
FIGS. 22A and 22B is a flow diagram of one embodiment of the loading and ejection sequence of the multiple UAV jettison apparatus.
Figure 22B:
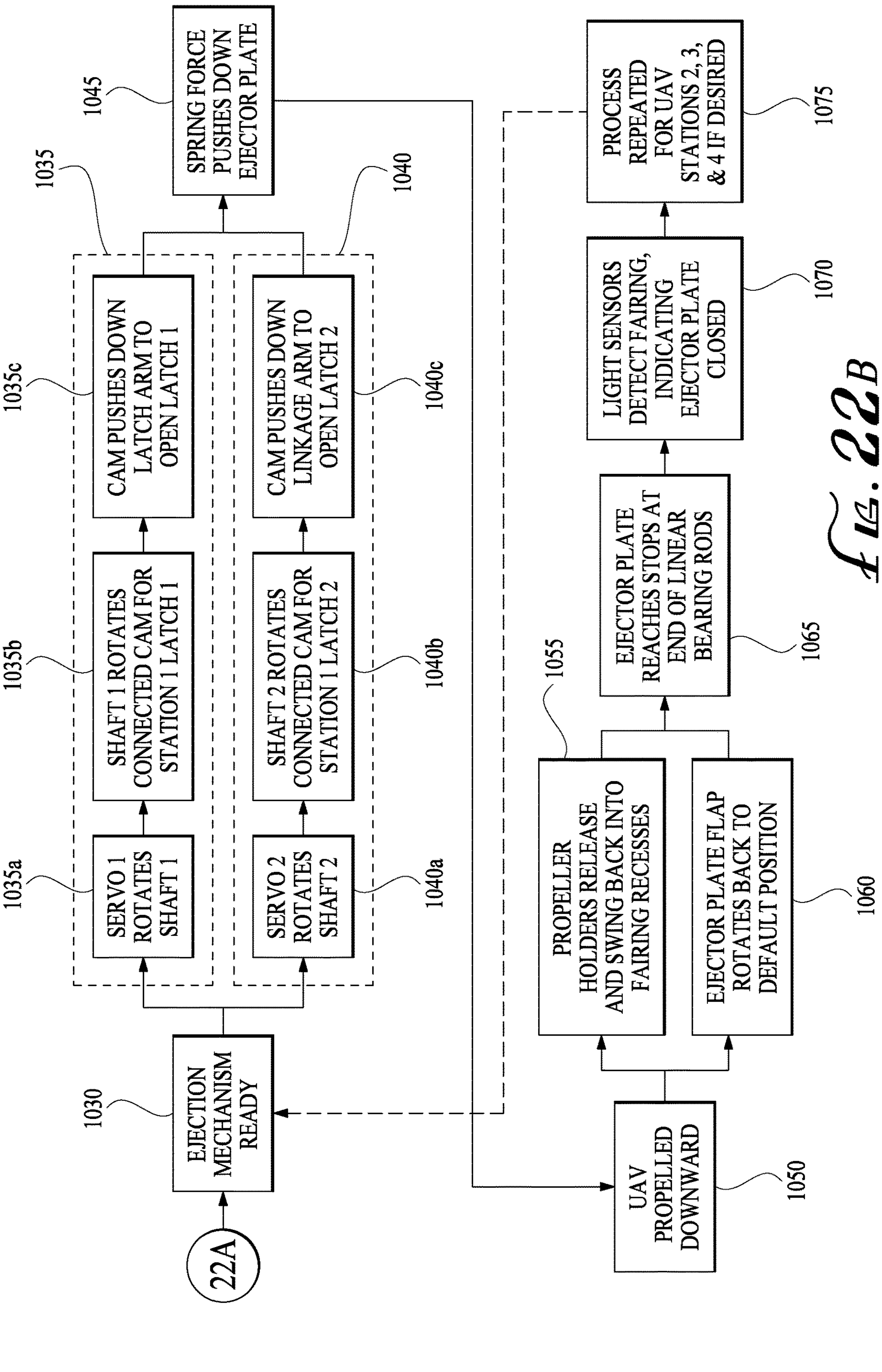

FIGS. 22A and 22B is a flow diagram of one embodiment of the loading and ejection sequence 1000 of the multiple UAV jettison apparatus 100. As shown in FIGS. 22A and 22B, one embodiment of the loading and ejection sequence 1000 may comprise steps 1005, 1010, 1015, 1020, 1025, 1030, 1035, 1040, 1045, 1050, 1055, 1060, 1065, 1070, 1075, wherein: (1) step 1015 may further comprise sub-steps 1015*a*, 1015*b*, 1015*c*, 1015*d*, 1015*e*, 1015*f*, 1015*g*, 1015*h*, 1015*i*; (2) step 1035 may further comprise sub-steps 1035*a*, 1035*b*, 1035*c*; and (3) step 1040 may further comprise sub-steps 1040*a*, 1040*b*, 1040*c*. Further, steps 1005, 1010, 1015, 1020, 1025 and sub-steps 1015*a*, 1015*b*, 1015*c*, 1015*d*, 1015*e*, 1015*f*, 1015*g*, 1015*h*, 1015*i* may depict the loading sequence, whereas steps 1030, 1035, 1040, 1045, 1050, 1055, 1060, 1065, 1070, 1075 and sub-steps 1035*a*, 1035*b*, 1035*c*, 1040*a*, 1040*b*, 1040*c* may depict the ejection sequence.

As a general matter, prior to the first step 1005 of the loading sequence, the multiple UAV jettison apparatus 100 may have no UAV 10*a* mounted. Additionally, the ejector plate assemblies 120*a*, 120*b*, 120*c*, 120*d* are preferably in their respective launch positions, such that each ejector plate 405*a*, 405*b*, 405*c*, 405*d* is positioned at the bottom of their respective UAV openings 121*a*, 121*b*, 121*c*, 121*d* and substantially covers the UAV openings 121*a*, 121*b*, 121*c*, 121*d*.

Turning to the first step 1005, the first and second servomotors 460, 470 may be their respective starting positions. Here, the first and second driveshafts 465, 475 may be rotated, such that the first cam 466, second cam 467, third cam 468, and fourth cam 469 may be positioned to have the first latch 625 closed—i.e., first lock latch 635 is in its first locked position, and the first release latch 685 is in its first retaining position, as shown in FIGS. 15A and 15B.

Next, FIG. 22A shows the second step 1010, which may be aligning the feet of the UAV 10*a* with the ejector plate recesses of the ejector plate 405*a* of UAV station 1 210*a*. Here, various embodiments of the ejector plate 405*a* may comprise ejector plate recesses configured to receive and contact the underlying surface of the feet of the UAV 10*a*. Thus, the UAV 10*a* may be inverted and roughly aligned with the ejector plate recesses of the ejector plate 405*a*. Additionally, in various embodiments, the UAV 10*a* may properly align with the alignment pins, such that a connector located on the ejector plate 405*a* may mate and engage with a connector located on the UAV 10*a* to provide electrical communication between the aircraft 200 and UAV 10*a*. After the feet of the UAV 10*a* is aligned with the ejector plate recesses, an upward force 103 may be applied to the UAV 10*a* in order to push the UAV 10*a* upwards and towards the inner cavity of the payload bay 105, as shown in the third step 1015. As a result, the ejector plate assembly 120*a* preferably transitions from the launch position to the stowed position.

Notably, when an upward force 103 is applied to the UAV 10*a* (third step 1015), the following sub-steps 1015*a*, 1015*b*, 1015*c*, 1015*d*, 1015*e*, 1015*f*, 1015*g*, 1015*h*, 1015*i* may occur. First, sub-step 1015*a* shows that, as the ejector plate 405*a* moves upwards and towards the top plate 110, the coil springs 145 surrounding the linear bearing rods 135 may compress. Additionally, the UAV bar lug 104 may begin to contact the slope end of each hook portion of the first latch 625 (e.g., lock latch 635 and release latch 685) (sub-step 1015*b*). As the ejector plate 405*a* moves upwards and towards the top plate 110, the upward force 103 may apply a momentum, causing the UAV bar lug 104 to overcome the lock latch return spring 750 and release latch return spring 799. As a result, the lock latch 740 and release latch 790 may pivot open, thereby opening the first latch 625 (sub-step 1015*c*). During this time, the edge of the ejector plate flap 406*a* may also contact the top plate 110 (sub-step 1015*d*) and cause the ejector plate flap 406*d* to rotate (sub-step 1015*e*), thereby producing an audible click (sub-step 1015*f*).

While the first latch 625 is open (i.e., lock latch 740 and release latch 790 are pivoted open), the UAV bar lug 104 may move further upwards and inwards within the space of the two-prong end (i.e., between the top prong 611 and bottom prong 612) of the first arm portion 610 of the forward latch housing 605. At this time, the bottom prong hook portion of the lock latch hook end 635*a* may swing or pivot back around the UAV bar lug 104 (sub-step 1015*g*). Similarly, the top prong hook portion of the release latch hook end 685*a* may likewise swing or pivot back around the UAV bar lug 104 (sub-step 1015*h*). As a result, the UAV 10*a* may be secured into the first latch 625 of UAV station 1 210*a*.

When the UAV 10*a* is stowed within the payload bay 105 and fully seated, the ejector plate 405*a* may be positioned near the top plate 110 and the coil springs 145 may be fully compressed. The UAV 10*a* may also have its upper portion, including its propellers and rotors, exposed outside the multiple UAV jettison apparatus 100. Finally, in various embodiments, the multiple UAV jettison apparatus 100 may further comprise sensors (not shown) that indicate whether the latch 625 is closed and the UAV 10*a* is attached (sub-step 1015*i*). For example, some embodiments of the multiple UAV jettison apparatus 100 may actuate an ejector plate contact switch, thereby sending an electrical signal to the aircraft 200 and alerting the aircraft 200 that the UAV 10*a* is fully seated within the multiple UAV jettison apparatus 100.

Once the UAV 10*a* is seated and secured into UAV station 1 210*a*, the user may perform step 1020 (i.e., securing the propellers of the UAV 10*a*). Here, each propeller holder 130*a* may be designed to secure each propeller blades 11*a* of the UAV 10*a* and may be used to secure the propellers of the UAV 10*a* when the UAV 10*a* is stowed. This generally entails: (1) folding and rotating the propeller blades 11*a* of the UAV 10*a* away from the propeller holder 130*a*, (2) rotating the propeller holders 130*a* outwards until passing the respective propeller blades 11*a*, (3) rotating the propeller blades 11*a* back until the propeller blades 11*a* are above the propeller holder 130*a*, and (4) rotating the propeller holders 130*b* inwards until the propeller holders 130*b* contact, cradle, and secure the propeller blades 11*a*. Details on how to secure the propeller blades 11*a* are described above in FIG. 2. Finally, after step 1020 is completed, step 1025 of the loading sequence shows that steps 1005, 1010, 1015, 1020 and sub-steps 1015*a*, 1015*b*, 1015*c*, 1015*d*, 1015*e*, 1015*f*, 1015*g*, 1015*h*, 1015*i* may be repeated for UAV station 2 210*b*, UAV station 3 210*c*, and UAV station 4 210*d*, as desired.

Regarding ejection sequence of the stowed UAV 10*a*, steps 1030, 1035, 1040, 1045, 1050, 1055, 1060, 1065, 1070, 1075 and sub-steps 1035*a*, 1035*b*, 1035*c*, 1040*a*, 1040*b*, 1040*c* may be performed. As noted above, this ejection sequence generally pertains to only UAV station 1 210*a* and may pertain to the remaining UAV stations (i.e., UAV station 2 210*b*, UAV station 3 210*c*, and UAV station 4 210*d*) if other UAVs 10*b*, 10*c*, 10*d* are stowed, if applicable.

According to the first step 1030 of the ejection sequence, the UAV 10*a* may be ready for ejection and release after the UAV 10*a* has been loaded to the multiple UAV jettison apparatus 100. Here, the aircraft 200 may be launched into flight with at least one UAV 10*a* installed into the multiple UAV jettison apparatus 100. During this time, the first and second driveshafts 465, 475 may be rotated, such that the first cam 466 is positioned to have the latch 625, 630, 725, 730 closed—i.e., the first lock latch 635 is in its first locked position, and the first release latch 685 is in its first retaining position, as shown in FIGS. 15A and 15B. Additionally, the second cam engagement end 665*c* of the first rocker arm 665 may contact and cammingly engage the outer circumferential second cam surface 467*b* of the second cam 467, whereas the first cam engagement portion 685*c* of the first release latch 685 may be in contact and cammingly engage the inner circumferential first cam surface 466*a* of the first cam 466.

Importantly, the torsional bias assembly 480 is preferably "loaded," by winding portions of the first and second constant force torsional spring 483*a*, 483*b* onto their respective second and first torsion drums 485*b*, 485*a*. In this manner, the torsional bias assembly 480 may aid the first and second servomotors 460, 470 by exerting a constant torque to the first and second driveshafts 465, 475 in their respective rotating directions. As such, the constant torques exerted by the torsional bias assembly 480 preferably provide the necessary torque to rotate the cams 466, 467, 468, 469 and thus release the latches 625, 630, 725, 730.

Once the UAV 10*a* is ready to be jettisoned or ejected during flight, step 1035 and step 1040 may be performed. Step 1035 may be transitioning the first lock latch 635 from its locked position into its unlocked position and may comprise sub-steps 1035*a*, 1035*b*, 1035*c*. In order to transition the first lock latch 635 into the unlocked position, the second servomotor 470 may rotate the second driveshaft 475 in the second rotating direction 475*b* (sub-step 1035*a*). As the second driveshaft 475 rotates, the second cam 467 may likewise rotate (sub-step 1035*b*) against the second cam engagement end 665*c* of the first rocker arm 665, thereby causing the first rocker arm 665 to pivot from its first rocker arm locked position to its first rocker arm unlocked position. This may cause the first lock latch 635 associated with that first rocker arm 665 to likewise pivot from its first locked position to its first unlocked position due to coupling of the first linkage 675. As a result, rotation of the second driveshaft 475 may cause the lock latch 635 to transition into its unlocked position (sub-step 1035*c*).

Turning to step 1040 (transitioning the first release latch 685 from its retaining position into its release position), step 1040 may comprise sub-steps 1040*a*, 1040*b*, 1040*c*. In order to transition the first release latch 685 into its release position, the first servomotor 460 may rotate the first driveshaft 465 in the first rotating direction 465*b* (sub-step 1040*a*). As the first driveshaft 465 rotates, the first cam 466 may likewise rotate (sub-step 1040*b*) against the first cam engagement portion 685*c* of the first release latch 685, thereby causing the first release latch 685 to pivot from its first retaining position to its first release position. Upon transition of the release latch 685 into its release position (sub-step 1040*c*), the latch 625 may release the UAV bar lug 104, causing the coil springs 145 to extend, thereby biasing and releasing a spring force downwards against the ejector plate 405*a* (step 1045). As a result, the UAV 10*a* may propel downwards and away from the multiple UAV jettison apparatus 100 (step 1050).

Finally, FIG. 22B shows the final steps of the ejection sequence of the UAV 10*a*. After the ejector plate 405*a* propels and ejects the UAV 10*a*, the propeller holders 130*a* may release the propeller blades 11*a* of the UAV 10*a* and rotate/swing back into the propeller holder recesses of the fairing 115 (step 1055). During this time, the ejector plate flap 406*a* may likewise rotate back to its default position (step 1060). Additionally, the ejector plate 405*a* preferably reaches and stops at the end of the linear bearing rods 135 (step 1065). In various embodiments, the multiple UAV jettison apparatus 100 may further comprise light sensors 1070 that detect the change in the position of the ejector plate 405*a* with respect to the fairing 115, thereby indicating that the ejector plate 405*a* is in the launch position (i.e., down and outwards covering the UAV opening 121*a* of the fairing 115). After step 1070 is completed, step 1075 of the ejection sequence shows that steps 1030, 1035, 1040, 1045, 1050, 1055, 1060, 1065, 1070, 1075 and sub-steps 1035*a*, 1035*b*, 1035*c*, 1040*a*, 1040*b*, 1040*c* may be repeated for UAV station 2 210*b*, UAV station 3 210*c*, and UAV station 4 210*d*, if applicable.

In various embodiments, the cam flange portions of each cam 466, 467, 468, 469 may be configured to have the latches 625, 630, 725, 730 remain open throughout the launch cycle after the launch or release of the UAVs 10*a*, 10*b*, 10*c*, 10*d*. In this manner, the user or operator of the multiple UAV jettison apparatus 100 may be able to confirm that the latches 625, 630, 725, 730 need to be reset after a launch operation when re-installing each UAV 10*a*, 10*b*, 10*c*, 10*d* to the multiple UAV jettison apparatus 100. Notably, this may also preclude or minimize situations where the release sequence of the UAVs 10*a*, 10*b*, 10*c*, 10*d* is out of order, thereby affecting the center of gravity 205 of the aircraft 200 and operation of the multiple UAV jettison apparatus 100.

In various embodiments, the launch sequence also be configured electronically rather mechanically. In these embodiments, the aircraft interface board 108 may control the rotation of the driveshafts 465, 475, thereby controlling the release sequence of the UAVs 10*a*, 10*b*, 10*c*, 10*d*.

Finally, in various embodiments, the profiles of the cam flange portions for each cam 466, 467, 468, 469 may also be staggered. For example, in various embodiments, the cam profiles may be staggered approximately 70 degrees, such that the driveshafts 465, 475 may rotate between approximately 70 to 90 degrees per latch release. In these embodiments, the profiles of the cam flange portions may be mated to their respective 90-degree allotted angle, such that when the first cam 466 rotates approximately 90 degrees, the first release latch 685 may open, and when the second cam 467 rotates approximately 90 degrees, the first lock latch 635 may likewise open. Further, followed by the first driveshaft 465 rotating approximately 180 degrees from the beginning, and the second release latch 690 may open, and when the second driveshaft 475 rotates approximately 180 degrees from the beginning, the second lock latch 640 may likewise open. Thus, in these embodiments, there may be approximately 20 degrees of "dead space" between each ejection to provide tolerance between the releases of each latch opening.

The foregoing description of the embodiments of the multiple UAV jettison apparatus has been presented for the purposes of illustration and description. While multiple embodiments of the multiple UAV jettison apparatus are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Although embodiments of the multiple UAV jettison apparatus are described in considerable detail, including references to certain versions thereof, other versions are possible such as, for example, orienting and/or attaching components in different fashion. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A multiple UAV jettison apparatus, comprising:

a payload bay mounted beneath an aircraft and having an inner space, said payload bay being disposed along a central vertical longitudinal plane;

a fairing enclosing at least a portion of said inner space of said payload bay and having first, second, third, and fourth UAV openings;

a top plate assembly coupled to said payload bay and disposed within said inner space, said top plate assembly comprising:

a linear bearing forward station comprising first and second pairs of linear bearing assemblies, each disposed in parallel along first and second diagonal planes, respectively, said first and second pairs of linear bearing assemblies corresponding with said first and second UAV openings;

a linear bearing aft station comprising third and fourth pairs of linear bearing assemblies, each disposed in parallel along said first and second diagonal planes, respectively, said third and fourth pairs of linear bearing assemblies corresponding with said third and fourth UAV openings;

wherein said linear bearing forward and aft stations are disposed in parallel from each other and have bilateral symmetry along said central vertical longitudinal plane, such that a first angle between said first diagonal plane and said central vertical longitudinal plane is equal to a second angle between said second diagonal plane and said central vertical longitudinal plane;

first, second, third, and fourth ejector plate assemblies operably coupled to said first, second, third, and four pairs of linear bearing assemblies, respectively, and each adapted to move between a respective stowed position and a respective launch position;

wherein said first and third ejector plate assemblies are adapted to move between said respective stowed and launch positions along said first diagonal plane and wherein said second and fourth ejector plate assemblies are adapted to move between said respective stowed and launch positions along said second diagonal plane;

a driveline assembly longitudinally disposed along said central vertical longitudinal plane; and forward and aft latch assemblies operably coupled to said driveline assembly, said forward latch assembly comprising first and second latches and said aft latch assembly comprising third and fourth latches;

wherein each of said first, second, third, and fourth latches is configured to releasably couple a respective UAV when a corresponding pair of said linear bearing assemblies is in said respective stowed position, such that upon release of a respective latch, said corresponding pair of said linear bearing assemblies biases a corresponding ejector plate assembly from said respective stowed position to said respective launch position to release said respective UAV from said aircraft.

2. The multiple UAV jettison apparatus, according to claim 1, wherein each of said first, second, third, and fourth pairs of said linear bearing assemblies comprises:

a respective pair of linear bearing rods disposed in parallel;

a respective pair of linear bearings slidably coupled to said respective pair of linear bearing rods; and a respective pair of coil springs surrounding said respective pair of linear bearing rods.

3. The multiple UAV jettison apparatus, according to claim 2, wherein said linear bearing forward station further comprises:

a first pair of support brackets disposed in parallel and comprising:

first and second ends coupled to proximal ends of said first and second pairs of said linear bearing assemblies, respectively, wherein said first and second ends of said first pair of support brackets are angled at said first and second angles, respectively, with respect to said central vertical longitudinal plane; and wherein said linear bearing aft station further comprises:

a second pair of support brackets disposed in parallel and comprising:

third and fourth ends coupled to proximal ends of said third and fourth pairs of linear bearing assemblies, respectively, wherein said third and fourth ends of said second pair of support brackets are angled at said first and second angles, respectively, with respect to said central vertical longitudinal plane.

4. The multiple UAV jettison apparatus, according to claim 2, wherein each of said first, second, third, and fourth ejector plate assemblies comprises:

a respective ejector plate adapted to cover at least a portion of a respective UAV opening of said fairing and adapted for inverted mounting and launching of said respective UAV; and a respective pair of support plates orthogonally coupled to said respective ejector plate and disposed in parallel to fasten said respective pair of linear bearings, such that said respective pair of linear bearings are sandwiched between said respective pair of support plates.

5. The multiple UAV jettison apparatus, according to claim 1, wherein said driveline assembly comprises:

first and second driveshafts longitudinally disposed in parallel relation to each other along first and second central longitudinal axes;

first and second servomotors operably coupled to proximal ends of said first and second driveshafts, respectively, wherein said first and second servomotors are respectively configured to actuate said first and second driveshafts in corresponding first and second rotating directions;

a torsional bias assembly operably coupled to said first and second driveshafts and configured to aid in exerting a constant torque in said first and second rotating directions when rotating said first and second driveshafts;

first and second cams disposed in parallel relation to each other and fixedly and non-rotatably mounted to proximal portions of said first and second driveshafts, respectively; and third and fourth cams disposed in parallel relation to each other and fixedly and non-rotatably mounted to distal portions of said first and second driveshafts, respectively, such that (1) said first cam, said third cam, and said first driveshaft rotate in unison and (2) said second cam, said fourth cam, and said second driveshaft rotate in unison;

wherein said first, second, third, and fourth cams comprise corresponding first, second, third, and fourth cam flange portions, such that: (1) said first cam comprises an inner circumferential first cam surface and an outer circumferential first cam surface; (2) said second cam comprises an inner circumferential second cam surface and an outer circumferential second cam surface, (3) said third cam comprises an inner circumferential third cam surface and an outer circumferential third cam surface, and (4) said fourth cam comprises an inner circumferential fourth cam surface and an outer circumferential fourth cam surface.

6. The multiple UAV jettison apparatus according to claim 5, wherein said torsional bias assembly comprises:

first and second spring storage drums rotatably mounted to said first and second driveshafts, respectively, and configured to freely rotate therein;

first and second torsion drums fixedly and non-rotatably mounted to said first and second driveshafts, respectively, such that: (1) said first torsion drum and said first driveshaft rotate in unison and (2) said second torsion drum and said second driveshaft rotate in unison;

first and second constant force torsional springs having first ends fixedly engaged with said second and first torsion drums, respectively, and second ends rotatably engaged with said first and second spring storage drums, respectively, (1) wherein said first constant force torsional spring is configured to urge said second torsion drum to rotate in said second rotating direction after winding a portion of said first constant force torsional spring around said second torsion drum in said first rotating direction and (2) wherein said second constant force torsional spring is configured to urge said first torsion drum to rotate in said first rotating direction after winding a portion of said second constant force torsional spring around said first torsion drum in said second rotating direction; and a driveshaft spreader adapted to rotatably mount and separate said first and second driveshafts at a fixed distance and separate said first spring storage drum, said first constant force torsional spring, and said second torsion drum from said second spring storage drum, said second constant force torsional spring, and said first torsion drum.

7. The multiple UAV jettison apparatus according to claim 5, wherein each of said forward and aft latch assemblies further comprises:

forward and aft latch housings, respectively, each having bilateral symmetry along said central vertical longitudinal plane and comprising:

first and second respective arm portions, each having a two-prong end, configured to engage a respective UAV bar lug, wherein said first and second respective arm portions are angled at corresponding said first and second angles with respect to said central longitudinal plane; and a latch middle section, such that a forward latch middle section corresponds to said forward latch assembly and an aft latch middle section corresponds to said aft latch assembly, wherein each of said forward and aft latch middle sections comprises first and second respective driveshaft openings adapted to permit said first and second driveshafts to freely rotate therein;

wherein said first and second cams are adjacent to said first and second respective driveshaft openings at opposing sides of said forward latch housing, and wherein said third and fourth cams are adjacent to said first and second respective driveshaft openings at opposing sides of said aft latch housing; and wherein said respective latch corresponds to each of said first and second respective arm portions of said forward and aft latch housings, such that said first and second latches correspond to said first and second respective arm portions of said forward latch housing and said third and fourth latches correspond to said first and second respective arm portions of said aft latch housing.

8. The multiple UAV jettison apparatus according to claim 7, wherein said first latch is associated with said first respective arm portion of said forward latch housing, and wherein said third latch is associated with said first respective arm portion of said aft latch housing;

wherein each of said first and third latches comprises:

a first respective lock latch pivotally mounted to a respective first side of said forward and aft latch housings and configured to a pivot between a first respective locked position and a first respective unlocked position relative to said first respective arm portion, said first respective lock latch comprising:

a first respective lock latch hook end configured to inhibit release of said respective UAV bar lug from said forward and aft latch housings when said first respective lock latch is in said first respective locked position;

a first respective lock latch pivot end pivotally coupled to a respective first pivot located on said forward and aft latch housings;

a first respective lock latch travel stop configured to limit movement of said first respective lock latch beyond said first respective locked and unlocked positions;

a first respective lock latch return spring coupled to said first respective lock latch and said first respective arm portion to urge said first respective lock latch into said first respective locked position;

a first respective rocker arm pivotally mounted to said first respective side of said forward and aft latch housings and configured to pivot between first respective rocker arm locked and unlocked positions relative to said forward and aft latch middle sections and comprising:

a first respective linkage end;

a first respective rocker arm pivot end pivotally coupled to a respective third pivot located on said forward and aft latch housings and disposed along said central vertical longitudinal plane; and a first respective cam engagement end cammingly engaging either said outer circumferential second cam surfaces of said second cam or said outer circumferential fourth cam surface of said fourth cam, such that as said second driveshaft rotates in said second rotating direction, said second and fourth cams rotate against said first respective cam engagement end and pivots said first respective rocker arm from said first respective rocker arm locked position to said first respective rocker arm unlocked position; and a first respective linkage pivotally coupled to said first respective linkage end of said first respective rocker arm and said first respective lock latch, such that as said first respective rocker arm pivots from said first respective rocker arm locked position to said first respective rocker arm unlocked position, said first respective lock latch pivots from said first respective locked position to said first respective unlocked position;

wherein each of said first and third latches further comprises:

a first respective release latch pivotally mounted to a respective second side of said forward and aft latch housings and configured to pivot between a first respective retaining position and a first respective release position relative to said first respective arm portion, said first respective release latch comprising:

a first respective release latch hook end configured to inhibit release of said corresponding UAV bar lug from said forward and aft latch housings when said first respective release latch is in said first respective retaining position;

a first respective release latch pivot end pivotally coupled to said respective first pivot;

a first respective release latch travel stop configured to limit movement of said first respective release latch beyond said first respective retaining and release positions;

a first respective cam engagement portion cammingly engaging either said inner circumferential first cam surface of said first cam or said inner circumferential third cam surface of said third cams, such that as said first driveshaft rotates in said first rotating direction, said first and third cams rotate against said first respective cam engagement portion and pivots said first respective release latch from said first respective retaining position to said first respective release position; and a first respective release latch return spring coupled to said first respective release latch and said first respective arm portion to urge said first respective release latch into said first respective retaining position;

wherein said second latch is associated with said second respective arm portion of said forward latch housing, and wherein said fourth latch is associated with said second respective arm portion of said aft latch housing;

wherein each of said second and fourth latches comprises:

a second respective lock latch pivotally mounted to said respective second side of said forward and aft latch housings and configured to a pivot between a second respective locked position and a second respective unlocked position relative to said second respective arm portion, said second respective lock latch comprising:

a second respective lock latch hook end configured to inhibit release of said respective UAV bar lug from said forward and aft latch housings when said second respective lock latch is in said second respective locked position;

a second respective lock latch pivot end pivotally coupled to a respective second pivot located on said forward and aft latch housings;

a second respective lock latch travel stop configured to limit movement of said second respective lock latch beyond said second respective locked and unlocked positions;

a second respective lock latch return spring coupled to said second respective lock latch and said second respective arm portion to urge said second respective lock latch into said second respective locked position;

a second respective rocker arm pivotally mounted to said second respective side of said forward and aft latch housings and configured to pivot between second respective rocker arm locked and unlocked positions relative to said forward and aft latch middle sections and comprising:

a second respective linkage end;

a second respective rocker arm pivot end pivotally coupled to said respective third pivot; and a second respective cam engagement end cammingly engaging either said outer circumferential first cam surface of said first cam or outer circumferential third cam surface of said third cam, such that as said first driveshaft rotates in said first rotating direction, said first and third cams rotate against said second respective cam engagement end and pivots said second respective rocker arm from said second respective rocker arm locked position to said second respective rocker arm unlocked position;

a second respective linkage pivotally coupled to said second respective linkage end of said second respective rocker arm and said second respective lock latch, such that as said second respective rocker arm pivots from said second respective rocker arm locked position to said second respective rocker arm unlocked position, said second respective lock latch pivots from said second respective locked position to said second respective unlocked position;

wherein each of said second and fourth latches further comprises:

a second respective release latch pivotally mounted to said respective first side of said forward and aft latch housings and configured to pivot between a second respective retaining position and a second respective release position relative to said second respective arm portion, said second respective release latch comprising:

a second respective release latch hook end configured to inhibit release of said corresponding UAV bar lug from said forward and aft latch housings when said second respective release latch is in said second respective retaining position;

a second respective release latch pivot end pivotally coupled to said respective second pivot;

a second respective release latch travel stop configured to limit movement of said second respective release latch beyond said second respective retaining and release positions;

a second respective cam engagement portion cammingly engaging either said inner circumferential second cam surface of said second cam or said inner circumferential fourth cam surface of said fourth cam, such that as said second driveshaft rotates in said second rotating direction, said second and fourth cams rotate against said second respective cam engagement portion and pivots said second respective release latch from said second respective retaining position to said second respective release position; and a second respective release latch return spring coupled to said second respective release latch and said second respective arm portion to urge said second respective release latch into said second respective retaining position.

9. The multiple UAV jettison apparatus according to claim 8, further comprising:

first, second, third, and fourth manual ejection assemblies, each comprising:

a respective manual ejection button slidably disposed within a respective manual ejection opening located on said fairing above said respective UAV opening;

a respective manual ejection rod guide positioned near a distal end of said respective manual ejection button;

respective lock latch and release latch manual ejection rods disposed in parallel relation to each other and having first ends coupled to said distal end of said respective manual ejection button, wherein a second end of said respective lock latch manual ejection rod is positioned near a respective lock latch manual ejection pin coupled to a corresponding rocker arm extension, and wherein a second end of said respective release latch manual ejection rod is positioned near a respective release latch manual ejection pin coupled to a corresponding release latch extension; and respective lock latch and release latch springs surrounding said respective lock latch and release latch manual ejection rods, respectively, said respective lock latch and release latch springs being disposed between said respective manual ejection rod guide and said distal end of said respective manual ejection button.

10. The multiple UAV jettison apparatus according to claim 8, wherein said corresponding ejector plate assembly further comprises: (1) a respective release latch face and (2) a respective lock latch face;

wherein said respective latch further comprises: (i) a corresponding release latch close assist pin and (ii) a corresponding lock latch close assist pin; and wherein when said corresponding ejector plate assembly moves from said respective launch position to said respective stowed position, (a) said respective release latch face engages said corresponding release latch close assist pin and pivots either said first or second respective release latch from either said first or second respective release position to either said first or second respective retaining position and (b) said respective lock latch face engages said corresponding lock latch close assist pin and pivots either said first or second respective lock latch from either said first or second respective unlocked position to either said first or second respective locked position.

11. A multiple UAV jettison apparatus, comprising:

a payload bay mounted beneath an aircraft and having an inner space, said payload bay being disposed along a central vertical longitudinal plane;

a fairing enclosing at least a portion of said inner space of said payload bay and having first, second, third, and fourth UAV openings;

a top plate assembly coupled to said payload bay and disposed within said inner space, said top plate assembly comprising:

a top plate;

a linear bearing forward station coupled to said top plate and comprising: (1) a first pair of linear bearing assemblies disposed in parallel along a first diagonal plane and associated with said first UAV opening; and (2) a second pair of linear bearing assemblies disposed in parallel along a second diagonal plane and associated with said second UAV opening;

a linear bearing aft station coupled to said top plate and comprising: (1) a third pair of linear bearing assemblies disposed in parallel along said first diagonal plane and associated with said third UAV opening; and (2) a fourth pair of linear bearing assemblies disposed in parallel along said second diagonal plane and associated with said fourth UAV opening;

wherein said linear bearing forward and aft stations are disposed in parallel relation to each other and have bilateral symmetry along said central vertical longitudinal plane, such that a first angle between said first diagonal plane and said central vertical longitudinal plane is equal to a second angle between said second diagonal plane and said central vertical longitudinal plane;

a first ejector plate assembly operably coupled to said first pair of linear bearing assemblies and adapted to move between first stowed and launch positions along a first UAV axis aligning said first diagonal plane;

a second ejector plate assembly operably coupled to said second pair of linear bearing assemblies and adapted to move between second stowed and launch positions along a second UAV axis aligning said second diagonal plane;

a third ejector plate assembly operably coupled to said third pair of linear bearing assemblies and adapted to move between third stowed and launch positions along a third UAV axis aligning said first diagonal plane;

a fourth ejector plate assembly operably coupled to said fourth pair of linear bearing assemblies and adapted to move between fourth stowed and launch positions along a fourth UAV axis aligning said second diagonal plane;

a driveline assembly coupled to said top plate and longitudinally disposed;

forward and aft latch assemblies coupled to said top plate and operably coupled to said driveline assembly, said forward and aft latch assemblies being disposed within said linear bearing forward and aft stations, respectively, such that said forward and aft latch assemblies are in parallel relation to each other;

wherein said forward latch assembly comprises a first latch associated with said first UAV opening and a second latch associated with said second UAV opening; and wherein said aft latch assembly comprises a third latch associated with said third UAV opening and a fourth latch associated with said fourth UAV opening;

wherein said first latch is configured to releasably couple a first UAV when said first ejector plate assembly is in said first stowed position, such that upon release of said first latch, said first pair of linear bearing assemblies bias said first ejector plate assembly from said first stowed position to said first launch position along said first UAV axis to release said first UAV from said aircraft;

wherein said second latch is configured to releasably couple a second UAV when said second ejector plate assembly is in said second stowed position, such that upon release of said second latch, said second pair of linear bearing assemblies bias said second ejector plate assembly from said second stowed position to said second launch position along said second UAV axis to release said second UAV from said aircraft;

wherein said third latch is configured to releasably couple a third UAV when said third ejector plate assembly is in said third stowed position, such that upon release of said third latch, said third pair of linear bearing assemblies bias said third ejector plate assembly from said third stowed position to said third launch position along said third UAV axis to release said third UAV from said aircraft; and wherein said fourth latch is configured to releasably couple a fourth UAV when said fourth ejector plate assembly is in said fourth stowed position, such that upon release of said fourth latch, said fourth pair of linear bearing assemblies bias said fourth ejector plate assembly from said fourth stowed position to said fourth launch position along said fourth UAV axis to release said fourth UAV from said aircraft.

12. The multiple UAV jettison apparatus, according to claim 11, wherein said first pair of linear bearing assemblies comprises:

a first pair of linear bearing rods disposed in parallel along said first diagonal plane;

a first pair of linear bearings slidably coupled to said first pair of linear bearing rods; and a first pair of coil springs surrounding said first pair of linear bearing rods and adapted to provide said biasing of said first ejector plate assembly;

wherein said second pair of linear bearing assemblies comprises:

a second pair of linear bearing rods disposed in parallel along said second diagonal plane;

a second pair of linear bearings slidably coupled to said second pair of linear bearing rods; and a second pair of coil springs surrounding said second pair of linear bearing rods and adapted to provide said biasing of said second ejector plate assembly;

wherein said third pair of linear bearing assemblies comprises:

a third pair of linear bearing rods disposed in parallel along said first diagonal plane;

a third pair of linear bearings slidably coupled to said third pair of linear bearing rods; and a third pair of coil springs surrounding said third pair of linear bearing rods and adapted to provide said biasing of said third ejector plate assembly; and wherein said fourth pair of linear bearing assemblies comprises:

a fourth pair of linear bearing rods disposed in parallel along said second diagonal plane;

a fourth pair of linear bearings slidably coupled to said fourth pair of linear bearing rods; and a fourth pair of coil springs surrounding said fourth pair of linear bearing rods and adapted to provide said biasing of said fourth ejector plate assembly.

13. The multiple UAV jettison apparatus, according to claim 12, wherein said linear bearing forward station further comprises:

first and second support brackets coupled to said top plate and disposed in parallel, such that said forward latch assembly is positioned between said first and second support brackets, said first and second support brackets, comprising:

first ends coupled to proximal ends of said first pair of linear bearing assemblies and angled at said first angle with respect to said central vertical longitudinal plane; and second ends coupled to proximal ends of said second pair of linear bearings and angled at said second angle with respect to said central vertical longitudinal plane; and wherein said linear bearing aft station further comprises:

third and fourth support brackets coupled to said top plate and disposed in parallel, such that said aft latch assembly is positioned between said third and fourth support brackets, said third and fourth support brackets, comprising:

third ends coupled to proximal ends of said third pair of linear bearing assemblies and angled at said first angle with respect to said central vertical longitudinal plane; and fourth ends coupled to proximal ends of said fourth pair of linear bearings and angled at said second angle with respect to said central vertical longitudinal plane.

14. The multiple UAV jettison apparatus, according to claim 12, wherein said first ejector plate assembly comprises:

a first ejector plate adapted to cover at least a portion of said first UAV opening and adapted for inverted mounting and launching of said first UAV; and a first pair of support plates orthogonally coupled to said first ejector plate and disposed in parallel to fasten said first pair of linear bearings, such that said first pair of linear bearings are sandwiched between said first pair of support plates;

wherein said second ejector plate assembly comprises:

a second ejector plate adapted to cover at least a portion of said second UAV opening and adapted for inverted mounting and launching of said second UAV; and a second pair of support plates orthogonally coupled to said second ejector plate and disposed in parallel to fasten said second pair of linear bearings, such that said second pair of linear bearings are sandwiched between said second pair of support plates;

wherein said third ejector plate assembly comprises:

a third ejector plate adapted to cover at least a portion of said third UAV opening and adapted for inverted mounting and launching of said third UAV; and a third pair of support plates orthogonally coupled to said third ejector plate and disposed in parallel to fasten said third pair of linear bearings, such that said third pair of linear bearings are sandwiched between said third pair of support plates; and wherein said fourth ejector plate assembly comprises:

a fourth ejector plate adapted to cover at least a portion of said fourth UAV opening and adapted for inverted mounting and launching of said fourth UAV; and a fourth pair of support plates orthogonally coupled to said fourth ejector plate and disposed in parallel to fasten said fourth pair of linear bearings, such that said fourth pair of linear bearings are sandwiched between said fourth pair of support plates.

15. The multiple UAV jettison apparatus, according to claim 11, wherein said driveline assembly comprises:

first and second driveshafts longitudinally disposed in parallel relation to each other and respectively having first and second central longitudinal axes disposed along a horizontal plane traverse to said central vertical longitudinal plane and on either side of said central vertical longitudinal plane;

a first servomotor operably coupled to a proximal end of said first driveshaft and configured to actuate said first driveshaft in a first rotating direction;

a second servomotor operably coupled to a proximal end of said second driveshaft and configured to actuate said second driveshaft in a second rotating direction, said second rotating direction being opposite from said first rotating direction;

a torsional bias assembly operably coupled to said first and second driveshafts and between said forward and aft latch assemblies, said torsional bias assembly being configured to aid in exerting a constant torque in said first and second rotating directions when rotating said first and second driveshafts;

first and second cams disposed in parallel relation to each other and fixedly and non-rotatably mounted to proximal portions of said first and second driveshafts, respectively; and third and fourth cams disposed in parallel relation to each other and fixedly and non-rotatably mounted to distal portions of said first and second driveshafts, respectively, such that (1) said first cam, said third cam, and said first driveshaft rotate in unison and (2) said second cam, said fourth cam, and said second driveshaft rotate in unison;

wherein said first cam comprises a first cam flange portion, such that said first cam comprises inner and outer circumferential first cam surfaces, said inner and outer circumferential first cam surfaces defining a first cam inner thickness and a first cam outer thickness, respectively;

wherein said second cam comprises a second cam flange portion, such that said second cam comprises inner and outer circumferential second cam surfaces, said inner and outer circumferential second cam surfaces defining a second cam inner thickness and a second cam outer thickness, respectively;

wherein said third cam comprises a third cam flange portion, such that said third cam comprises inner and outer circumferential third cam surfaces, said inner and outer circumferential third cam surfaces defining a third cam inner thickness and a third cam outer thickness, respectively; and wherein said fourth cam comprises a fourth cam flange portion, such that said fourth cam comprises inner and outer circumferential fourth cam surfaces, said inner and outer circumferential fourth cam surfaces defining a fourth cam inner thickness and a fourth cam outer thickness, respectively.

16. The multiple UAV jettison apparatus according to claim 15, wherein said torsional bias assembly comprises:

a first spring storage drum rotatably mounted to said first driveshaft and configured to freely rotate therein;

a second torsion drum fixedly and non-rotatably mounted to said second driveshaft, such that said second torsion drum and said second driveshaft rotate in unison;

a first constant force torsional spring having a first end fixedly engaged with said second torsion drum and a second end rotatably engaged with said first spring storage drum, such that, after winding a portion of said first constant force torsional spring around said second torsion drum in said first rotating direction, said first constant force torsional spring urges said second torsion drum to rotate in said second rotating direction;

a second spring storage drum rotatably mounted to said second driveshaft and configured to freely rotate therein;

a first torsion drum fixedly and non-rotatably mounted to said first driveshaft, such that said first torsion drum and said first driveshaft rotate in unison;

a second constant force torsional spring having a first end fixedly engaged with said first torsion drum and a second end rotatably engaged with said second spring storage drum, such that, after winding a portion of said second constant force torsional spring around said first torsion drum in said second rotating direction, said second constant force torsional spring urges said first torsion drum to rotate in said first rotating direction; and a driveshaft spreader adapted to rotatably mount and separate said first and second driveshafts at a fixed distance and separate said first spring storage drum, said first constant force torsional spring, and said second torsion drum from said second spring storage drum, said second constant force torsional spring, and said first torsion drum.

17. The multiple UAV jettison apparatus according to claim 11, wherein said forward latch assembly further comprises;

a forward latch housing having bilateral symmetry along said central vertical longitudinal plane and comprising:

a first arm portion having a first two-prong end, comprising a first top prong and a first bottom prong with said first UAV axis traversing therebetween, such that said first arm portion is angled at said first angle from said central vertical longitudinal plane, said first two-prong end being configured to engage a first UAV bar lug;

a second arm portion having a second two-prong end, comprising a second top prong and a second bottom prong with said second UAV axis traversing therebetween, such that said second arm portion is angled at said second angle from said central vertical longitudinal plane, said second two-prong end being configured to engage a second UAV bar lug;

a forward latch middle section comprising first and second driveshaft openings disposed on said horizontal plane and having centers aligned with said first and second central longitudinal axes, respectively, said first and second driveshaft openings being adapted to permit said first and second driveshafts to freely rotate therein, wherein said first cam is adjacent to said first driveshaft opening at a second side of said forward latch housing, and wherein said second cam is adjacent to said second driveshaft opening at a first side of said forward latch housing;

wherein said first latch is associated with said first arm portion and comprising:

a first lock latch pivotally mounted to said first side of said forward latch housing via a first pivot disposed along said first UAV axis and configured to pivot between a first locked position and a first unlocked position relative to said first arm portion, said first lock latch comprising:

a first lock latch hook end having a first bottom prong hook portion extending inwardly towards said first top prong and adjacent to a first space between said first top prong and said first bottom prong of said first arm portion when said first lock latch is in said first locked position, such that said first bottom prong hook portion inhibits release of said first UAV bar lug from said forward latch housing when said first lock latch is in said first locked position;

a first lock latch pivot end pivotally coupled to said first pivot; and a first lock latch travel stop configured to limit movement of said first lock latch beyond said first locked and unlocked positions;

a first lock latch return spring coupled to said first lock latch and to said first arm portion to urge said first lock latch into said first locked position;

a first spacer having a thickness at least greater than said second cam inner thickness;

a first rocker arm pivotally mounted to said first side of said forward latch housing via a third pivot disposed along said central vertical longitudinal plane with said first spacer pivotally disposed therebetween, said first rocker arm being configured to pivot between a first rocker arm locked position and a first rocker arm unlocked position relative to said forward latch middle section and comprising:

a first linkage end extending between said first and second driveshaft openings of said forward latch housing;

a first rocker arm pivot end pivotally coupled to said third pivot; and a second cam engagement end cammingly engaging said outer circumferential second cam surface, such that as said second driveshaft rotates in said second rotating direction, said second cam rotates against said second cam engagement end and pivots said first rocker arm from said first rocker arm locked position to said first rocker arm unlocked position;

a first linkage having a first end pivotally coupled to said first linkage end of said first rocker arm and a second end pivotally coupled to said first lock latch, such that as said first rocker arm pivots from said first rocker arm locked position to said first rocker arm unlocked position, said first lock latch pivots from said first locked position to said first unlocked position;

a first release latch pivotally mounted to said second side of said forward latch housing via said first pivot and configured to pivot between a first retaining position and a first release position relative to said first arm portion, said first release latch comprising:

a first release latch hook end having a first top prong hook portion extending inwardly towards said first bottom prong and adjacent to said first space between said first top prong and said first bottom prong of said first arm portion when said first release latch is in said first retaining position, such that said first top prong hook portion inhibits release of said first UAV bar from said forward latch housing when said first release latch is in said first retaining position;

a first release latch pivot end pivotally coupled to said first pivot;

a first release latch travel stop configured to limit movement of said first release latch beyond said first retaining and release positions; and a first cam engagement portion extending from said first release latch pivot end and cammingly engaging said inner circumferential first cam surface, such that as said first driveshaft rotates in said first rotating direction, said first cam rotates against said first cam engagement portion and pivots said first release latch from said first retaining position to said first release position;

a first release latch return spring coupled to said first release latch and to said first arm portion to urge said first release latch into said first retaining position;

wherein said second latch is associated with said second arm portion and comprising:

a second lock latch pivotally mounted to said second side of said forward latch housing via a second pivot disposed along said second UAV axis and configured to pivot between a second locked position and a second unlocked position relative to said second arm portion, said second lock latch comprising:

a second lock latch hook end having a second bottom prong hook portion extending inwardly towards said second top prong and adjacent to a second space between said second top prong and said second bottom prong of said second arm portion when said second lock latch is in said second locked position, such that said second bottom prong hook portion inhibits release of said second UAV bar lug from said forward latch housing when said second lock latch is in said second locked position;

a second lock latch pivot end pivotally coupled to said second pivot; and a second lock latch travel stop configured to limit movement of said second lock latch beyond said second locked and unlocked positions;

a second lock latch return spring coupled to said second lock latch and to said second arm portion to urge said second lock latch into said second locked position;

a second spacer having a thickness at least greater than said first cam inner thickness;

a second rocker arm pivotally mounted to said second side of said forward latch housing via said third pivot with said second spacer pivotally disposed therebetween, said second rocker arm being configured to pivot between a second rocker arm locked position and a second rocker arm unlocked position relative to said forward latch middle section and comprising:

a second linkage end extending between said first and second driveshaft openings of said forward latch housing;

a second rocker arm pivot end pivotally coupled to said third pivot; and a first cam engagement end cammingly engaging said outer circumferential first cam surface of said first cam, such that as said first driveshaft rotates in said first rotating direction, said first cam rotates against said first cam engagement end and pivots said second rocker arm from said second rocker arm locked position to said second rocker arm unlocked position;

a second linkage having a first end pivotally coupled to said second linkage end of said second rocker arm and a second end pivotally coupled to said second lock latch, such that as said second rocker arm pivots from said second rocker arm locked position to said second rocker arm unlocked position, said second lock latch pivots from said second locked position to said second unlocked position;

a second release latch pivotally mounted to said first side of said forward latch housing via said second pivot and configured to pivot between a second retaining position and a second release position relative to said second arm portion, said second release latch comprising:

a second release latch hook end having a second top prong hook portion extending inwardly towards said second bottom prong and adjacent to said second space between said second top prong and said second bottom prong of said second arm portion when said second release latch is in said second retaining position, such that said second top prong hook portion inhibits release of said second UAV bar lug from said forward latch housing when said second release latch is in said second retaining position;

a second release latch pivot end pivotally coupled to said second pivot;

a second release latch travel stop configured to limit movement of said second release latch beyond said second retaining and release positions; and a second cam engagement portion extending from said second end of said second release latch and cammingly engaging said inner circumferential second cam surface, such that as said second driveshaft rotates in said second rotating direction, said second cam rotates against said second cam engagement portion and pivots said second release latch from said second retaining position to said second release position; and a second release latch return spring coupled to said second release latch and to said second arm portion to urge said second release latch into said second retaining position.

18. The multiple UAV jettison apparatus according to claim 17, wherein said aft latch assembly comprises:

an aft latch housing having bilateral symmetry along said central vertical longitudinal plane and comprising:

a third arm portion having a third two-prong end, comprising a third top prong and a third bottom prong with said third UAV axis traversing therebetween, such that said third arm portion is angled at said first angle from said central vertical longitudinal plane, said third two-prong end being configured to engage a third UAV bar lug;

a fourth arm portion having a fourth two-prong end, comprising a fourth top prong and a fourth bottom prong with said fourth UAV axis traversing therebetween, such that said fourth arm portion is angled at said second angle from said central vertical longitudinal plane, said fourth two-prong end being configured to engage a fourth UAV bar lug; and an aft latch middle section comprising third and fourth driveshaft openings disposed on said horizontal plane and having centers aligned with said first and second central longitudinal axes, respectively, said third and fourth driveshaft openings being adapted to permit said first and second driveshafts to freely rotate therein, wherein said third cam is adjacent to said third driveshaft opening at a second side of said aft latch housing, and wherein said fourth cam is adjacent to said fourth driveshaft opening at a first side of said aft latch housing;

wherein said third latch is associated with said third arm portion and comprising:

a third lock latch pivotally mounted to a first side of said aft latch housing via a fourth pivot disposed along said third UAV axis and configured to pivot between a third locked position and a third unlocked position relative to said third arm portion, said third lock latch comprising:

a third lock latch hook end having a third bottom prong hook portion extending inwardly towards said third top prong and adjacent to a third space between said third top prong and said third bottom prong of said third arm portion when said third lock latch is in said third locked position, such that said third bottom prong hook portion inhibits release of said third UAV bar lug from said aft latch housing when said third lock latch is in said third locked position;

a third lock latch pivot end pivotally coupled to said fourth pivot; and a third lock latch travel stop configured to limit movement of said third lock latch beyond said third locked and unlocked positions;

a third lock latch return spring coupled to said third lock latch and to said third arm portion to urge said third lock latch into said third locked position;

a third spacer having a thickness at least greater than said fourth cam inner thickness;

a third rocker arm pivotally mounted to said first side of said aft latch housing via a sixth pivot disposed along said central vertical longitudinal plane with said third spacer pivotally disposed therebetween, said third rocker arm being configured to pivot between a third rocker arm locked position and a third rocker arm unlocked position relative to said aft latch middle section and comprising:

a third linkage end extending between said third and fourth driveshaft openings of said aft latch housing;

a third rocker arm pivot end pivotally coupled to said sixth pivot; and a fourth cam engagement end cammingly engaging said outer circumferential fourth cam surface, such that as said second driveshaft rotates in said second rotating direction, said fourth cam rotates against said fourth cam engagement end and pivots said third rocker arm from said third rocker arm locked position to said third rocker arm unlocked position;

a third linkage having a first end pivotally coupled to said third linkage end of said third rocker arm and a second end pivotally coupled to said third lock latch, such that as said third rocker arm pivots from said third rocker arm locked position to said third rocker arm unlocked position, said third lock latch pivots from said third locked position to said third unlocked position;

a third release latch pivotally mounted to said second side of said aft latch housing via said fourth pivot and configured to pivot between a third retaining position and a third release position relative to said third arm portion, said third release latch comprising:

a third release latch hook end having a third top prong hook portion extending inwardly towards said third bottom prong and adjacent to said third space between said third top prong and said third bottom prong of said third arm portion when said third release latch is in said third retaining position, such that said third top prong hook portion inhibits release of said third UAV bar lug from said aft latch housing when said third release latch is in said third retaining position;

a third release latch pivot end pivotally coupled to said fourth pivot;

a third release latch travel stop configured to limit movement of said third release latch beyond said third retaining and release positions; and a third cam engagement portion extending from said third release latch pivot end and cammingly engaging said inner circumferential third cam surface, such that as said first driveshaft rotates in said first rotating direction, said third cam rotates against said third cam engagement portion and pivots said third release latch from said third retaining position to said third release position; and a third release latch return spring coupled to said third release latch and to said third arm portion to urge said third release latch into said third retaining position;

wherein said fourth latch is associated with said fourth arm portion and comprising:

a fourth lock latch pivotally mounted to said second side of said aft latch housing via a fifth pivot disposed along said fourth UAV axis and configured to pivot between a fourth locked position and a fourth unlocked position relative to said fourth arm portion, said fourth lock latch comprising:

a fourth lock latch hook end having a fourth bottom prong hook portion extending inwardly towards said fourth top prong and adjacent to a fourth space between said fourth top prong and said fourth bottom prong of said fourth arm portion when said fourth lock latch is in said fourth locked position, such that said fourth bottom prong hook portion inhibits release of said fourth UAV bar lug from said aft latch housing when said fourth lock latch is in said fourth locked position;

a fourth lock latch pivot end pivotally coupled to said fifth pivot; and a fourth lock latch travel stop configured to limit movement of said fourth lock latch beyond said fourth locked and unlocked positions;

a fourth lock latch return spring coupled to said fourth lock latch and to said fourth arm portion to urge said fourth lock latch into said fourth locked position;

a fourth spacer having a thickness at least greater than said third cam inner thickness;

a fourth rocker arm pivotally mounted to said second side of said aft latch housing via said sixth pivot with said fourth spacer pivotally disposed therebetween, said fourth rocker arm being configured to pivot between a fourth rocker arm locked position and a fourth rocker arm unlocked position relative to said aft latch middle section and comprising:

a fourth linkage end extending between said third and fourth driveshaft openings of said aft latch housing;

a fourth rocker arm pivot end pivotally coupled to said sixth pivot; and a third cam engagement end cammingly engaging said outer circumferential third cam surface, such that as said first driveshaft rotates in said first rotating direction, said third cam rotates against said third cam engagement end and pivots said fourth rocker arm from said fourth rocker arm locked position to said fourth rocker arm unlocked position;

a fourth linkage having a first end pivotally coupled to said fourth linkage end of said fourth rocker arm and a second end pivotally coupled to said fourth lock latch, such that as said fourth rocker arm pivots from said fourth rocker arm locked position to said fourth rocker arm unlocked position, said fourth lock latch pivots from said fourth locked position to said fourth unlocked position;

a fourth release latch pivotally mounted to said first side of said aft latch housing via said fifth pivot and configured to pivot between a fourth retaining position and a fourth release position relative to said fourth arm portion, said fourth release latch comprising:

a fourth release latch hook end having a fourth top prong hook portion extending inwardly towards said fourth bottom prong and adjacent to a fourth space between said fourth top prong and said fourth bottom prong of said fourth arm portion when said fourth release latch is in said fourth retaining position, such that said fourth top prong hook portion inhibits release of said fourth UAV bar lug from said aft latch housing when said fourth release latch is in said fourth retaining position;

a fourth release latch pivot end pivotally coupled to said fifth pivot;

a fourth release latch travel stop configured to limit movement of said fourth release latch beyond said fourth retaining and release positions; and a fourth cam engagement portion extending from said fourth release latch pivot end and cammingly engaging said inner circumferential fourth cam surface, such that as said second driveshaft rotates in said second rotating direction, said fourth cam rotates against said fourth cam engagement portion and pivots said fourth release latch from said fourth retaining position to said fourth release position; and a fourth release latch return spring coupled to said fourth release latch and to said fourth arm portion to urge said fourth release latch into said fourth retaining position.

19. The multiple UAV jettison apparatus according to claim 18, further comprising:

a first manual ejection assembly, comprising:

a first manual ejection button slidably disposed within a first manual ejection opening located on said fairing above said first UAV opening;

a first manual ejection rod guide positioned near a distal end of said first manual ejection button;

first lock latch and release latch manual ejection rods in parallel relation and having first ends coupled to said distal end of said first manual ejection button, wherein a second end of said first lock latch manual ejection rod is positioned near a first lock latch manual ejection pin coupled to a first rocker arm extension, and wherein a second end of said first release latch manual ejection rod is positioned near a first release latch manual ejection pin coupled to a first release latch extension; and first lock latch and release latch springs surrounding said first lock latch and release latch manual ejection rods, respectively, both disposed between said first manual ejection rod guide and said distal end of said first manual ejection button to bias said first manual ejection button from a first depressed position to a first raise position;

wherein when said first manual ejection button transitions from said first raise position to said first depressed position (1) said first lock latch pivots from said first locked position to said first unlocked position and (2) said first release latch pivots from said first retaining position to said first release position;

a second manual ejection assembly, comprising:

a second manual ejection button slidably disposed within a second manual ejection opening located on said fairing above said second UAV opening;

a second manual ejection rod guide positioned near a distal end of said second manual ejection button;

second lock latch and release latch manual ejection rods in parallel relation and having first ends coupled to said distal end of said second manual ejection button, wherein a second end of said second lock latch manual ejection rod is positioned near a second lock latch manual ejection pin coupled to a second rocker arm extension, and wherein a second end of said second release latch manual ejection rod is positioned near a second release latch manual ejection pin coupled to a second release latch extension; and second lock latch and release latch springs surrounding said second lock latch and release latch manual ejection rods, respectively, both disposed between said second manual ejection rod guide and said distal end of said second manual ejection button to bias said second manual ejection button from a second depressed position to a second raise position;

wherein when said second manual ejection button transitions from said second raise position to said second depressed position (1) said second lock latch pivots from said second locked position to said second unlocked position and (2) said second release latch pivots from said second retaining position to said second release position;

a third manual ejection assembly, comprising:

a third manual ejection button slidably disposed within a third manual ejection opening located on said fairing above said third UAV opening;

a third manual ejection rod guide positioned near a distal end of said third manual ejection button;

third lock latch and release latch manual ejection rods in parallel relation and having first ends coupled to said distal end of said third manual ejection button, wherein a second end of said third lock latch manual ejection rod is positioned near a third lock latch manual ejection pin coupled to a third rocker arm extension, and wherein a second end of said third release latch manual ejection rod is positioned near a third release latch manual ejection pin coupled to a third release latch extension; and third lock latch and release latch springs surrounding said third lock latch and release latch manual ejection rods, respectively, both disposed between said third manual ejection rod guide and said distal end of said third manual ejection button to bias said third manual ejection button from a third depressed position to a third raise position;

wherein when said third manual ejection button transitions from said third raise position to said third depressed position (1) said third lock latch pivots from said third locked position to said third unlocked position and (2) said third release latch pivots from said third retaining position to said third release position; and a fourth manual ejection assembly, comprising:

a fourth manual ejection button slidably disposed within a fourth manual ejection opening located on said fairing above said fourth UAV opening;

a fourth manual ejection rod guide positioned near a distal end of said fourth manual ejection button;

fourth lock latch and release latch manual ejection rods in parallel relation and having first ends coupled to said distal end of said fourth manual ejection button, wherein a second end of said fourth lock latch manual ejection rod is positioned near a fourth lock latch manual ejection pin coupled to a fourth rocker arm extension, and wherein a second end of said fourth release latch manual ejection rod is positioned near a fourth release latch manual ejection pin coupled to a fourth release latch extension; and fourth lock latch and release latch springs surrounding said fourth lock latch and release latch manual ejection rods, respectively, both disposed between said fourth manual ejection rod guide and said distal end of said fourth manual ejection button to bias said fourth manual ejection button from a fourth depressed position to a fourth raise position;

wherein when said fourth manual ejection button transitions from said fourth raise position to said fourth depressed position (1) said fourth lock latch pivots from said fourth locked position to said fourth unlocked position and (2) said fourth release latch pivots from said fourth retaining position to said fourth release position.

20. The multiple UAV jettison apparatus according to claim 18, wherein said first ejector plate assembly further comprises: a first stowed stroke stop assembly coupled between said first pair of support plates and comprising a first release latch face and a first lock latch face, wherein, when said first ejector plate assembly moves between said first stowed and launch positions; (1) said first release latch face moves along a first release latch close axis and (2) said first lock latch face moves along a first lock latch close axis;

wherein said first latch further comprises: (i) a first release latch close assist pin coupled to said first release latch and positioned along said first release latch close axis and (ii) a first lock latch close assist pin coupled to said first lock latch and positioned along said first lock latch close axis;

wherein, when said first ejector plate assembly moves from said first launch position to said first stowed position, (a) said first release latch face engages said first release latch close assist pin and pivots said first release latch from said first release position to said first retaining position and (b) said first lock latch face engages said first lock latch close assist pin and pivots said first lock latch from said first unlocked position to said first locked position, such that said first release latch hook end and said first lock latch hook end clamp around said first UAV bar lug;

wherein said second ejector plate assembly further comprises: a second stowed stroke stop assembly coupled between said second pair of support plates and comprising a second release latch face and a second lock latch face, wherein when said second ejector plate assembly moves between said second stowed and launch positions; (1) said second release face moves along a second release latch close axis and (2) said second lock latch face moves along a second lock latch close axis;

wherein said second latch further comprises: (i) a second release latch close assist pin coupled to said second release latch and positioned along said second release latch close axis and (ii) a second lock latch close assist pin coupled to said second lock latch and positioned along said second lock latch close axis;

wherein when said second ejector plate assembly moves from said second launch position to said second stowed position, (a) said second release latch face engages said second release latch close assist pin and pivots said second release latch from said second release position to said second retaining position and (b) said second lock latch face engages said second lock latch close assist pin and pivots said second lock latch from said second unlocked position to said second locked position, such that said second release latch hook end and said second lock latch hook end clamp around said second UAV bar lug;

wherein said third ejector plate assembly further comprises: a third stowed stroke stop assembly coupled between said third pair of support plates and comprising a third release latch face and a third lock latch face, wherein when said third ejector plate assembly moves between said third stowed and launch positions; (1) said third release latch face moves along a third release latch close axis and (2) said third lock latch face moves along a third lock latch close axis;

wherein said third latch further comprises: (i) a third release latch close assist pin coupled to said third release latch and positioned along said third release latch close axis and (ii) a third lock latch close assist pin coupled to said third lock latch and positioned along said third lock latch close axis;

wherein when said third ejector plate assembly moves from said third launch position to said third stowed position, (a) said third release latch face engages said third release latch close assist pin and pivots said third release latch from said third release position to said third retaining position and (b) said third lock latch face engages said third lock latch close assist pin and pivots said third lock latch from said third unlocked position to said third locked position, such that said third release latch hook end and said third lock latch hook end clamp around said third UAV bar lug;

wherein said fourth ejector plate assembly further comprises: a fourth stowed stroke stop assembly coupled between said fourth pair of support plates and comprising a fourth release latch face and a fourth lock latch face, wherein when said fourth ejector plate assembly moves between said fourth stowed and launch positions; (1) said fourth release latch face moves along a fourth release latch close axis and (2) said fourth lock latch face moves along a fourth lock latch close axis;

wherein said fourth latch further comprises: (i) a fourth release latch close assist pin coupled to said fourth release latch and positioned along said fourth release latch close axis and (ii) a fourth lock latch close assist pin coupled to said fourth lock latch and positioned along said fourth lock latch close axis; and wherein when said fourth ejector plate assembly moves from said fourth launch position to said fourth stowed position, (a) said fourth release latch face engages said fourth release latch close assist pin and pivots said fourth release latch from said fourth release position to said fourth retaining position and (b) said fourth lock latch face engages said fourth lock latch close assist pin and pivots said fourth lock latch from said fourth unlocked position to said fourth locked position, such that said fourth release latch hook end and said fourth lock latch hook end clamp around said fourth UAV bar lug.

* * * * *